(12) United States Patent
Takano

(10) Patent No.: US 9,924,479 B2
(45) Date of Patent: Mar. 20, 2018

(54) COMMUNICATION CONTROL DEVICE, COMMUNICATION CONTROL METHOD, AND TERMINAL DEVICE

(71) Applicant: SONY CORPORATION, Tokyo (JP)

(72) Inventor: Hiroaki Takano, Saitama (JP)

(73) Assignee: SONY CORPORATION, Tokyo (JP)

( * ) Notice: Subject to any disclaimer, the term of this patent is extended or adjusted under 35 U.S.C. 154(b) by 232 days.

(21) Appl. No.: 14/766,702

(22) PCT Filed: Nov. 27, 2013

(86) PCT No.: PCT/JP2013/081940
§ 371 (c)(1),
(2) Date: Aug. 7, 2015

(87) PCT Pub. No.: WO2014/129040
PCT Pub. Date: Aug. 28, 2014

(65) Prior Publication Data
US 2015/0365910 A1  Dec. 17, 2015

(30) Foreign Application Priority Data

Feb. 22, 2013 (JP) .................................. 2013-032789

(51) Int. Cl.
| | |
|---|---|
| *H04W 56/00* | (2009.01) |
| *H04W 16/32* | (2009.01) |
| *H04W 84/04* | (2009.01) |
| *H04W 48/16* | (2009.01) |

(52) U.S. Cl.
CPC ....... *H04W 56/0015* (2013.01); *H04W 16/32* (2013.01); *H04W 56/00* (2013.01); *H04W 84/045* (2013.01); *H04W 48/16* (2013.01)

(58) Field of Classification Search
CPC ............................... H04W 24/00; H04L 43/50
See application file for complete search history.

(56) References Cited

U.S. PATENT DOCUMENTS

| | | | |
|---|---|---|---|
| 6,567,376 B1* | 5/2003 | Karlsson | G06F 11/1687 370/216 |
| 2012/0021742 A1* | 1/2012 | Lee | H04W 72/02 455/434 |

(Continued)

FOREIGN PATENT DOCUMENTS

| | | |
|---|---|---|
| WO | 2009/054058 A1 | 4/2009 |
| WO | 2010/053054 A1 | 5/2010 |
| WO | 2010/087172 A1 | 8/2010 |

OTHER PUBLICATIONS

Extended European Search Report for EP Patent Application No. 13875388.4, dated Sep. 16, 2016, 07 pages.

(Continued)

*Primary Examiner* — Zhiren Qin
(74) *Attorney, Agent, or Firm* — Chip Law Group

(57) ABSTRACT

Provided is a communication control device including: a communication control unit configured to control radio communication in a small cell partially or entirely overlapping with a macro cell; and an acquisition unit configured to acquire first synchronization relationship information indicating which frequency bands are mutually synchronized among a plurality of frequency bands used for the small cell. The first synchronization relationship information is supplied in the small cell by the communication control unit and is not supplied in the macro cell by a base station of the macro cell.

20 Claims, 32 Drawing Sheets

(56) References Cited

U.S. PATENT DOCUMENTS

| | | | |
|---|---|---|---|
| 2012/0082152 A1 | 4/2012 | Baldemair et al. | |
| 2013/0294369 A1* | 11/2013 | Dinan | H04L 5/001 370/329 |
| 2014/0204809 A1* | 7/2014 | Kim | H04J 13/0062 370/280 |
| 2014/0226636 A1* | 8/2014 | Xu | H04W 72/042 370/336 |
| 2015/0139113 A1* | 5/2015 | You | H04L 5/003 370/329 |
| 2015/0172689 A1* | 6/2015 | Annamraju | H04N 19/44 375/240.25 |
| 2015/0173011 A1* | 6/2015 | Das | H04W 16/26 370/328 |
| 2015/0334714 A1* | 11/2015 | Wang | H04W 72/0473 370/329 |
| 2015/0341877 A1* | 11/2015 | Yi | H04W 56/00 370/350 |

OTHER PUBLICATIONS

"Some issues on synchronization in NCT CCs", Sony Corporation, 3GPP TSG RAN WG1 #71, New Orleans, USA, Nov. 12-16, 2012, 08 pages.

"Discussion on scenarios for small cell enhancement in Rel-12", CMCC, 3GPP TSG-RAN WG1 #71 New Orleans, Louisiana, U.S.A., Nov. 12-16, 2012, 06 pages.

NTT Docomo, "Design for Synchronised New Carrier Type" 3GPP TSG RAN WG1 Meeting #71, New Orleans, USA, Nov. 12-16, 2012, 3 pages.

Sony Corporation, "Some Issues in Synchronization in NCT CCs", 3GPP TSG RAN WG1 Meeting #71, New Orleans, USA, Nov. 12-16, 2012.

New Postcom, "Discussion on deployment scenarios for new carrier types", 3GPP TSG RAN WG1 Meeting #72, St Julian's, Malta, Jan. 28-Feb. 1, 2013, 7 pages.

Panasonic, "Target scenarios for new carrier types", 3GPP TSG RAN WG1 Meeting #72, St Julian's, Malta, Jan. 28-Feb. 1, 2013, 6 pages.

Sony, "Synchronization information in NCT", 3GPP TSG RAN WG1 Meeting #72, Saint Julian, Malta, Jan. 28-Feb. 1, 2013, 3 pages.

Office Action for JP Patent Application No. 2015-501277, dated Oct. 3, 2017, 4 pages of Office Action.

\* cited by examiner

FIG. 7

| SUPPLY METHOD | UE STATE NECESSARY FOR SUPPLY | SUPPLY TARGET UE (SUPPLIED INFORMATION) | SUPPLIABLE INFORMATION AMOUNT |
|---|---|---|---|
| SYSTEM INFORMATION | RRC_CONNECTED OR RRC_IDLE | ALL UES (INFORMATION COMMON TO UES) | SMALL |
| RRC SIGNALING | RRC_CONNECTED | INDIVIDUAL UE (INDIVIDUAL INFORMATION FOR EACH UE OR INFORMATION COMMON TO UES) | LARGE |

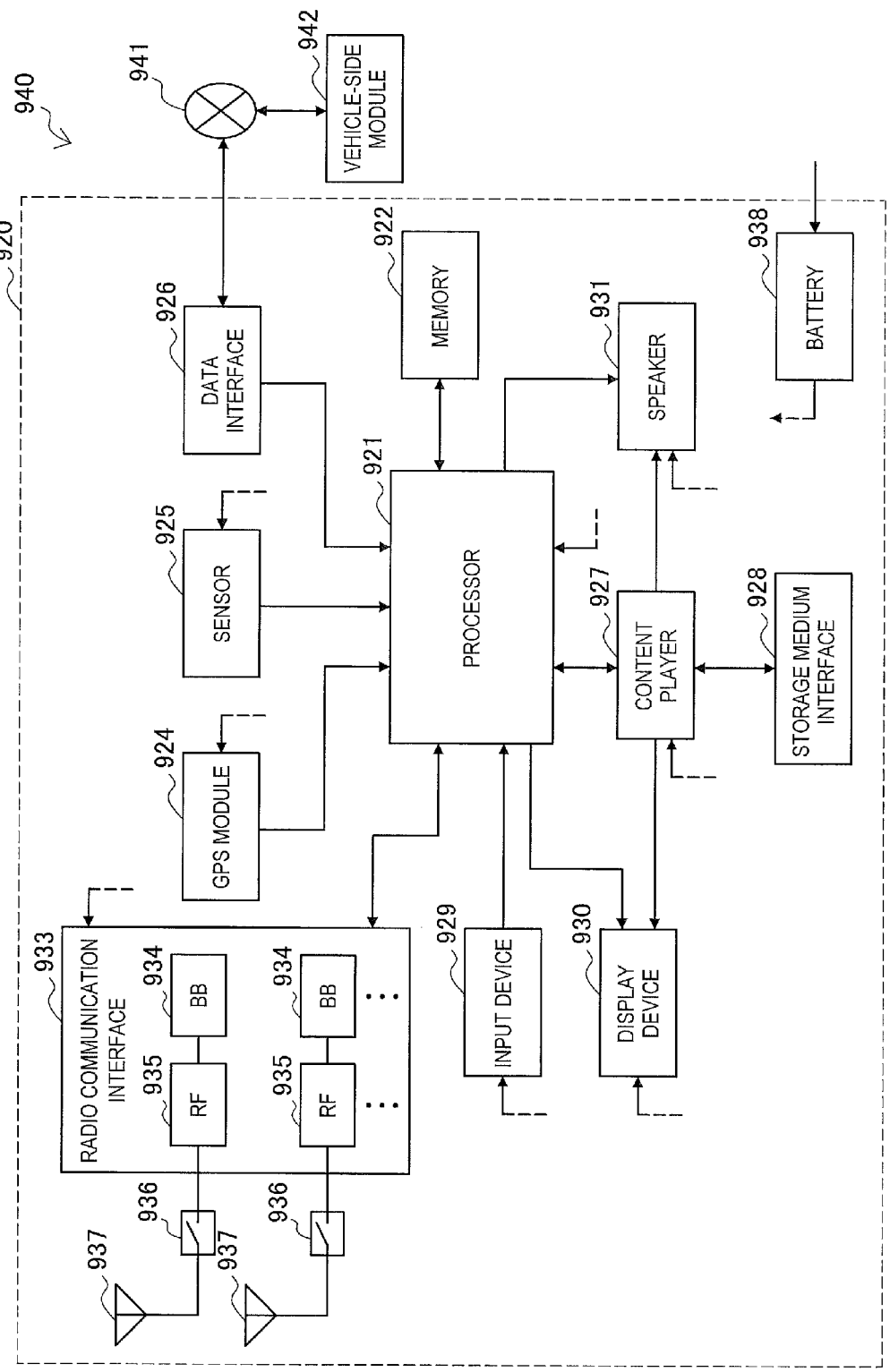

COMMUNICATION CONTROL DEVICE, COMMUNICATION CONTROL METHOD, AND TERMINAL DEVICE

TECHNICAL FIELD

The present disclosure relates to a communication control device, a communication control method, and a terminal device.

BACKGROUND ART

At present, 4G radio communication systems have been standardized by the Third Generation Partnership Project (3GPP). In 4G, technologies such as carrier aggregation, relay, and Multi-User Multiple-Input Multiple-Output (MU-MIMO) have been noticed.

In particular, carrier aggregation is a technology capable of collectively handling, for example, five frequency bands with a bandwidth of 20 MHz to handle a bandwidth of 20 MHz×5=100 MHz. According to carrier aggregation, an advance in the maximum throughput is expected. Various technologies related to such carrier aggregation have been investigated.

For example, Patent Literature 1 discloses a technology for suppressing deterioration in throughput by controlling assignment of a measurement gap for each component carrier (CC) based on a determination result of urgency of handover.

CITATION LIST

Patent Literature

Patent Literature 1: JP 2011-120196A

SUMMARY OF INVENTION

Technical Problem

On the other hand, in Release 11 of the 3GPP, new carrier types (NCTs) have been investigated as new component carriers apart from legacy CCs (existing CCs) capable of maintaining backward compatibility. Here, the NCTs are assumed to be new types of CCs as well as the types of CCs. Further, as the NCTs, an NCT (Synchronized New Carrier Type: SNCT) synchronized with the legacy CCs and an NCT (Unsynchronized New Carrier Type: UNCT) not synchronized with the legacy CCs have been investigated.

The SNCT is synchronized with any legacy CC. Therefore, when a user equipment (UE) establishes synchronization in one CC between the mutually synchronized SNCT and the legacy CC, a synchronization result of the UE in the one CC can be used for the other CC. That is, the UE does not have to establish separate synchronization with a synchronization signal (for example, a common reference signal (CRS)) in the other CC.

The UNCT is not synchronized with any legacy CC, but can be synchronized with different UNCTs. When the UE establishes synchronization in one UNCT among two or more mutually synchronized UNCTs, a synchronization result of the UE in the one UNCT can be utilized for the different CCs. That is, the UE does not have to establish separate synchronization with a synchronization signal in the other CCs.

However, in order for the UE to use the synchronization result of the UE in a certain CC for another CC, there is a concern of a large load being applied to the UE.

For example, since a frequency band separate from the SNCT can be present in the legacy CC, the SNCT is not synchronized with all of the legacy CCs. Therefore, the UE verifies the synchronization regarding various combinations between the SNCT and legacy CCs in order to use the synchronization result of the UE in the legacy CC for the SNCT. In this way, a large load may be applied to the UE.

For example, there is a possibility of the UNCT being synchronized with another UNCT, but not all of the UNCTs are necessarily synchronized. Therefore, the UE verifies the synchronization regarding various combinations between the UNCTs in order to use the synchronization result of the UE in a certain UNCT for another UNCT. In this way, a large load may be applied to the UE.

In particular, when a macro cell and a small cell partially or entirely overlapping with the macro cell are present, the number of combinations of the synchronizable CC is considerably large. Therefore, a larger load may be applied to the UE in order to verify the synchronization.

Originally, when the UE does not use a synchronization result of a UE in a certain CC for a different CC, it is necessary to establish synchronization with a synchronization signal in each CC. In this way, a large load may be applied to the UE.

Based on the above description, the inventors of the present specification conceived of supplying information indicating a synchronization relationship (that is, which CCs are mutually synchronized) between CCs to a UE. However, even when the information indicating the synchronization relationship is reported to the UE, valuable radio resources in a macro cell may be consumed when a considerable amount of information is supplied by the macro cell.

Accordingly, it is desirable to provide a configuration in which consumption of radio resources of a macro cell can be suppressed while reducing a load in a UE in carrier aggregation when the macro cell and a small cell are deployed.

Solution to Problem

According to the present disclosure, there is provided a communication control device including: a communication control unit configured to control radio communication in a small cell partially or entirely overlapping with a macro cell; and an acquisition unit configured to acquire first synchronization relationship information indicating which frequency bands are mutually synchronized among a plurality of frequency bands used for the small cell. The first synchronization relationship information is supplied in the small cell by the communication control unit and is not supplied in the macro cell by a base station of the macro cell.

According to the present disclosure, there is provided a communication control method including: controlling radio communication in a small cell partially or entirely overlapping with a macro cell; and acquiring first synchronization relationship information indicating which frequency bands are mutually synchronized among a plurality of frequency bands used for the small cell. The first synchronization relationship information is supplied in the small cell by a base station of the small cell and is not supplied in the macro cell by the base station of the macro cell.

According to the present disclosure, there is provided a communication control device including: a communication control unit configured to control radio communication in a macro cell partially or entirely overlapping with a small cell;

and an acquisition unit configured to acquire synchronization relationship information indicating which frequency bands are mutually synchronized among a plurality of frequency bands. The communication control unit supplies the synchronization relationship information in the macro cell, the synchronization relationship information does not include first synchronization relationship information indicating which frequency bands are mutually synchronized among a plurality of frequency bands used for the small cell, and the first synchronization relationship information is supplied by a base station of the small cell.

According to the present disclosure, there is provided a terminal device including: a radio communication unit configured to perform radio communication in a macro cell or a small cell partially or entirely overlapping with the macro cell, and an acquisition unit configured to acquire first synchronization relationship information indicating which frequency bands are mutually synchronized among a plurality of frequency bands used for the small cell from information supplied in the small cell by a base station of the small cell and configured not to acquire the first synchronization relationship information from information supplied in the macro cell by a base station of the macro cell.

Advantageous Effects of Invention

According to the present disclosure described above, it is possible to suppress consumption of radio resources of a macro cell while reducing a load in a UE in carrier aggregation when the macro cell and a small cell are deployed.

BRIEF DESCRIPTION OF DRAWINGS

FIG. 7 is an explanatory diagram illustrating characteristics of system information and RRC signaling.

FIG. 34 is a block diagram illustrating an example of a schematic configuration of a car navigation device to which technology according to an embodiment of the present disclosure may be applied.

DESCRIPTION OF EMBODIMENTS

Figure 1:
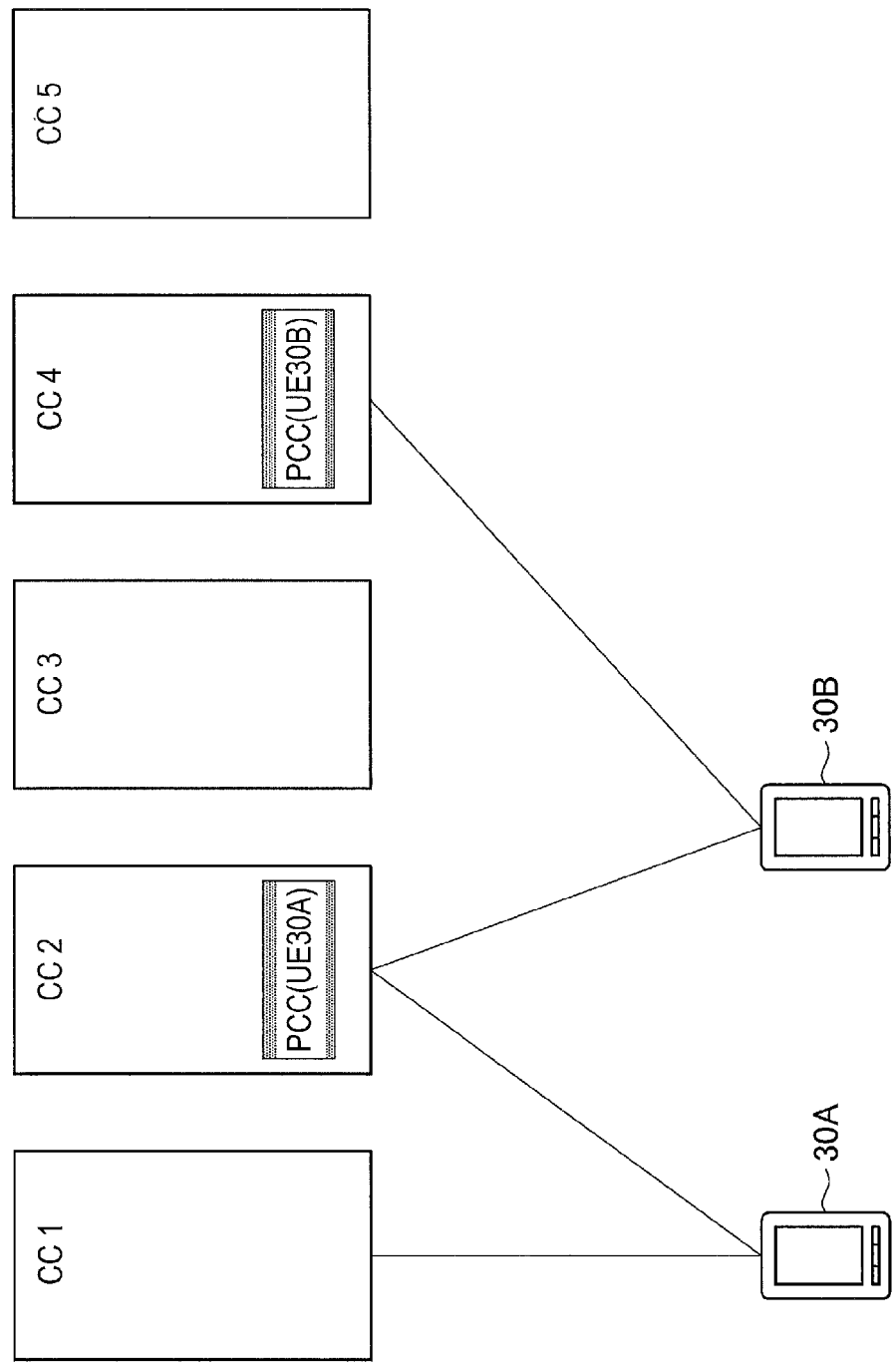
FIG. 1 is an explanatory diagram illustrating an example of a PCC of each UE.

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description will be made in the following order.
1. Technology for radio communication in 3GPP
2. Technical problems according to embodiment of the present disclosure
 2.1. Examination of synchronization between frequency bands
 2.2. Technical problems
3. Schematic configuration of communication system according to embodiment
4. Configuration of each device
 4.1. Configuration of pico eNodeB
 4.2. Configuration of macro eNodeB
 4.3. Configuration of UE
5. Flow of process
6. First modification example
7. Second modification example
8. Third modification example
9. Others
10. Application examples
11. Applications related to pico eNodeB and macro eNodeB
12. Applications related to UE
11. Conclusion

1. TECHNOLOGY FOR RADIO COMMUNICATION IN 3GPP

First, a technology for radio communication in the 3GPP will be described as a premise.
(Carrier Aggregation of Release 10)
Component Carrier In carrier aggregation of Release 10, up to five component carriers (CCs) are bundled and used by a UE. Each CC is a bandwidth of up to 20 MHz. In carrier aggregation, CCs continuing in a frequency direction are used in some cases and CCs separated in the frequency direction are used in some cases. In carrier aggregation, the CCs to be used can be set for each UE.
Primary CC and Secondary CC In carrier aggregation, one of the plurality of CCs used by the UE is a special CC. The one special CC is referred to as a primary component carrier (PCC). Of the plurality of CCs, the remaining CCs are referred to as secondary component carriers (SCCs). The PCC can differ for each UE. This point will be described more specifically below with reference to FIG. 1.

FIG. 1 is an explanatory diagram illustrating an example of the PCC of each UE. A UE 30A, a UE 30B, and five CCs 1 to 5 are illustrated in FIG. 1. In this example, the UE 30A uses two CCs, the CC 1 and the CC 2. The UE 30A uses the CC 2 as the PCC. On the other hand, the UE 30B uses two CCs, the CC 2 and the CC 4. The UE 30B uses the CC 4 as the PCC. In this way, each UE can use a different CC as the PCC.

Since the PCC is the most important CC among the plurality of CCs, the CC for which communication quality is the stablest is preferable. Which CC is used as the PCC actually depends on the way in which they are installed.

The CC with which a UE initially establishes connection is the PCC for the UE. The SCC is added to the PCC. That is, the PCC is a main frequency band and the SCC is an auxiliary frequency band. The SCC is changed by deleting the existing SCC and adding a new SCC. The PCC is changed in an inter-frequency handover sequence of the related art. In carrier aggregation, a UE cannot use only the SCC, but necessarily uses one PCC.

The PCC is also referred to as a primary cell. The SCC is also referred to as a secondary cell.
Synchronization by UE in CRS In carrier aggregation, a common reference signal (CRS) is transmitted in each CC. A UE establishes synchronization in each CC by the CRS. In the present specification, "synchronization (by the UE in the CC)" means that the UE adjusts (for example, tracks synchronization) a timing and/or a frequency in reception of a signal so that a signal can be correctly received in the CC. The common reference signal is also referred to as a cell-specific reference signal.
(NCT of Release 12)

In carrier aggregation, each CC has been assumed to be able to be used by a legacy UE (that is, an existing UE) from the viewpoint of guarantee of backward compatibility. However, the definition of a CC that cannot be used by a legacy UE but is more efficient has started to be investigated. That is, definition of new CCs referred to as new carrier types (NCT) or additional carriers has started to be investigated.

The ultimate motivation for the NCT is to reduce overhead of the CCs. Overhead is radio resources other than radio resources utilized to transmit user data. That is, overhead is radio resources utilized for control. When overhead increases, the radio resources that can be utilized to transmit user data may decrease. Therefore, the increase in overhead is not preferable. One cause of overhead is a CRS present in each CC in a downlink. This point will be described more specifically below with reference to FIG. 2.

Figure 2:
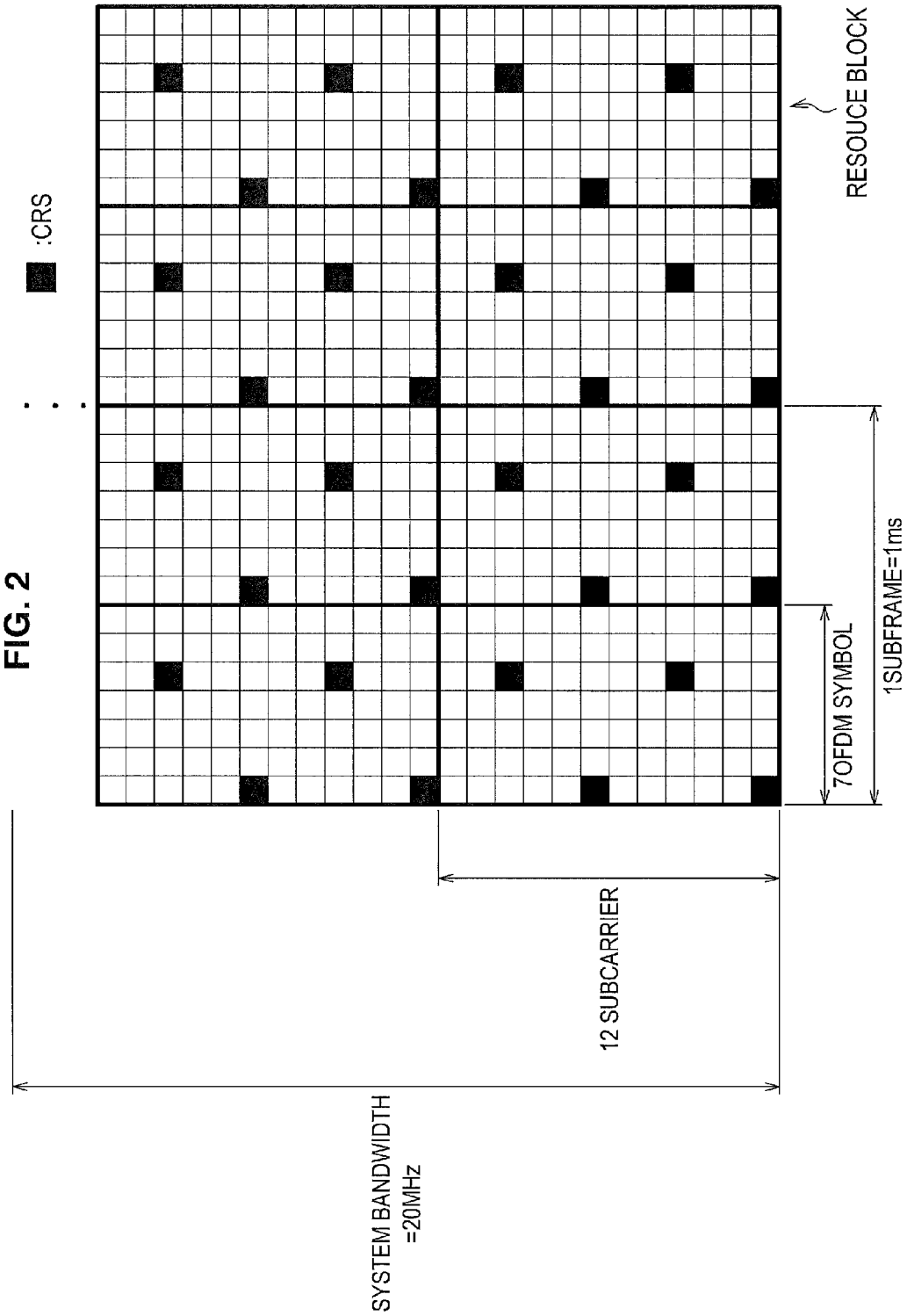
FIG. 2 is an explanatory diagram illustrating an example of a CRS transmitted in a CC on a downlink.

FIG. 2 is an explanatory diagram illustrating an example of a CRS transmitted in a CC on a downlink. Several radio resource blocks (RBs) corresponding to the CCs of 20 MHz are illustrated in FIG. 2. Each RB has a width of 12 subcarriers in a frequency direction and a width of 7 Orthogonal Frequency Division Multiplexing (OFDM) symbols in a time direction. The CRSs are transmitted in each RB. That is, the CRSs are transmitted in all of the RBs present across the bandwidth of the CCs in the frequency direction and present for each slot in the time direction. Accordingly, the CRS is transmitted in each CC and each subframe.

One objective of the CRS is for a UE to establish synchronization. As the synchronization, there is time synchronization (or timing synchronization) which is synchronization in the time direction and frequency synchronization which is synchronization in the frequency direction. The UE can establish synchronization with high precision in the frequency direction and the time direction by the CRS. Further, the UE continues to establish synchronization by the CRS.

Another objective of the CRS is that the UE properly demodulates a downlink signal. The UE demodulates different received signals based on the phases of the CRSs.

The common reference signal (CRS) is the most fundamental reference signal (RS) introduced in Release 8. On the other hand, at present, there is an intermittently transmitted RS such as a channel state information-reference signal (CSI-RS). The RS is used to demodulate a downlink signal. Accordingly, a current objective of the CRS is mainly that the UE can establish synchronization. Therefore, as far as the UE can establish synchronization, the interval at which the CRS is transmitted can be decreased.

(Reduction in CRSs Investigated in NTC in Release 11)
Kinds of NCTs

As the NCTs investigated in Release 11, there are broadly two kinds of NCTs.

One of the two kinds of NCTs is an NCT that is synchronized with a legacy CC (that is, an existing CC). When the UE establishes synchronization in a legacy CC, the UE can utilize a synchronization result of the UE in the legacy CC for the NCT synchronized with the legacy CC. Such an NCT is referred to as a synchronized NCT (hereinafter referred to as an "SNCT"). Further, in the present specification, "utilize the synchronization result (of the UE in the CC) (for a different CC)" means that a reception timing and a reception frequency in the different CC are acquired from a reception timing and a reception frequency in the CC.

The other of the two kinds of NCTs is an NCT that is not synchronized with a legacy CC. The UE necessarily establishes synchronization in an NCT. Such an NCT is referred to as an unsynchronized NCT (hereinafter referred to as an "UNCT"). Since the synchronization process is necessary in the UNCT, the CRSs are transmitted in the UNCT.

As described above, as the NCT, there are the SNCT and the UNCT. Hereinafter, specific examples of the SNCT and the UNCT will be described with reference to FIG. 3.

Figure 3:
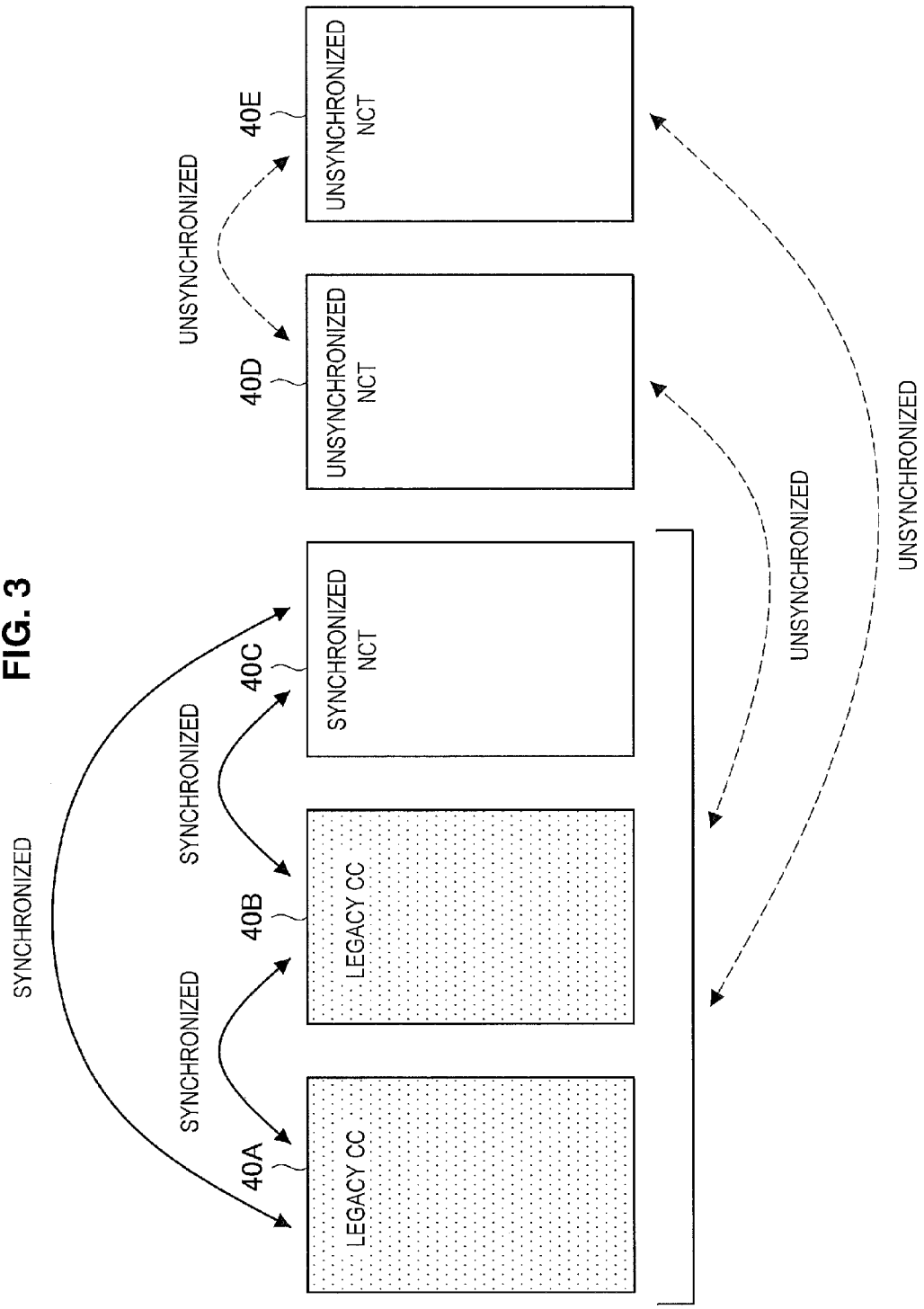
FIG. 3 is an explanatory diagram illustrating examples of NCTs.

FIG. 3 is an explanatory diagram illustrating an example of the NCT. Five CCs 40 are illustrated in FIG. 3. Of the five CCs 40, a CC 40A and a CC 40B are legacy CCs. In this example, the CC 40A and the CC 40B are mutually synchronized. A CC 40C, a CC 40D, and a CC 40E are the NCTs. More specifically, the CC 40C is an SNCT that is synchronized with both of the CC 40A and the CC 40B which are the legacy CCs. The CC 40D and the CC 40E are UNCTs that are synchronized with neither the CC 40A nor the CC 40B. In this example, the CC 40D and the CC 40E are not mutually synchronized.

Reduction in CRSs in Unsynchronized NCT

Since the CRS transmitted in the legacy CC is transmitted not only to establish synchronization of the UE but also to demodulate a received signal, the CRS is redundant. On the other hand, since the CIS-RS is standardized as an RS for demodulation in releases after Release 10, it is possible to reduce the CRSs. Accordingly, an extent to which CRSs can be reduced while enabling the UE to continuously establish synchronization has been investigated. In particular, a reduction in the CRSs in the frequency direction and a reduction in the CRSs in the time direction have been investigated as the reduction in the CRSs of the unsynchronized NCT (that is, the UNCT).

As the reduction in the CRSs in the frequency direction, for example, the RBs in which the CRSs are transmitted is reduced to 6 RBs, 25 RBs, or 50 RBs. Hereinafter, this point will be described specifically with reference to FIG. 4.

Figure 4:
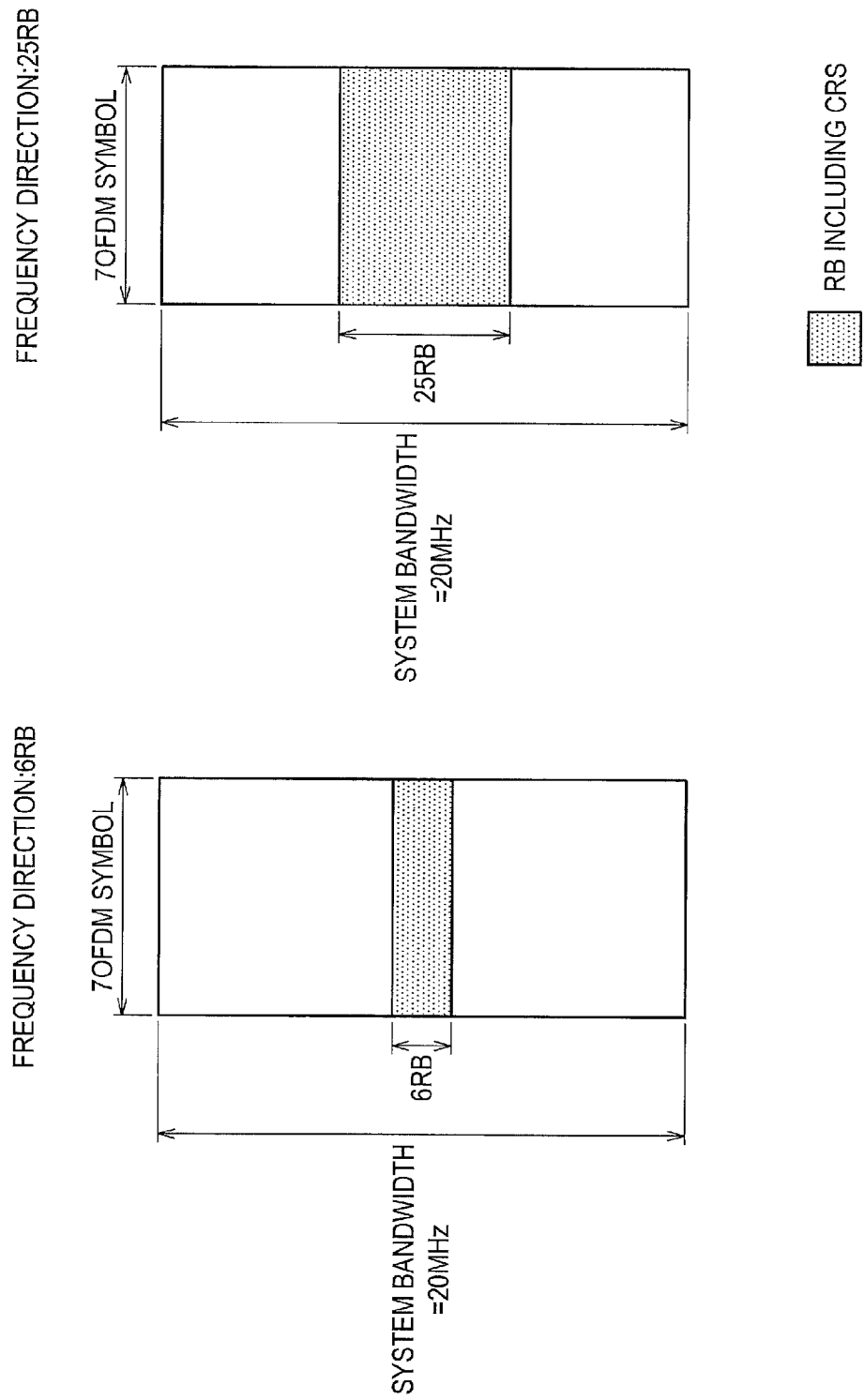
FIG. 4 is an explanatory diagram illustrating an example of a reduction in CRSs in a frequency direction.

FIG. 4 is an explanatory diagram illustrating an example of a reduction in the CRSs in the frequency direction. A case in which the RBs in which the CRSs are transmitted are reduced to 6 RBs in the frequency direction and a case in which the RBs in which the CRSs are transmitted are reduced to 25 RBs in the frequency direction are illustrated in FIG. 4. In this way, not all of the CRSs in the RBs in the frequency direction are transmitted, but the CRSs in a limited number of the RBs are transmitted.

On the other hand, as the reduction in the CRSs in the time direction, for example, a transmission period of the CRSs is considered to be 5 ms or 10 ms. This point will be described specifically with reference to FIG. 5.

Figure 5:
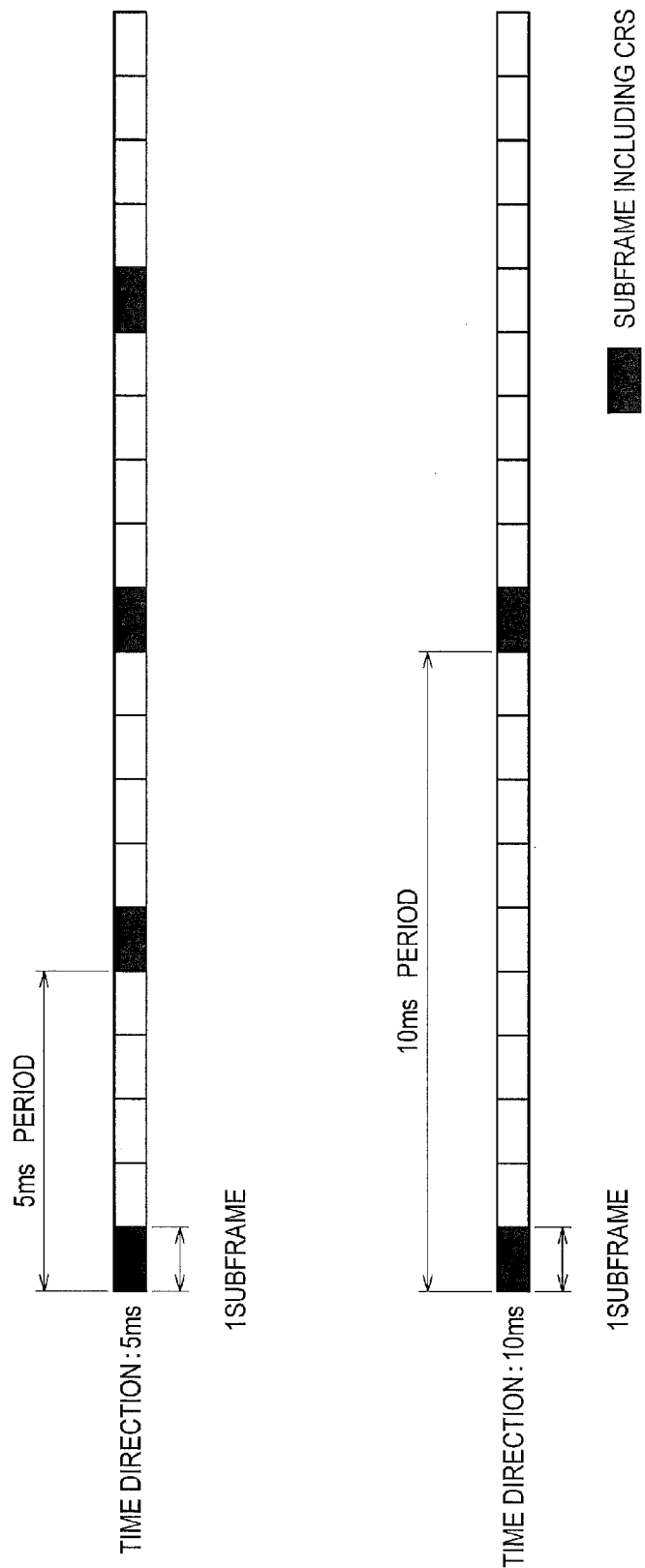
FIG. 5 is an explanatory diagram illustrating an example of a reduction in CRSs in the time direction.

FIG. 5 is an explanatory diagram illustrating an example of a reduction of the CRSs in the time direction. A case in which the transmission period of the CRS is 5 ms and a case in which the transmission period of the CRS is 10 ms are illustrated in FIG. 5. In this way, not all of the CRSs of the slots or the subframes in the time direction are transmitted, but the CRSs of a limited number of the subframes are transmitted.

As described above, a method of combining the reductions in the CRSs in the frequency direction and the reductions in the CRSs in the time direction has been investigated. As an evaluation of whether the UE establishes synchronization, whether accuracy of about 500 Hz is maintained in an environment of an SNR of −8 dB was evaluated. As a result, in the environment of an SNR of −8 dB, it is necessary to transmit the CRS in 25 RBs every 5 ms.

Reduction in CRSs in Synchronized NCT

On the other hand, since the synchronized NCT (SNCT) is synchronized with the legacy CC, the existing CRSs can be basically deleted in the SNCT.

(Synchronization Monitoring Procedure)

The UE monitors whether the UE establishes synchronization based on a block error rate (BLER) of a physical downlink control channel (PDCCH). In other words, the UE detects synchronization deviation of the UE based on the BLER of the PDCCH. For example, when the BLER of the PDCCH is equal to or greater than 10%, the UE detects the synchronization deviation.

When the synchronization deviation is detected a predetermined number of times, a timer starts. Then, when a period of time of the timer expires, radio link failure (RLF) is recognized. When the RLF is recognized, the UE stops all of the transmission within 40 ms from the recognition of the RLF in order to avoid interference with another UE. Thereafter, the UE performs a procedure of RRC reestablishment including cell selection and random access.

The UE performs the above-described synchronization monitoring on the PCC, but does not perform the synchronization monitoring on the SCC. The UE deactivates the SCC when the PDCCH is not detected in the SCC.

(NCT of Release 12)

NCT of Release 12 is a study item (SI) that was approved in September 2012 as RP-121415 at the 3GPP RAN #57 Plenary meeting. This SI is divided into phase 1 and phase 2. In phase 1, enhancement of NCT of Release 11 is scheduled to be investigated. In phase 2, the enhancement is scheduled to be investigated in consideration of scenarios of small cells. Specific examples of small cells include a pico cell, a nano cell, and a femto cell. In the present specification, the description will be made exemplifying a pico cell as the small cell.

As the scenarios of a small cell, three deployment scenarios of a small cell are considered at present in 3GPP. In a first deployment scenario (that is, Deployment Scenario 1), a small cell is entirely overlapping with a macro cell. In a second deployment scenario (that is, Deployment Scenario 2), a small cell is partially overlapping with a macro cell. In a third deployment scenario (that is, Deployment Scenario 3), a small cell is not overlapping with a macro cell. That is, there is no macro cell near the small cell and only the small cell is operated. Hereinafter, specific examples of the deployment scenarios will be described with reference to FIG. 6.

Figure 6:
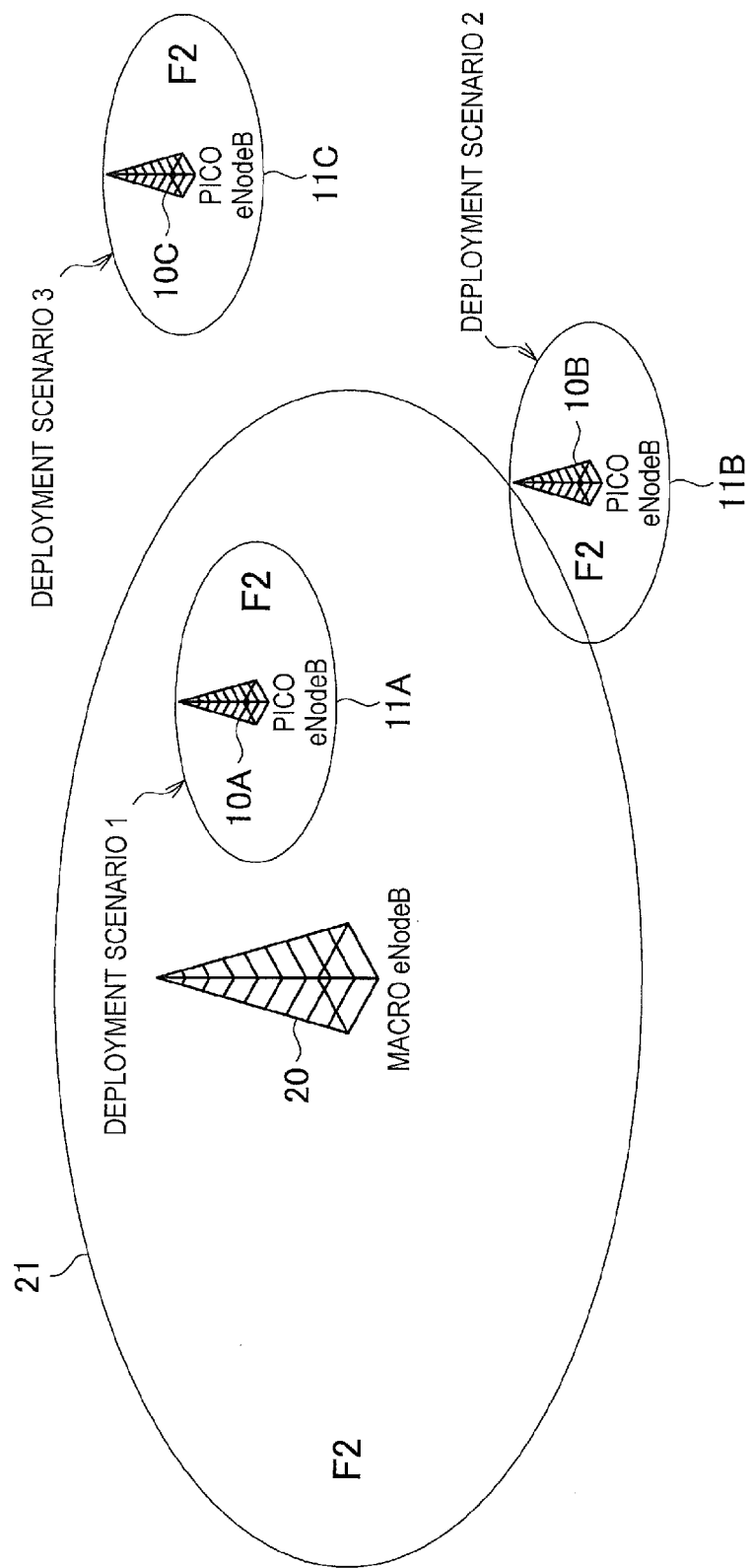
FIG. 6 is an explanatory diagram illustrating examples of three deployment scenarios of a small cell.

FIG. 6 is an explanatory diagram illustrating examples of three deployment scenarios of a small cell. Referring to FIG. 6, three pico cells 11A, 11B, and 11C and a macro cell 21 are illustrated. Pico eNodeBs 10 which are base stations of the pico cells 11 and a macro eNodeB 20 which is a base station of the macro cell 21 are also illustrated. First, the pico cell 11A is entirely overlapping with the macro cell 21, the pico cell 11B is partially overlapping with the macro cell 21, and the pico cell 11C is not overlapping with the macro cell 21. That is, the deployment of the pico cell 11A corresponds to the first deployment scenario, the deployment of the pico cell 11B corresponds to the second deployment scenario, and the deployment of the pico cell 11C corresponds to the third deployment scenario. In the example, radio communication is performed using a frequency band F1 in the macro cell 21. Further, radio communication is performed using a frequency band F2 in the pico cell 11.

(Supply Methods for Control Information to UE)

The eNodeB uses, for example, system information or radio resource control (RRC) signaling when the eNodeB supplies control information to the UE. Hereinafter, characteristics of two supply methods will be described with reference to FIG. 7.

FIG. 7 is an explanatory diagram illustrating characteristics of system information and RRC signaling. Referring to FIG. 7, a UE state necessary for the eNodeB to supply the control information to the UE, a supply target UE (and supplied information), and a suppliable information amount are illustrated for the system information and the RRC signaling.

First, in order for the eNodeB to supply the control information with the system information, the UE may be in one of RRC_Connected (that is, a connection state) and RRC_Idle (that is, an idle state). On the other hand, in order for the eNodeB to supply the control information with the RRC signaling, the UE has to be in RRC_Connected (that is, the connection state).

Second, the control information is supplied with the system information to all of the UEs rather than an individual UE. That is, the control information supplied with the system information can be said to be information common to the UEs. On the other hand, the control information is basically supplied with the RRC signaling to the individual UE. That is, the control information supplied with the RRC signaling can be said to be basically the control information of the separate UE. However, by transmitting the control information common to other UEs with the RRC signaling, the common information can also be supplied to the UEs with the RRC signaling.

Third, the system information includes restricted control information and is transmitted using restricted radio resources. Therefore, an information amount of control information supplied with the system information is small. On the other hand, the RRC signaling is transmitted with a Physical Downlink Shared CHannel (PDSCH) relatively freely. Therefore, an information amount of control information supplied with the RRC signaling is large.

2. TECHNICAL PROBLEMS ACCORDING TO EMBODIMENT OF THE PRESENT DISCLOSURE

Next, technical problems in an embodiment of the present disclosure will be described.

<2.1 Examination of Synchronization between Frequency Bands>

First, examination of synchronization between frequency bands will be described.

(Synchronization Between Frequency Bands)

Here, the synchronization between frequency bands will be described more specifically. As the synchronization between the frequency bands, there are synchronization in a time direction (hereinafter referred to as "time synchronization") and synchronization in a frequency direction (hereinafter referred to as "frequency synchronization"). Hereinafter, specific examples of this point will be described with reference to FIGS. 8 and 9.

Figure 8:
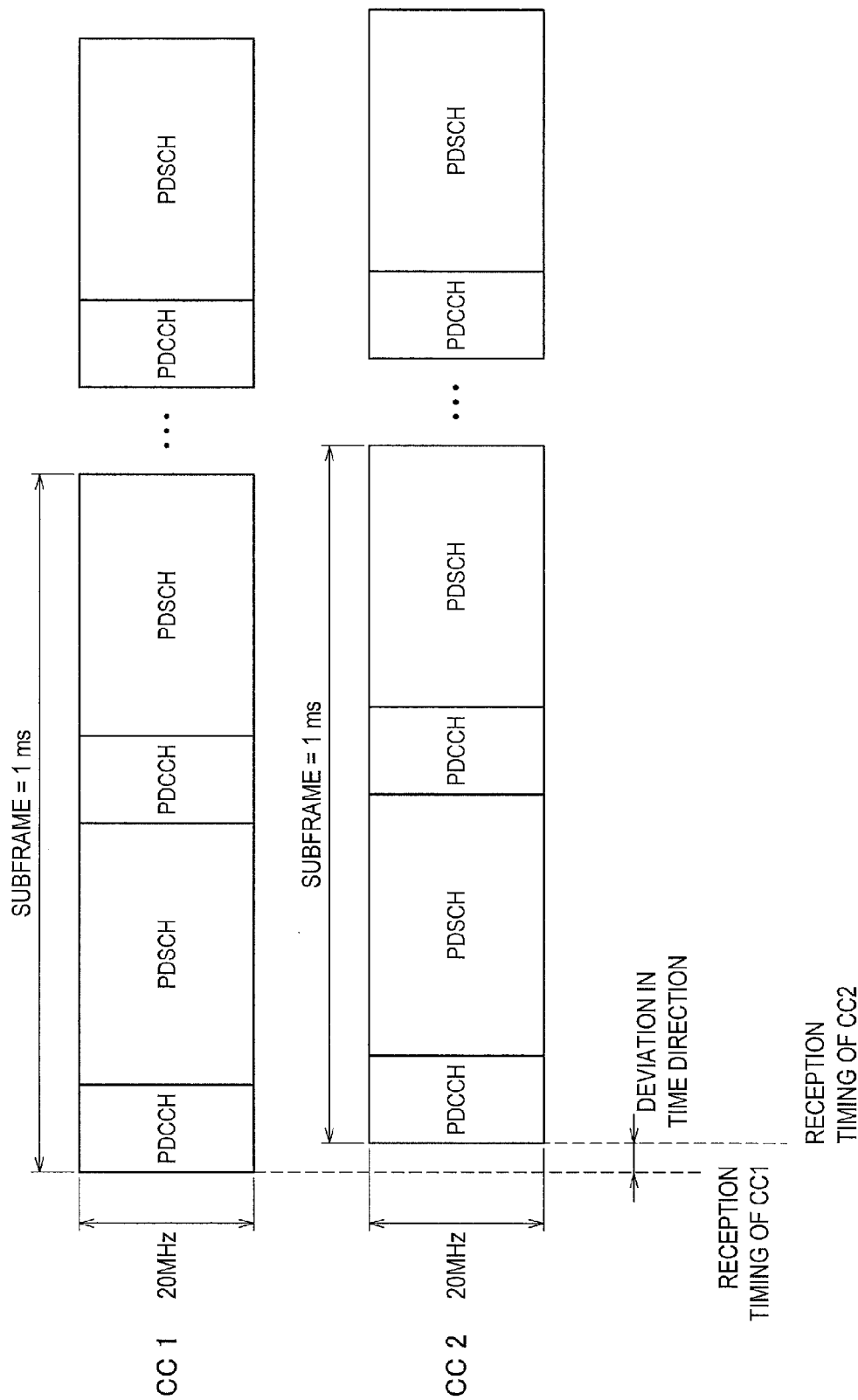
FIG. 8 is an explanatory diagram illustrating time synchronization between component carriers.

FIG. 8 is an explanatory diagram illustrating the time synchronization between component carriers. Referring to FIG. 8, reception timings of the CC 1 and the CC 2 are illustrated. For example, as in the example illustrated in FIG. 8, deviation can occur in the time direction between the reception timing of a signal with the CC 1 in the UE and the reception timing with the CC 2 in the UE. For example, when the deviation in the time direction is less than a guard interval length of the OFDM, the CC 1 and the CC 2 can be considered to be mutually synchronized in the time direction.

Figure 9:
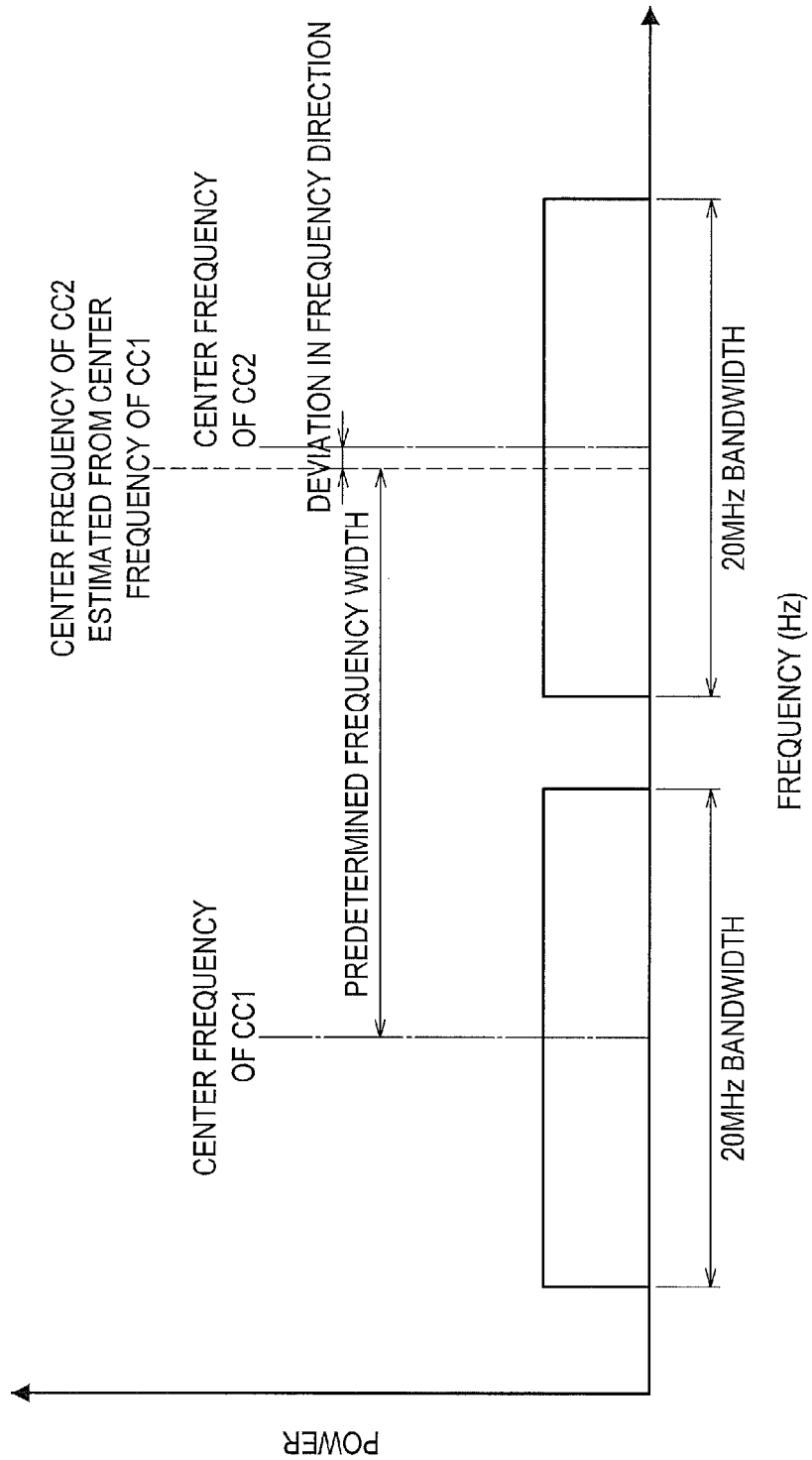
FIG. 9 is an explanatory diagram illustrating frequency synchronization between component carriers.

FIG. 9 is an explanatory diagram illustrating frequency synchronization between component carriers. Referring to FIG. 9, the frequency band of the CC 1 and the frequency band of the CC 2 are illustrated. A center frequency of the CC 1 and a center frequency of the CC 2 are also illustrated. The center frequency of the CC 1 is separated from the center frequency of the CC 2 by a predetermined frequency width. However, in practice, for example, deviation can occur in the frequency direction between the center frequency of the CC 2 and a frequency separated from the center frequency of the CC 1 by the predetermined frequency width. For example, when the deviation in the frequency direction is within a predetermined frequency width (for example, 500 Hz in LTE), the CC 1 and the CC 2 can be considered to be mutually synchronized in the frequency direction.

As described above, the synchronization between the frequency bands includes the time synchronization and the frequency synchronization. Therefore, there are the following four cases of the synchronization between the frequency bands:

Case 1: both the time synchronization and the frequency synchronization are achieved;

Case 2: the time synchronization is achieved, but the frequency synchronization is not achieved;

Case 3: the time synchronization is not achieved, but the frequency synchronization is achieved; and Case 4: neither the time synchronization nor the frequency synchronization is achieved.

In general, the mutually synchronized frequency bands are the frequency bands corresponding to Case 1. However, the frequency bands corresponding to Case 2 or Case 3 may be considered to be the mutually synchronized frequency bands (in the time direction or the frequency direction).

(Synchronization on eNodeB Side and Synchronization on UE Side)

From a different viewpoint, as the synchronization between the frequency bands, there are synchronization on an eNodeB side (that is, a network side) and synchronization in a UE. Further, even when the time synchronization and the frequency synchronization are achieved for two CCs on the eNodeB side, it is not clear that the time synchronization and the frequency synchronization are achieved on the UE side when the UE receives signals in the two CCs.

For example, when the CC 1 and the CC 2 are separated in the frequency direction, a propagation path of the CC 1 and a propagation path of the CC 2 are different. As a result, arrival times of the signals may be different. In this case, the time synchronization is not achieved.

For example, a radio wave of the CC 1 and a radio wave of the CC 2 can arrive at the UE from different directions. In this case, when the UE moves in the arrival direction of the radio wave of the CC 1, the frequency of the CC 1 transitions from a frequency f to a frequency f+Δf by the Doppler effect. Further, when the UE moves in a direction opposite to the arrival direction of the radio wave of the CC 2, the frequency band of the CC 2 transitions from a frequency f to a frequency f−Δf due to the Doppler effect. In this way, the frequency synchronization is not achieved due to the Doppler effect.

As described above, since the time synchronization and the frequency synchronization may not be achieved, it is not clear that the two CCs are mutually synchronized on the UE side even if the two CCs are synchronized on the network side.

<2.2 Technical Problems>

Next, technical problems will be described.

Utilization of Synchronization Result

In Release 11 of 3GPP, as described above, NCTs have been investigated as new component carriers apart from legacy CCs (existing CCs) capable of maintaining backward compatibility. Here, the NCTs are assumed to be new types of CCs and the CCs of the types. Further, an NCT (SNCT) synchronized with the legacy CC and an NCT (UNCT) not synchronized with the legacy CC have been investigated as the NCTs.

Because the SNCT is synchronized with any legacy CC, when a UE establishes synchronization in one CC between the mutually synchronized SNCT and legacy CC, a synchronization result of the UE in the one CC can be utilized for the other CC. That is, the UE may not establish separate synchronization with a synchronization signal in the other CC.

The UNCT is not synchronized with any legacy CC, but can be synchronized with different UNCTs. When the UE establishes synchronization in one CC among two or more mutually synchronized UNCTs, a synchronization result of the UE in the one CC can be utilized for the different CCs. That is, the UE does not have to establish separate synchronization with a synchronization signal in the other CCs.

Load for use of Synchronization Result

However, in order for the UE to use the synchronization result of the UE in a certain CC for another CC, there is a concern of a large load being applied to the UE.

For example, since a frequency band separate from the SNCT can be present in the legacy CC, the SNCT is not synchronized with all of the legacy CCs. Therefore, the UE verifies the synchronization regarding various combinations between the SNCT and legacy CCs in order to use the synchronization result of the UE in the legacy CC for the SNCT. In this way, a large load may be applied to the UE.

For example, there is a possibility of the UNCT being synchronized with another UNCT, but not all of the UNCTs are necessarily synchronized. Therefore, the UE verifies the synchronization regarding various combinations between the UNCTs in order to use the synchronization result of the UE in a certain UNCT for another UNCT. In this way, a large load may be applied to the UE.

In particular, when a macro cell and a small cell partially or entirely overlapping with the macro cell are present, the number of combinations of the synchronizable CC is considerably large. Therefore, a larger load may be applied to the UE in order to verify the synchronization.

Originally, when the UE does not use a synchronization result of a UE in a certain CC for a different CC, it is necessary to establish synchronization with a synchronization signal in each CC. In this way, a large load may be applied to the UE.

Supply of Information Indicating Synchronization Relationship

Based on the above description, the inventors of the present specification conceived of supplying information indicating a synchronization relationship (that is, which CCs are mutually synchronized) between CCs to a UE.

As described above, even when two CCs are mutually synchronized on the network side, it is not clear that the two CCs are mutually synchronized on the UE side. Therefore, even when the UE comprehends the synchronization relationship, the UE actually verifies the synchronization. Nonetheless, when the UE comprehends the synchronization relationship (in other words, candidates of pairs of synchronized CCs), it is possible to reduce resources of time and calculation consumed to verify the synchronization. Therefore, it is useful to provide information indicating the synchronization relationship to the UE.

However, even when the information indicating the synchronization relationship is reported to the UE, valuable radio resources in a macro cell may be consumed when a considerable amount of information is supplied by the macro cell.

Accordingly, an embodiment of the present disclosure makes it possible to suppress consumption of radio resources of a macro cell while reducing a load in a UE in carrier aggregation when the macro cell and a small cell are deployed.

3. SCHEMATIC CONFIGURATION OF COMMUNICATION SYSTEM ACCORDING TO EMBODIMENT

Figure 10:
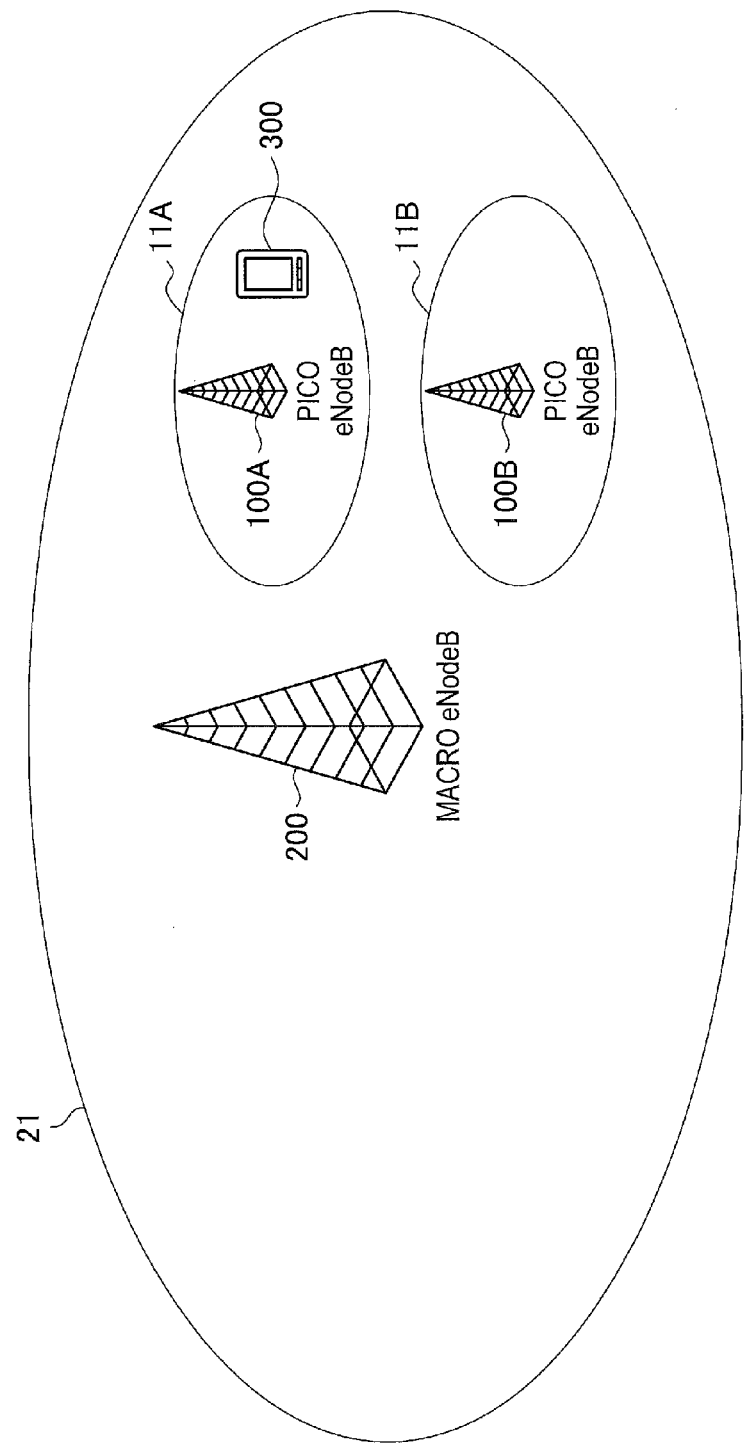
FIG. 10 is an explanatory diagram illustrating an example of a schematic configuration of a communication system according to an embodiment.

Next, a schematic configuration of a communication system according to an embodiment of the present disclosure will be described with reference to FIG. 10. FIG. 10 is an explanatory diagram illustrating an example of the schematic configuration of a communication system 1 according to the embodiment. Referring to FIG. 1, the communication system 1 includes pico eNodeBs 100, a macro eNodeB 200, and a UE 300. For example, the communication system 1 is a system that conforms to LTE-Advanced.

(Pico eNodeB 100)

The pico eNodeB 100 performs radio communication with the UE 300 located in the pico cell 11 partially or entirely overlapping with the macro cell 21. The pico eNodeB 100 performs the radio communication using a plurality of component carriers (CCs).

For example, the plurality of same CCs are used between different pico cells 11 (different pico eNodeBs 100). Specifically, for example, the pico eNodeB 100A and the pico eNodeB 100B perform radio communication using the plurality of same CCs.

The pico eNodeB 100 can simultaneously use the plurality of CCs for radio communication with one UE 300. That is, the pico eNodeB 100 supports the carrier aggregation.

For example, the plurality of CCs used in the pico cells 11 include one or more CCs with which the CRS is not transmitted in at least one subframe among subframes which are units of times in the radio communication. More specifically, for example, the plurality of CCs include at least one NCT.

In the embodiment, the pico cells 11 are deployed as in the first deployment scenario (that is, Deployment Scenario 1) or the second deployment scenario (that is, Deployment Scenario 2).

(Macro eNodeB 200)

The macro eNodeB 200 performs radio communication with the UE 300 located in the macro cell 21. The macro eNodeB 200 performs the radio communication using one or more CCs. For example, each of the one or more CCs is the CC different from any of the plurality of CCs used in the pico cells 11. For example, the one or more CCs are a plurality of CCs. That is, the macro eNodeB 200 also performs radio communication using the plurality of CCs.

For example, the plurality of same CCs are used between different macro cells 21 (different macro eNodeBs 200). Specifically, for example, the macro eNodeBs 200 in two mutually adjacent macro cells 21 perform radio communication using the plurality of same CCs.

For example, the macro eNodeB 200 can simultaneously use a plurality of CCs for radio communication with one UE 300. That is, the macro eNodeB 200 supports the carrier aggregation.

For example, the plurality of CCs used in the macro cells 21 include one or more CCs with which the CRS is not transmitted in at least one subframe among subframes which are units of times in the radio communication. More specifically, for example, the plurality of CCs include at least one NCT.

(UE 300)

The UE 300 performs radio communication with the pico eNodeB 100 in the pico cell 11. The UE 300 performs radio communication with the macro eNodeB 200 in the macro cell 21.

The UE 300 can simultaneously use a plurality of CCs for the radio communication. Specifically, for example, the UE 300 can simultaneously use the plurality of CCs to perform the radio communication with the pico eNodeB 100 or the macro eNodeB 200. That is, the UE 300 supports the carrier aggregation.

4. CONFIGURATION OF EACH DEVICE

Next, the configuration of each device included in the communication system 1 according to the embodiment of the present disclosure will be described with reference to FIGS. 11 to 16.

<4.1. Configuration of Pico eNodeB>

Figure 11:
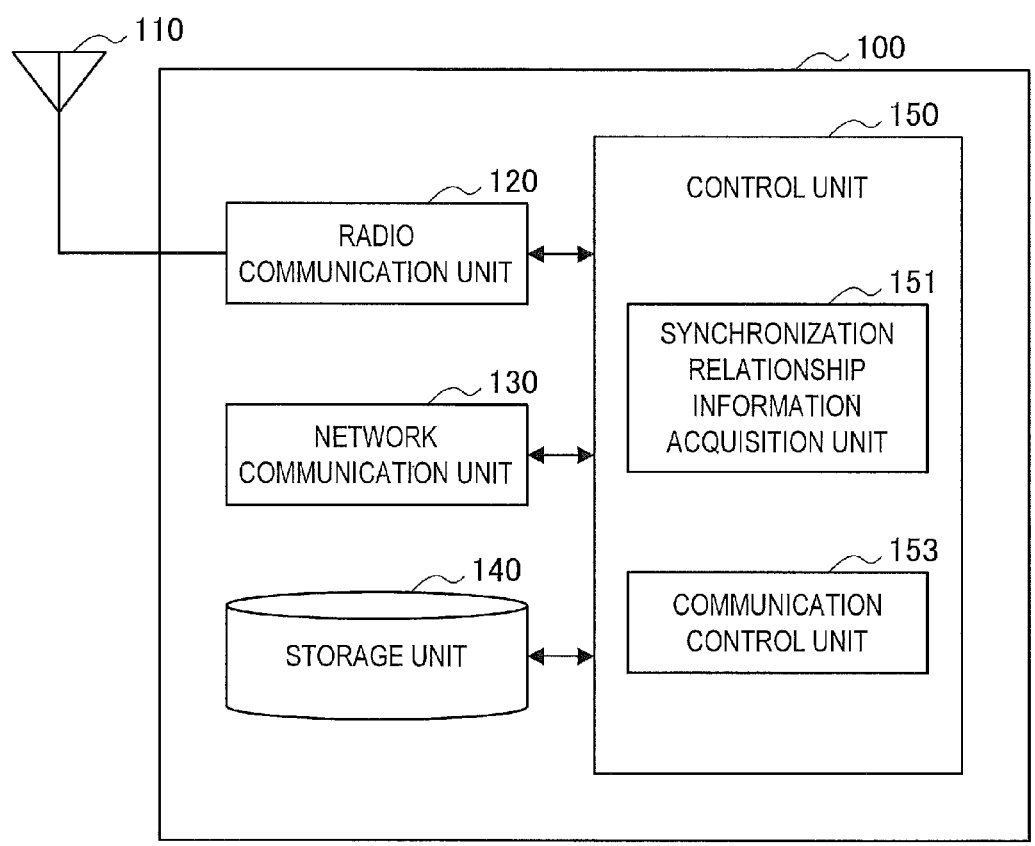
FIG. 11 is a block diagram illustrating an example of the configuration of a pico eNodeB according to the embodiment.

First, the configuration of the pico eNodeB 100 according to the embodiment will be described with reference to FIGS. 1 to 13. FIG. 11 is a block diagram illustrating an example of the configuration of the pico eNodeB 100 according to the embodiment. Referring to FIG. 11, the pico eNodeB 100 includes an antenna unit 110, a radio communication unit 120, a network communication unit 130, a storage unit 140, and a control unit 150.

(Antenna Unit 110)

The antenna unit 110 receives a radio signal and outputs the received radio signal to the radio communication unit 120. The antenna unit 110 transmits a transmission signal output by the radio communication unit 120.

(Radio Communication Unit 120)

The radio communication unit 120 performs the radio communication with the UE 300 located in the pico cell 11. For example, the radio communication unit 120 performs the radio communication simultaneously using the plurality of CCs. For example, the plurality of CCs are frequency bands different from the CCs used in the macro cell 21. For example, the plurality of CCs include one or more NCTs.

For example, the radio communication unit 120 can perform the radio communication with one UE 300 simultaneously using the plurality of CCs. That is, the pico eNodeB 100 supports carrier aggregation.

(Network Communication Unit 130)

The network communication unit 130 communicates with another communication node. For example, the network communication unit 130 communicates with the macro eNodeB 200, another pico eNodeB 100, a mobility management entity (MME), or the like.

(Storage Unit 140)

The storage unit 140 stores a program and data for an operation of the pico eNodeB 100.

For example, the storage unit 140 stores the synchronization relationship information indicating which CCs are mutually synchronized among the plurality of CCs used for the radio communication.

(Control Unit 150)

The control unit 150 supplies various functions of the pico eNodeB 100.

The control unit 150 includes a synchronization relationship information acquisition unit 151 and a communication control unit 153.

(Synchronization Relationship Information Acquisition Unit 151)

The synchronization relationship information acquisition unit 151 acquires synchronization relationship information indicating which CCs are mutually synchronized among the plurality of CCs (that is, a synchronization relationship between the CCs).

Kinds of Synchronization Relationship Information which can be Supplied to UE

First, kinds of synchronization relationship information which can be supplied by the serving pico eNodeB 100A or the serving macro eNodeB 200 in the certain UE 300 in the communication system 1 will be described with reference to FIG. 12.

Figure 12:
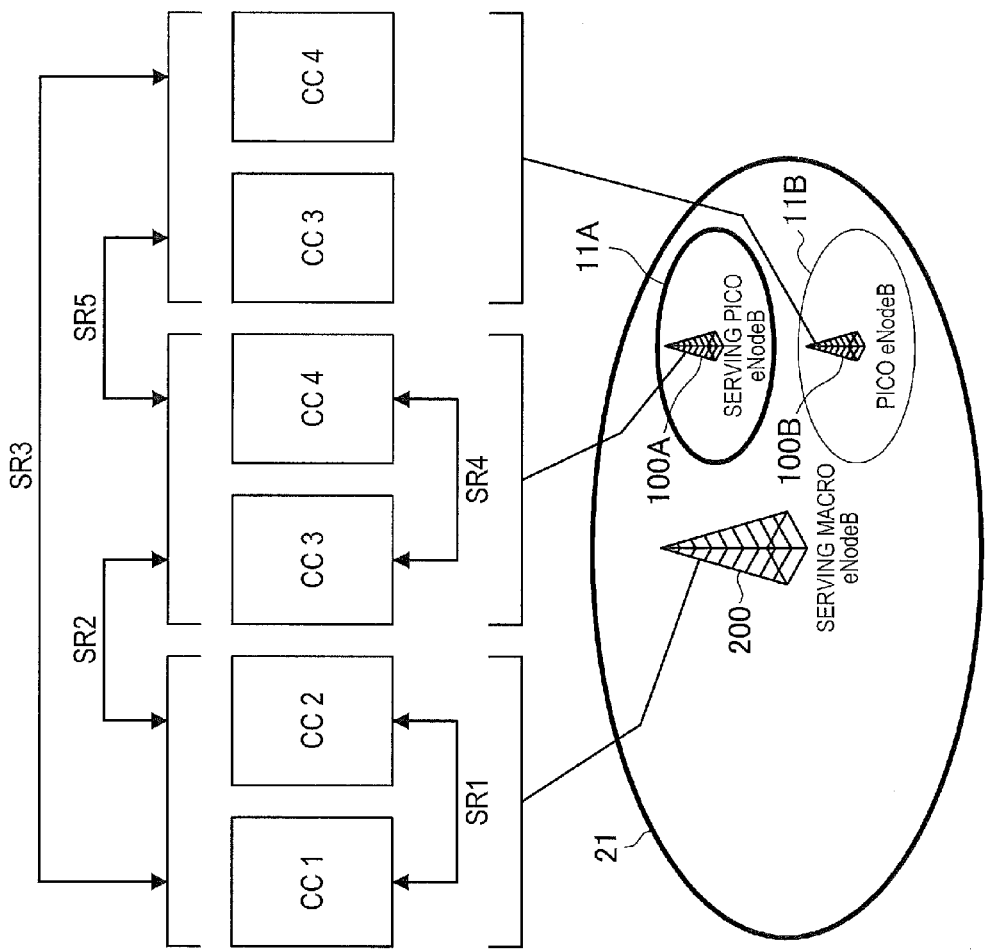
FIG. 12 is an explanatory diagram illustrating examples of kinds of suppliable synchronization relationship information.

FIG. 12 is an explanatory diagram illustrating examples of kinds of suppliable synchronization relationship information. Referring to FIG. 12, the pico eNodeBs 100, the pico cells 11, the macro eNodeB 200, and the macro cell 21 are illustrated as in FIG. 10. In this example, the UE 300 is located in the pico cell 11A, the pico cell 11A is a serving pico cell for the UE 300, and the macro cell 21 is a serving macro cell for the UE 300. In FIG. 12, two CCs (CC 1 and CC 2) used for the macro cell 21 and two CCs (CC 3 and CC 4) used for each pico cell 11 are illustrated. For example, in this way, different CCs are used between the macro cell 21 and the pico cells 11 and the same CCs are used between the pico cells 11.

In the deployment of these cells, for example, information indicating the following kinds of synchronization relationships (SR) can be supplied by the pico eNodeB 100A or the macro eNodeB 200:

SR1: a synchronization relationship between the CCs of the serving macro cell 21;

SR2: a synchronization relationship between the CCs of the serving macro cell 21 and the CCs of the serving pico cell 11A;

SR3: a synchronization relationship between the CCs of the serving macro cell 21 and the CCs of the other pico cell 11B overlapping with the serving macro cell 21;

SR4: a synchronization relationship between the CCs of the serving pico cell 11A; and SR5: a synchronization relationship between the CCs 11A of the serving pico cell and the CCs of the other pico cell 11B overlapping with the serving macro cell 21.

Acquisition of Synchronization Relationship Information SR4

First, in particular, in the embodiment, the synchronization relationship information acquisition unit 151 of the pico eNodeB 100A acquires the synchronization relationship information indicating which CCs are mutually synchronized among the plurality of CCs used for the pico cell 11A. That is, the synchronization relationship information acquisition unit 151 acquires the synchronization relationship information (hereinafter referred to as "SR4 information") indicating the SR4 among the synchronization relationships illustrated in FIG. 12.

More specifically, for example, the synchronization relationship information acquisition unit 151 of the pico eNodeB 100A acquires the synchronization relationship information (that is, the SR4 information) indicating which CCs are mutually synchronized between the CC 3 and the CC 4 of the pico cell 11A. For example, when the CC 3 and the CC 4 of the pico cell 11A are mutually synchronized, the SR4 information indicates that the CC 3 and the CC 4 of the pico cell 11A are mutually synchronized.

SR5

Second, for example, the synchronization relationship information acquisition unit 151 of the pico eNodeB 100A acquires the synchronization relationship information indicating which CC of the plurality of CCs used for the pico cell 11A is synchronized with which CC of one or more CCs used for different cells other than the macro cell 21 and the pico cell 11A.

For example, the different cells include the different pico cell 11B partially or entirely overlapping with the macro cell 21. That is, the synchronization relationship information acquisition unit 151 acquires synchronization relationship information (hereinafter referred to as "SR5 information") indicating the SR5 among the synchronization relationships illustrated in FIG. 12.

More specifically, for example, the synchronization relationship information acquisition unit 151 of the pico eNodeB 100A acquires the synchronization relationship information (that is, the SR5 information) indicating which CC of the CC 3 and the CC 4 of the pico cell 11A is synchronized with which CC of the CC 3 and the CC 4 of the pico cell 11B. For example, when the CC 3 of the pico cell 11A and the CC 4 of the pico cell 11B are mutually synchronized, the SR5 information indicates that the CC 3 of the pico cell 11A and the CC 4 of the pico cell 11B are mutually synchronized. Further, when the CC 4 of the pico cell 11A and the CC 3 of the pico cell 11B are mutually synchronized, the SR5 information indicates that the CC 3 of the pico cell 11A and the CC 3 of the pico cell 11B are mutually synchronized.

For example, as described above, the synchronization relationship information acquisition unit 151 acquires the SR4 information and the SR5 information as the synchronization relationship information. The SR4 information and the SR5 information are stored in the storage unit 140, and the synchronization relationship information acquisition unit 151 acquires the SR4 information and the SR5 information from the storage unit 140.

(Communication Control Unit 153)

The communication control unit 153 controls the radio communication in the pico cell 11. For example, the communication control unit 153 supplies control information to the UE 300 located in the pico cell 11.

Supply of Synchronization Relationship Information

In particular, in the embodiment, the communication control unit 153 supplies the synchronization relationship information indicating the synchronization relationship between the plurality of CCs in the pico cell 11. In other words, the communication control unit 153 supplies the synchronization relationship information to the UE 300 located in the pico cell 11.

SR4

First, the communication control unit 153 of the pico eNodeB 100A supplies, in the pico cell 11A, the synchronization relationship information (that is, the SR4 information) indicating which CCs are mutually synchronized among the plurality of CCs used for the pico cell 11A.

The SR4 information is not supplied in the macro cell 21 by the macro eNodeB 200.

The supply of the SR4 information results in a reduction in a load of the UE 300 in the carrier aggregation when the macro cell 21 and the pico cells 11 are deployed. That is, when the SR4 information is not supplied to the UE 300, the UE 300 can separately verify all of the synchronization relationships between the CCs used for the pico cell 11. Conversely, when the SR4 information is supplied to the UE 300, the UE 300 may verify only the restricted synchronization relationships. For this reason, the supply of the SR4 information can result in the reduction in the load of the UE 300.

The SR4 information is not supplied by the macro eNodeB 200 but is supplied by the pico eNodeB 100. Thus, radio resources of the macro cell 21 are not used to supply the SR4 information. That is, the supply of the SR4 information by the pico eNodeB 100 can result in suppression of consumption of the radio resources of the macro cell 21.

SR5

Second, for example, the communication control unit 153 of the pico eNodeB 100A supplies, in the pico cell 11, the synchronization relationship information indicating which CC of the plurality of CCs used for the pico cell 11A is synchronized with which CC of one or more CCs used for different cells other than the macro cell 21 and the pico cell 11A.

For example, the different cells are different pico cells 11 partially or entirely overlapping with the macro cell 21. For example, the plurality of CCs are used for the different pico cells 11. That is, the communication control unit 153 of the pico eNodeB 100A supplies the synchronization relationship information (that is, the "SR5 information") indicating which CC of the plurality of CCs used for the pico cell 11A is synchronized with which CC of the plurality of CCs used for the pico cell 11B.

For example, the SR5 information is not supplied in the macro cell 21 by the macro eNodeB 200.

The supply of the SR5 information can result in the reduction in the load of the UE 300 in the carrier aggregation when the macro cell 21 and the pico cell 11 are deployed. For example, when two pico cells 11 are adjacent and the UE 300 is located near the boundary of the two pico cells, the UE 300 can also perform the radio communication simultaneously using the CC of one pico cell 11 and the CC of the other pico cell 11. For example, even when two pico cells 11 overlap and separate CCs are used between the two pico cells 11, the UE 300 can also perform the radio communication simultaneously using the CC of one pico cell 11 and the CC of the other pico cell 11. In this case, when the SR5 information is not supplied to the UE 300, the UE 300 can separately verify all of the synchronization relationships between the CCs used for one pico cell 11 and the CCs used for the other pico cell 11. Conversely, when the SR5 information is supplied to the UE 300, the UE 300 may verify only the restricted synchronization relationships. For this reason, the supply of the SR5 information can result in the reduction in the load of the UE 300.

The SR5 information is not supplied by the macro eNodeB 200 but is supplied by the pico eNodeB 100. Thus, radio resources of the macro cell 21 are not used to supply the SR5 information. That is, the supply of the SR5 information by the pico eNodeB 100 can result in suppression of consumption of the radio resources of the macro cell 21.

SR1, SR2, and SR3

On the other hand, for example, synchronization relationship information (hereinafter referred to as "macro SR information") indicating which CC of one or more different CCs used for the macro cell 21 is synchronized with which CC is supplied in the macro cell 21 by the macro eNodeB 200. For example, the macro SR information is not supplied in the pico cell 11 by the pico eNodeB 100 (the communication control unit 153).

SR2 and SR3

For example, the macro SR information indicates which CC of one or more different CCs used for the macro cell 21 is synchronized with which CC of the plurality of CCs used for the pico cell 11. That is, the macro SR information includes synchronization relationship information (hereinafter referred to as "SR2 information") indicating the SR2 among the synchronization relationships illustrated in FIG. 12. In other words, the SR2 information is supplied in the macro cell 21 by the macro eNodeB 200 and is not supplied in the pico cell 11A by the pico cell eNodeB 100A.

As in the SR2 information, synchronization relationship information (hereinafter referred to as "SR3 information") indicating the SR3 can also be supplied in the macro cell 21 by the macro eNodeB 200. The SR3 information is not supplied in the pico cell 11A by the pico eNodeB 100A.

SR1

For example, the one or more different CCs used for the macro cell 21 include two or more CCs, and the macro SR information indicates which CCs are mutually synchronized among the one or more different CCs. That is, the macro SR information includes synchronization relationship information (hereinafter referred to as "SR1 information") indicating the SR1 among the synchronization relationships illustrated in FIG. 12. That is, the SR1 information is supplied in the macro cell 21 by the macro eNodeB 200 and is not supplied in the pico cell 11 by the pico eNodeB 100.

As described above, the various kinds of synchronization relationship information are supplied in the pico cells 11 or not supplied. Hereinafter, the kinds of synchronization relationship information supplied by the serving pico eNodeB 100A and the kinds of synchronization relationship information that are not supplied will be confirmed with reference to FIG. 13.

Figure 13:
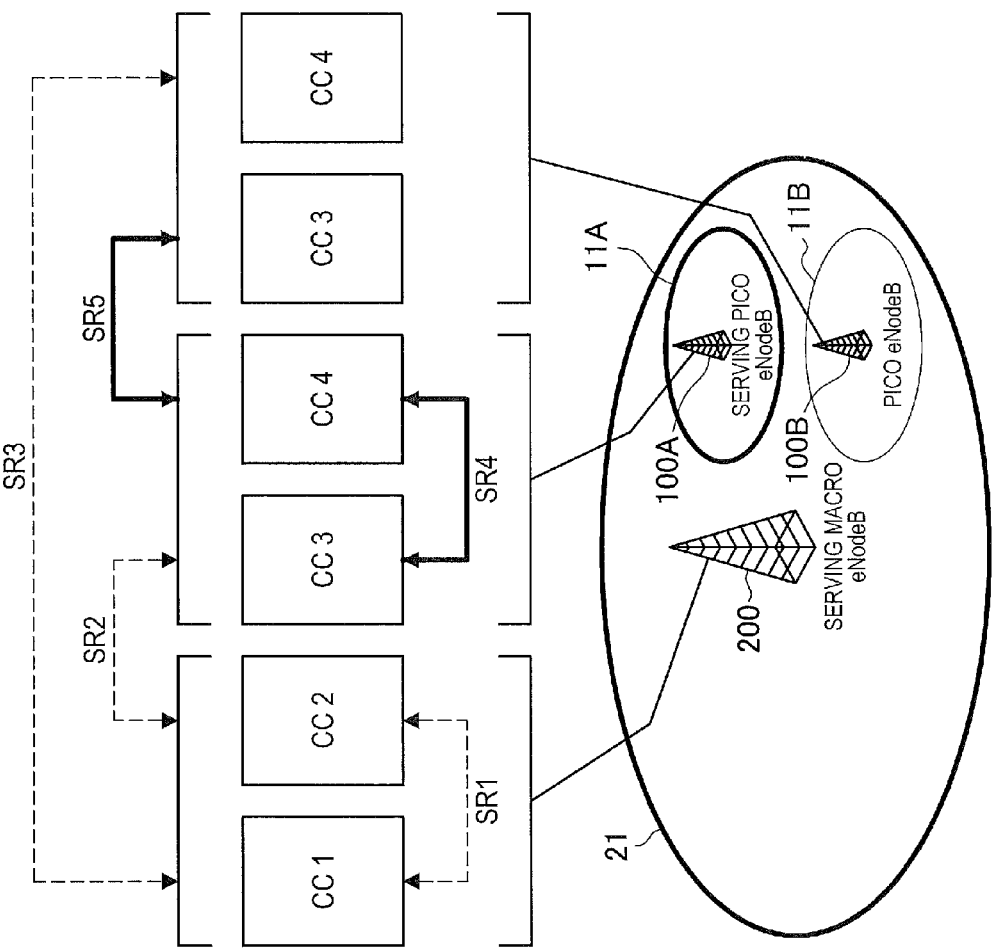
FIG. 13 is an explanatory diagram illustrating examples of kinds of synchronization relationship information supplied by a serving pico eNodeB.

FIG. 13 is an explanatory diagram illustrating examples of kinds of synchronization relationship information supplied by a serving pico eNodeB 100A. As illustrated in FIG. 13, for example, the serving pico eNodeB 100A (the communication control unit 153) supplies the SR4 information and the SR5 information in the pico cell 11A. Conversely, serving pico eNodeB 100A (the communication control unit 153) does not supply the SR1 information, the SR2 information, and the SR3 information in the pico cell 11A.

Supply Method for Synchronization Relationship Information

As a specific supply method, for example, the communication control unit 153 supplies the synchronization relationship information via the radio communication unit 120 using the system information. More specifically, for example, the communication control unit 153 generates the system information including the SR4 information and the SR5 information and causes the radio communication unit 120 to transmit the system information in the pico cell 11. The communication control unit 153 may transmit the SR4 information and the SR5 information to the UE using the RRC signaling in the pico cell 11.

Supply Order of Synchronization Relationship Information

For example, the communication control unit 153 supplies two or more kinds of synchronization relationship information in an order according to importance of the kinds of information. The two or more kinds of synchronization relationship information include the SR4 information. Further, the two or more kinds of synchronization relationship information include the SR5 information.

For example, the SR4 information and the SR5 information are transmitted using the system information. In this case, the communication control unit 153 generates the system information so that the SR4 information and the SR5 information are lined up in the system information in the order according to the importance of the SR4 information and the importance of the SR5 information. For example, the importance of the SR4 information is higher than the importance of the SR5 information. In this case, the communication control unit 153 generates the system information so that the SR4 information and the SR5 information are lined up in this order. Then, the communication control unit 153 causes the radio communication unit 120 to transmit the system information.

The various kinds of synchronization relationship information are supplied in the order according to the importance in this way. Thus, the UE 300 can verify the synchronization relationships in order from the synchronization relationship with the high importance. As a result, it is possible to reduce a process in which the UE 300 can establish the synchronization.

The SR4 information and the SR5 information may be transmitted using the RRC signaling. When the SR4 information and the SR5 information are transmitted at the same time, as in the example of the system information, the SR4 information and the SR5 information may be lined up in the order according to the importance in the transmitted information. On the other hand, when the SR4 information and the SR5 information are separately transmitted, the SR4 information and the SR5 information may be supplied using the RRC signaling in the order according to the importance of the SR4 information and the importance of the SR5 information.

Supply of Supply Spot Information

For example, the communication control unit 153 supplies, in the pico cell 11, information (hereinafter referred to as "supply spot information") indicating a spot between the macro cell 21 and the pico cell 11 where each of the two or more kinds of synchronization relationship information is supplied.

Specifically, for example, the communication control unit 153 supplies the supply spot information indicating that the SR4 information and the SR5 information are transmitted in the pico cell 11 and the SR1 information, the SR2 information, and the SR3 information are transmitted in the macro cell 21.

As a specific supply method, for example, when the UE 300 is in RRC_Connected in the pico cell 11, the communication control unit 153 supplies the supply spot information to the UE 300 via the radio communication unit 120 using the RRC signaling. The supply spot information may be supplied using the system information.

When the supply spot information is supplied, the UE 300 can comprehend where the UE 300 may acquire the various kinds of synchronization relationship information between the macro cell 21 and the pico cell 11. Therefore, it is not necessary for the UE 300 to search for the synchronization relationship information in both of the macro cell 21 and the pico cell 11. For example, when the necessary synchronization relationship information is supplied in one of the pico cell 11 and the macro cell 21, the synchronization relationship information may be acquired only in the one cell, and thus a process performed to acquire the synchronization relationship information is reduced.

<4.2. Configuration of Macro eNodeB>

Figure 14:
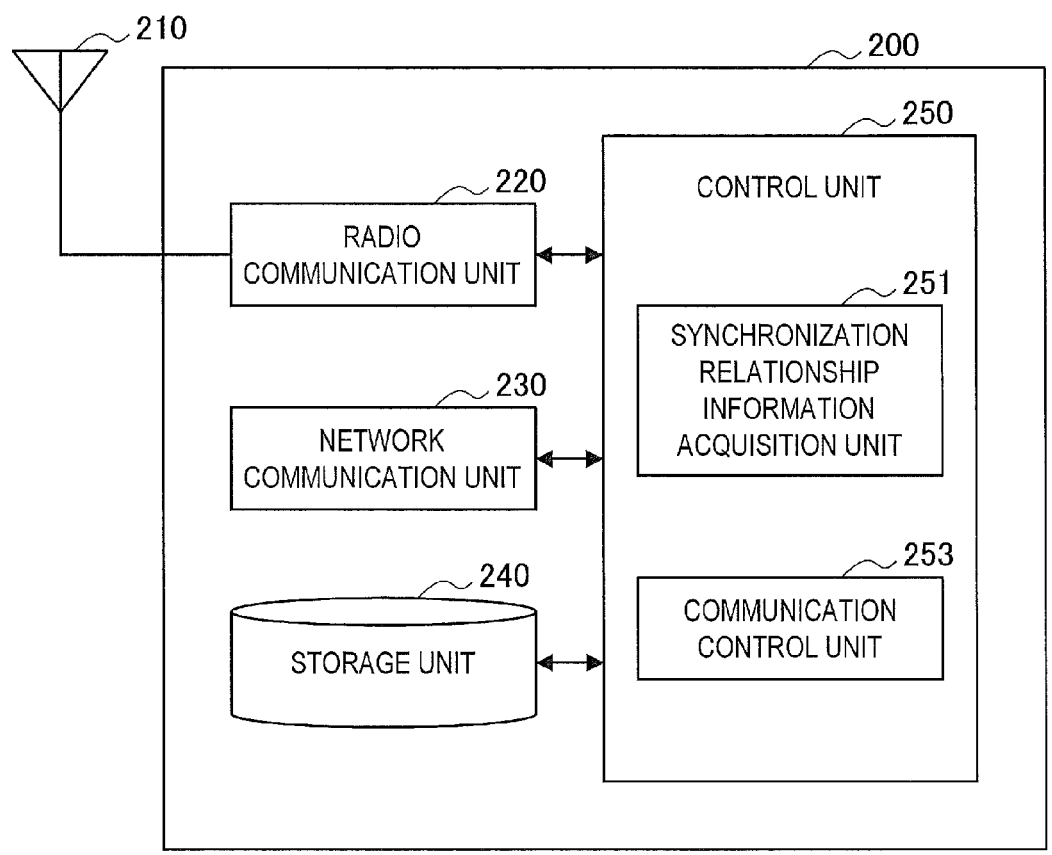
FIG. 14 is a block diagram illustrating an example of the configuration of a macro eNodeB according to the embodiment.

Next, the example of the configuration of the macro eNodeB 200 according to the present embodiment will be described with reference to FIGS. 14 and 15. FIG. 14 is a block diagram illustrating an example of the configuration of the macro eNodeB 200 according to the present embodiment. Referring to FIG. 14, the macro eNodeB 200 includes an antenna unit 210, a radio communication unit 220, a network communication unit 230, a storage unit 240, and a control unit 250.

(Antenna Unit 210)

The antenna unit 210 receives a radio signal and outputs the received radio signal to the radio communication unit 220. The antenna unit 210 transmits the transmitted signal output by the radio communication unit 220.

(Radio Communication Unit 220)

The radio communication unit 220 performs the radio communication with the UE 300 located in the macro cell 21. For example, the radio communication unit 220 performs the radio communication simultaneously using the plurality of CCs. For example, the plurality of CCs are frequency bands different from the CCs used in the pico cell 11. For example, the plurality of CCs include one or more NCTs.

For example, the radio communication unit 220 can perform the radio communication with one UE 300 simultaneously using the plurality of CCs. That is, the macro eNodeB 200 supports carrier aggregation.

(Network Communication Unit 230)

The network communication unit 230 communicates with other communication nodes. For example, the network communication unit 230 communicates with the pico eNodeB 100, other macro eNodeB 200 and MME, and the like.

(Storage Unit 240)

The storage unit 240 stores a program and data for an operation of the macro eNodeB 200.

For example, the storage unit 240 stores the synchronization relationship information indicating which CCs are mutually synchronized among the plurality of CCs used for the radio communication.

(Control Unit 250)

The control unit 250 supplies various functions of the macro eNodeB 200.

The control unit 250 includes a synchronization relationship information acquisition unit 251 and a communication control unit 253.

(Synchronization Relationship Information Acquisition Unit 251)

The synchronization relationship information acquisition unit 251 acquires synchronization relationship information indicating which CCs are mutually synchronized among the plurality of CCs (that is, a synchronization relationship between the CCs).

For example, the synchronization relationship information acquisition unit 251 acquires synchronization relationship information (that is, macro SR information) indicating which CC is synchronized with which CC among one or more CCs used for the macro cell 21.

SR2 and SR3

For example, the macro SR information indicates which CC of one or more different CCs used for the macro cell 21 is synchronized with which CC of the plurality of CCs used for the pico cell 11. That is, the macro SR information includes synchronization relationship information (hereinafter referred to as "SR2 information") indicating the SR2 and synchronization relationship information (hereinafter referred to as "SR3 information") indicating the SR3 among the synchronization relationships illustrated in FIG. 12.

More specifically, for example, the synchronization relationship information acquisition unit 251 acquires the synchronization relationship information (that is, the SR2 information and the SR3 information) indicating which CC of the CC 1 and the CC 2 of the macro cell 21 is synchronized with which CC of the CC 3 and the CC 4 of one or more pico cells 11. For example, when the CC 1 of the macro cell 21 is synchronized with the CC 3 of the pico cell 11A, the SR2 information indicates that the CC 1 of the macro cell 21 is synchronized with the CC 3 of the pico cell 11A.

SR1

For example, the one or more CCs used for the macro cell 21 include two or more CCs, and the macro SR information indicates which CCs are mutually synchronized among the one or more different CCs. That is, the macro SR information includes the synchronization relationship information (hereinafter referred to as "SR1 information") indicating SR1 among the synchronization relationships illustrated in FIG. 12.

More specifically, for example, the synchronization relationship information acquisition unit 251 acquires the synchronization relationship information (that is, the SR1 information) indicating which CCs are mutually synchronized between the CC 1 and the CC 2 of the macro cell 21. For example, when the CC 1 and the CC 2 of the macro cell 21 are mutually synchronized, the SR1 information indicates that the CC 1 and the CC 2 of the macro cell 21 are mutually synchronized.

For example, as described above, the synchronization relationship information acquisition unit 251 acquires the SR1 information, the SR 2 information, and the SR3 information as the synchronization relationship information. The SR1 information, the SR 2 information, and the SR3 information are stored in the storage unit 240, and the synchronization relationship information acquisition unit 251 acquires the SR1 information, the SR 2 information, and the SR3 information from the storage unit 240.

(Communication Control Unit 253)

The communication control unit 253 controls the radio communication in the macro cell 21. For example, the communication control unit 253 supplies control information to the UE 300 located in the macro cell 21.

Supply of Synchronization Relationship Information

In particular, in the embodiment, the communication control unit 253 supplies the synchronization relationship information indicating the synchronization relationship between the plurality of CCs in the macro cell 21. In other words, the communication control unit 253 supplies the synchronization relationship information to the UE 300 located in the macro cell 21.

SR1, SR2, and SR3

For example, the communication control unit 253 supplies, in the macro cell 21, synchronization relationship information (that is, the macro SR information) indicating which CC is synchronized with which CC among one or more CCs used for the macro cell 21.

For example, the macro cell SR information is not supplied in the pico cell 11 by the pico eNodeB 100.

SR2 and SR3

As described above, for example, the macro SR information indicates which CC of one or more different CCs used for the macro cell 21 is synchronized with which CC of the plurality of CCs used for the pico cell 11. That is, the macro SR information includes the SR2 information and the SR3 information. Therefore, the communication control unit 253 supplies the SR2 information and the SR3 information in the macro cell 21.

The supply of the SR2 information and the SR3 information can result in a reduction in a load of the UE 300 in the carrier aggregation when the macro cell 21 and the pico cell 11 are deployed. For example, the UE 300 can also perform the radio communication simultaneously using the CC of the pico cell 11 and the CC of the macro cell 21. In this case, when the SR2 information and the SR3 information are not supplied to the UE 300, the UE 300 can separately verify all of the synchronization relationships between the CCs used for the pico cells 11 and the CC used for the macro cell 21. Conversely, when the SR2 information and the SR3 information are supplied to the UE 300, the UE 300 may verify only the restricted synchronization relationships. For this reason, the supply of the SR2 information and the SR3 information can result in the reduction in the load of the UE 300.

The SR2 information and the SR3 information are supplied by the macro eNodeB 200. Thus, the UE 300 can reliably comprehend which CC is preferable to use among the CCs of the pico cell 11 in view of the use of the synchronization result when the UE 300 enters the pico cell 11, before the UE 300 enters the pico cell 11. As a result, when the UE 300 enters the pico cell 11, the UE 300 can more rapidly use the CC (for example, the CC synchronized with the CC of the macro cell 21 during the use, the CC synchronized with the different CC of the pico cell 11, or the like) that is preferable in view of the use of the synchronization result among the CCs of the pico cell 11.

Specifically, for example, the pico eNodeB 100 is assumed to supply the SR2 information using the system information. In this case, to use the CC that is preferable in view of the use of the synchronization result, the UE 300 receives the system information from the pico eNodeB 100. Then, after the UE 300 receives the system information and then acquires and confirms the SR2 information, the UE 300 eventually uses the CC that is preferable in view of the use of the synchronization result. Therefore, when the UE 300 enters the pico cell 11, there is a probability of the UE 300 not being connected to the pico eNodeB 100 when it attempts to use the CC that is preferable in view of the use of the synchronization result among the CCs of the pico cell 11 from the beginning. In particular, when the UE 300 is moving at a high speed, a situation in which the UE 300 is not connected to the pico eNodeB 100 despite having entered the pico cell 11 can also occur. On the other hand, as described above, when the macro eNodeB 200 supplies the SR2 information and the SR3 information, the UE 300 can acquire the SR2 information in advance from the macro eNodeB 200 out of the pico cell 11. Therefore, the UE 300 can be connected to the pico eNodeB 100 using the CC that is preferable in view of the use of the synchronization result without receiving the system information from the pico eNodeB 100 again. That is, the UE 300 can use the CC that is preferable in view of the use of the synchronization result more rapidly.

For example, the pico eNodeB 100 is assumed to supply the SR2 information using the RRC signaling. In this case, the UE 300 uses one CC to establish connection to the pico eNodeB 100 without comprehending which CC is the CC that is preferable in view of the use of the synchronization result. Therefore, to use the CC that is preferable in view of the use of the synchronization result, the UE 300 acquires the R2 information from the RRC signaling after the connection, and then can use the CC that is preferable in view of the use of the synchronization result again. On the other hand, as described above, when the macro eNodeB 200 supplies the SR2 information, the UE 300 can establish the connection to the pico eNodeB 100 using the CC that is preferable in view of the use of the synchronization result from the beginning That is, the UE 300 can use the CC that is preferable in view of the use of the synchronization result more rapidly.

SR1

As described above, for example, the macro SR information indicates which CCs are mutually synchronized among one or more different CCs used for the macro cell 21. That is, the macro SR information includes the SR1 information. Therefore, the communication control unit 253 supplies the SR1 information in the macro cell 21.

The supply of the SR1 information results in a reduction in a load of the UE 300 in the carrier aggregation when the macro cell 21 and the pico cells 11 are deployed. That is, when the SR1 information is not supplied to the UE 300, the UE 300 can separately verify all of the synchronization relationships between the CCs used for the macro cell 21. Conversely, when the SR1 information is supplied to the UE 300, the UE 300 may verify only the restricted synchronization relationships. For this reason, the supply of the SR1 information can result in the reduction in the load of the UE 300.

The SR1 information is supplied by the macro eNodeB 200. Thus, the UE 300 can acquire the SR1 information without being located in one pico cell 11. Accordingly, it is possible to reduce the load of the UE 300 independently of the position of the UE 300.

SR4 and SR5

The synchronization relationship information supplied in the macro cell 21 by the communication control unit 253 does not include the synchronization relationship information (that is, that SR4 information) indicating which CCs are mutually synchronized among the plurality of CCs used for the pico cell 11. That is, the communication control unit 253 does not supply the SR4 information in the macro cell 21.

For example, the synchronization relationship information supplied in the macro cell 21 by the communication control unit 253 does not include the synchronization relationship information (that is, the SR5 information) indicating which CC of the plurality of CCs used for the pico cell 11 is synchronized with which CC of one or more CCs used for the different pico cell 11. That is, the communication control unit 253 does not supply the SR5 information in the macro cell 21.

As described above, the various kinds of synchronization relationship information are supplied in the macro cells 21 or not supplied. Hereinafter, the kinds of synchronization relationship information supplied by the serving macro eNodeB 200 and the kinds of synchronization relationship information that are not supplied will be confirmed with reference to FIG. 15.

Figure 15:
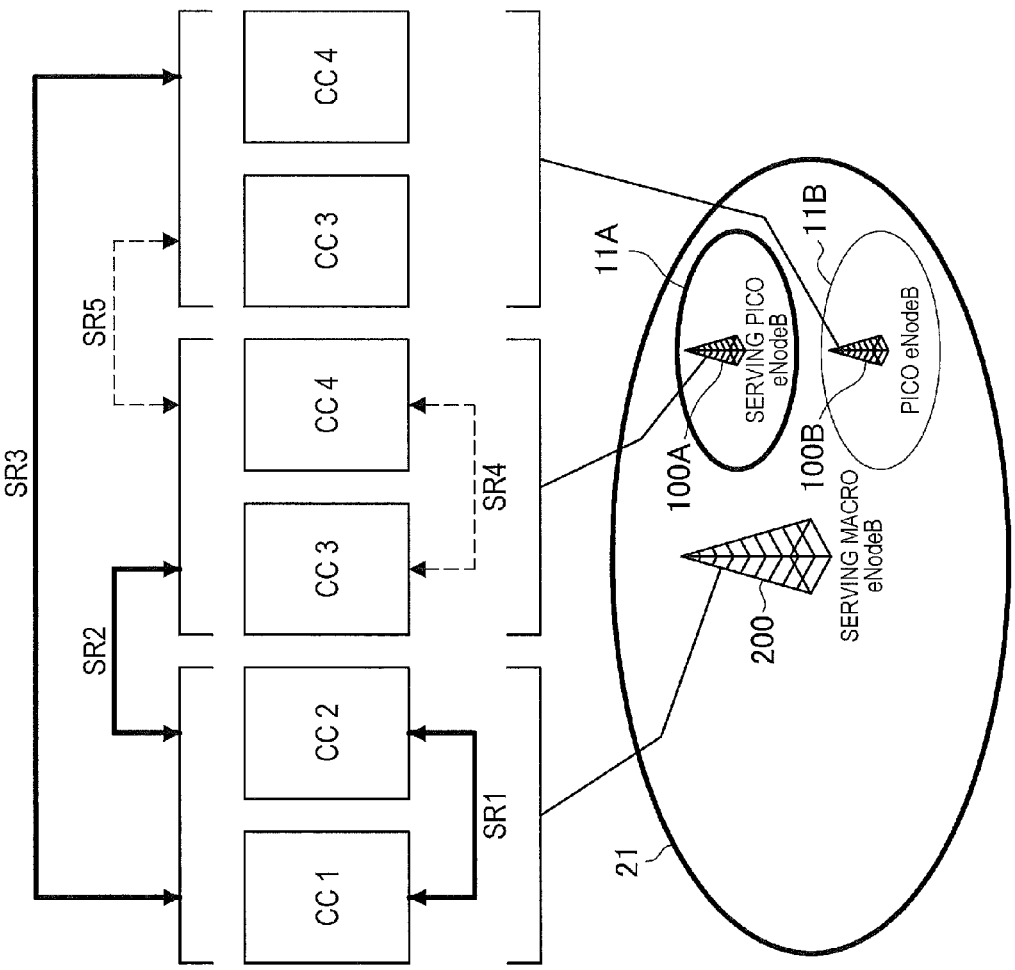
FIG. 15 is an explanatory diagram illustrating examples of kinds of synchronization relationship information supplied by a serving macro eNodeB.

FIG. 15 is an explanatory diagram illustrating examples of kinds of synchronization relationship information supplied by the serving macro eNodeB 200. As illustrated in FIG. 15, for example, the serving macro eNodeB 200 (the communication control unit 253) supplies the SR1 information, the SR2 information, and the SR3 information in the macro cell 21. On the other hand, the serving macro eNodeB 200 (the communication control unit 253) does not supply the SR4 information and the SR5 information in the macro cell 21.

Supply Method for Synchronization Relationship Information

As a specific supply method, for example, the communication control unit 253 supplies the synchronization relationship information via the radio communication unit 220 using the system information. More specifically, for example, the communication control unit 253 generates the system information including the SR1 information, the SR2 information, and the SR3 information and causes the radio communication unit 220 to transmit the system information in the macro cell 21. The communication control unit 253 may transmit the SR1 information, the SR 2 information, and the SR3 information to the UE 300 using the RRC signaling in the pico cell 11.

Supply Order of Synchronization Relationship Information

For example, the communication control unit 253 supplies two or more kinds of synchronization relationship information in an order according to importance of the kinds of synchronization relationship information. For example, the two or more kinds of synchronization relationship information include the SR1 information, the SR2 information, and the SR3 information. The specific supply method has been described above in regard to the pico eNodeB 100.

Supply of Supply Spot Information

For example, the communication control unit 253 supplies, in the macro cell 21, information (hereinafter referred to as "supply spot information") indicating a spot between the macro cell 21 and the pico cell 11 where each of the two or more kinds of synchronization relationship information is supplied. The specific content of the supply spot information and the specific supply method have been described above in regard to the pico eNodeB 100.

<4.3. Configuration of UE>

Figure 16:
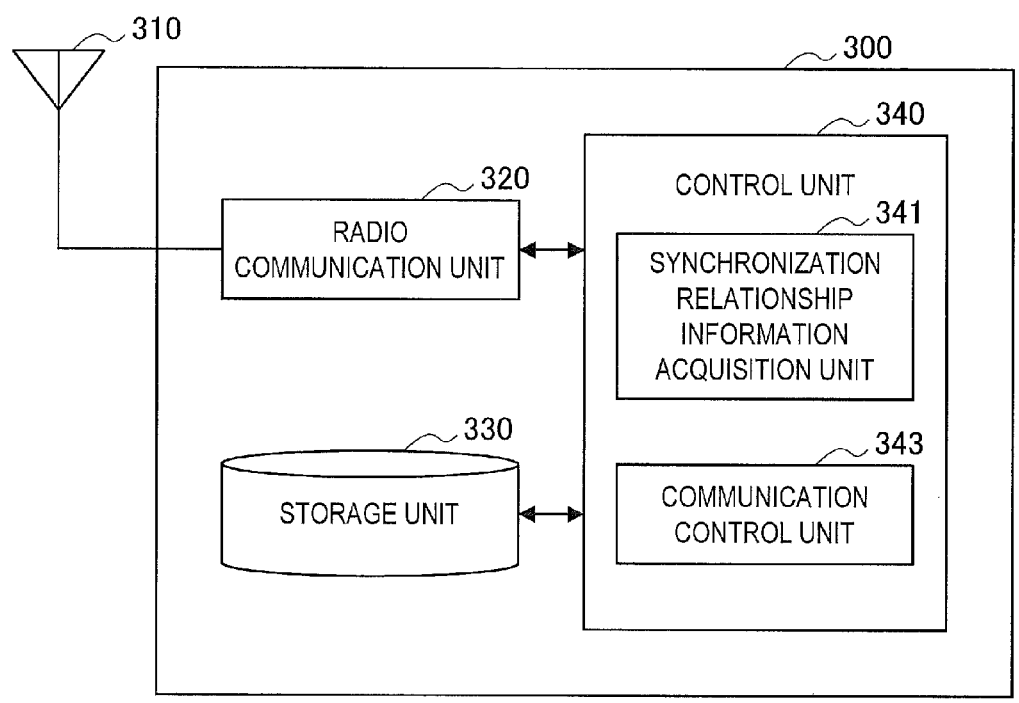
FIG. 16 is a block diagram illustrating an example of the configuration of a UE according to the embodiment.

First, the configuration of the UE 300 according to the embodiment will be described with reference to FIG. 16. FIG. 16 is a block diagram illustrating an example of the configuration of the UE 300 according to the embodiment. Referring to FIG. 16, the UE 300 includes an antenna unit 310, a radio communication unit 320, a storage unit 330, and a control unit 340.

(Antenna Unit 310)

The antenna unit 310 receives a radio signal and outputs the received radio signal to the radio communication unit 320. The antenna unit 310 transmits a transmission signal output by the radio communication unit 320.

(Radio Communication Unit 320)

The radio communication unit 320 performs radio communication in the pico cell 11 and/or the macro cell 21. That is, the radio communication unit 320 performs the radio communication with the pico eNodeB 100 and/or the macro eNodeB 200. For example, the radio communication unit 320 can simultaneously use the plurality of CCs. Specifically, for example, the radio communication unit 320 can perform the radio communication with the pico eNodeB 100 and/or the macro eNodeB 200 simultaneously using the plurality of CCs. That is, the UE 300 supports the carrier aggregation.

(Storage Unit 330)

The storage unit 330 stores a program and data for an operation of the UE 300.

(Control Unit 340)

The control unit 340 supplies various functions of the UE 300.

The control unit 340 includes a synchronization relationship information acquisition unit 341 and a communication control unit 343.

(Synchronization Relationship Information Acquisition Unit 341)

Acquisition of Synchronization Relationship Information

The synchronization relationship information acquisition unit 341 acquires the synchronization relationship information indicating which frequency bands are mutually synchronized among the plurality of frequency bands.

SR4

In particular, in the embodiment, the synchronization relationship information acquisition unit 341 acquires synchronization relationship information (that is, the SR4 information) indicating which CCs are mutually synchronized among the plurality of CCs used for the pico cell 11 from the information supplied in the pico cell 11 by the pico eNodeB 100. The synchronization relationship information acquisition unit 341 does not acquire the SR4 information from the information supplied in the macro cell 21 by the macro eNodeB 200.

SR5

For example, the synchronization relationship information acquisition unit 341 acquires the SR5 information from the information supplied by the pico eNodeB 100 and does not acquire the SR5 information from the information supplied by the macro eNodeB 200.

SR1, SR2, and SR3

For example, the synchronization relationship information acquisition unit 341 acquires the SR1 information, the SR2 information, and the SR3 information from the information supplied by the macro eNodeB 200 and does not acquire the SR1 information, the SR2 information, and the SR3 information from the information supplied by the pico eNodeB 100.

Method of Acquiring Synchronization Relationship Information

As a specific supply method, for example, the synchronization relationship information acquisition unit 341 acquires various kinds of synchronization relationship information from the system information transmitted by the macro eNodeB 200 or the pico eNodeB 100 via the communication unit 320. The synchronization relationship information acquisition unit 341 may acquire various kinds of synchronization relationship information from the RRC signaling via the radio communication unit 320.

Acquisition of Supply Spot Information

For example, the synchronization relationship information acquisition unit 341 acquires information (that is, supply spot information) indicating a spot between the macro cell 21 and the pico cell 11 where each of the two or more kinds of synchronization relationship information is supplied.

As a specific acquisition method, for example, when the UE 300 is in RRC_Connected in the pico cell 11 or the macro cell 21, the synchronization relationship information acquisition unit 341 acquires the supply spot information using the RRC signaling via the radio communication unit 320. The supply spot information may be acquired from the system information.

For example, the synchronization relationship information acquisition unit 341 comprehends the kinds of synchronization relationship information supplied by the macro eNodeB 200 from the supply spot information. Further, the synchronization relationship information acquisition unit 341 also comprehends the kinds of synchronization relationship information supplied by the pico eNodeB 100 from the supply spot information. Then, the synchronization relationship information acquisition unit 341 decides the kinds of synchronized relationship information to be acquired and acquires the kinds of decided synchronization relationship information as described above.

(Communication Control Unit 343)

The communication control unit 343 controls the radio communication by the UE 300.

For example, the communication control unit 343 performs a synchronization procedure based on the acquired synchronization relationship information. More specifically, for example, the communication control unit 343 establishes synchronization with the CC that is preferable in view of the use of the synchronization result based on the acquired synchronization relationship information and verifies the synchronization relation between the CCs. When the number of mutually synchronized CCs is two or more, the communication control unit 343 uses the synchronization result of the UE 300 in one CC of the two or more CCs for another CC of the two or more CCs.

5. FLOW OF PROCESS

Next, an example of the communication control process according to the embodiment will be described with reference to FIGS. 17 to 20.

(Supply of Supply Spot Information)

Figure 17:
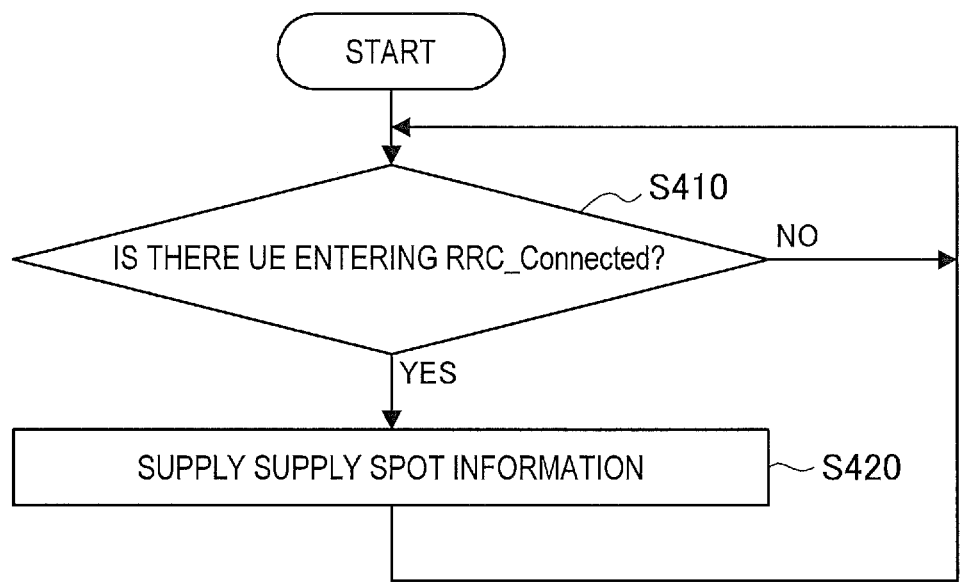
FIG. 17 is an explanatory diagram illustrating an example of a first communication control process on the side of a pico eNodeB according to the embodiment.

FIG. 17 is an explanatory diagram illustrating an example of a first communication control process on the side of a pico eNodeB 100 according to the embodiment. The first communication control process is a process performed to supply the supply spot information.

In step S410, the communication control unit 153 of the pico eNodeB 100 determines whether there is the UE 300 entering RRC_Connected in the pico cell 11. When there is the UE 300, the process proceeds to step S420. Otherwise, the process of step S410 is repeated.

In step S420, the communication control unit 153 of the pico eNodeB 100 supplies the supply spot information using the RRC signaling to the UE 300 entering RRC_Connected in the pico cell 11 via the radio communication unit 120. Then, the process returns to step S410.

The first communication control process can be performed similarly in the macro eNodeB 200.

(Supply of Synchronization Relationship Information by Pico eNodeB)

Figure 18:
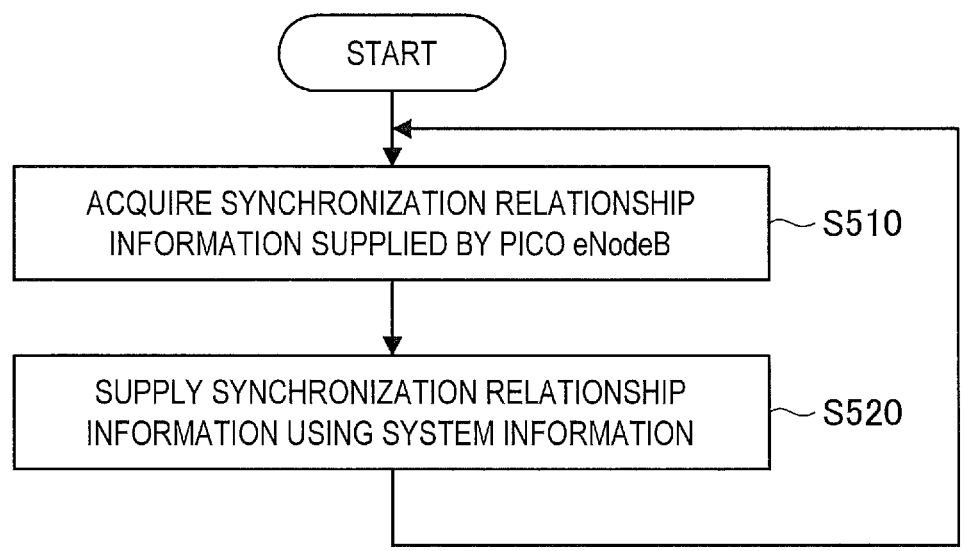
FIG. 18 is an explanatory diagram illustrating an example of a second communication control process on the side of the pico eNodeB according to the embodiment.

FIG. 18 is an explanatory diagram illustrating an example of a second communication control process on the side of the pico eNodeB 100 according to the embodiment. The second communication control process is a process performed to supply the synchronization relationship information.

In step S510, the synchronization relationship information acquisition unit 151 acquires the synchronization relationship information supplied by the pico eNodeB 100.

In step S520, the communication control unit 153 supplies the synchronization relationship information using the system information via the radio communication unit 120. Then, the process returns to step S510.

(Supply of Synchronization Relationship Information by Macro eNodeB)

Figure 19:
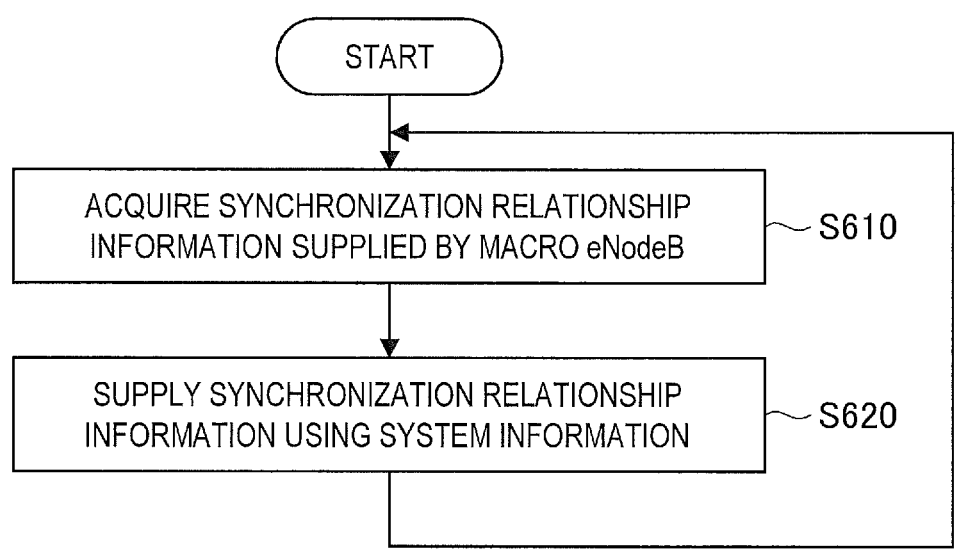
FIG. 19 is an explanatory diagram illustrating an example of a communication control process on the side of the macro eNodeB according to the embodiment.

FIG. 19 is an explanatory diagram illustrating an example of a communication control process on the side of the macro eNodeB 200 according to the embodiment. The communication control process is a process performed to supply the synchronization relationship information.

In step S610, the synchronization relationship information acquisition unit 251 acquires the synchronization relationship information supplied by the macro eNodeB 200.

In step S620, the communication control unit 253 supplies the synchronization relationship information using the system information via the radio communication unit 220. Then, the process returns to step S610.

(Communication Control Process by UE)

Figure 20:
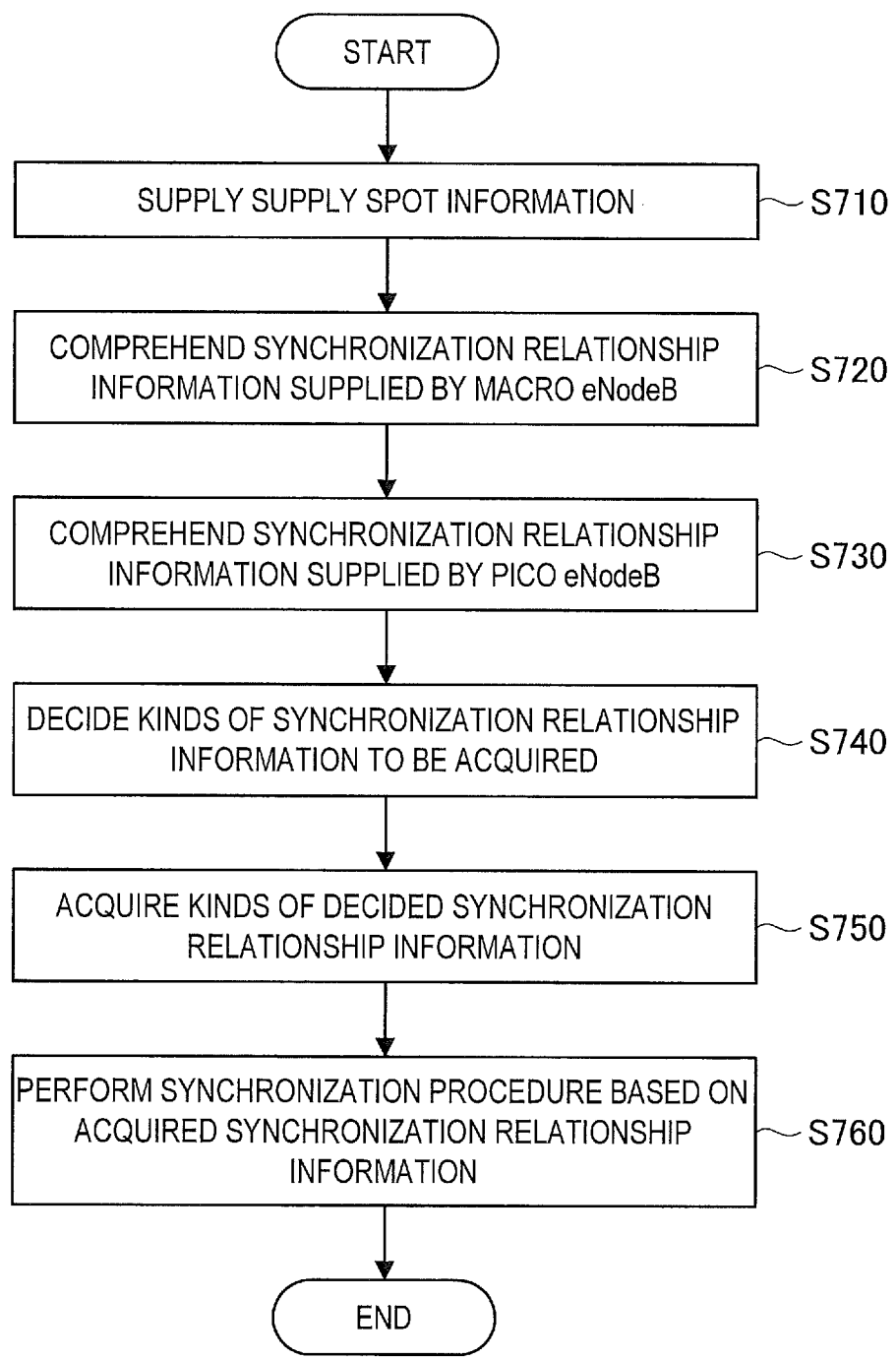
FIG. 20 is an explanatory diagram illustrating an example of a communication control process on the side of a UE according to the embodiment.

FIG. 20 is an explanatory diagram illustrating an example of a communication control process on the side of the UE 300 according to the embodiment. The communication control process starts, for example, when the UE 300 enters RRC_Connected in the pico cell 11 or the macro cell 21.

First, in step S710, the synchronization relationship information acquisition unit 341 acquires the supply spot information from the RRC signaling via the radio communication unit 320.

Then, in step S720, the synchronization relationship information acquisition unit 341 comprehends the kind of synchronization relationship information supplied by the macro eNodeB 200 from the supply spot information.

In step S730, the synchronization relationship information acquisition unit 341 comprehends the kind of synchronization relationship information supplied by the pico eNodeB 100 from the supply spot information.

Then, in step S740, the synchronization relationship information acquisition unit 341 decides the kinds of synchronization relationship information to be acquired.

Thereafter, in step S750, the synchronization relationship information acquisition unit 341 acquires the kinds of decided synchronization relationship information via the communication unit 320 from the system information transmitted by the macro eNodeB 200 or the pico eNodeB 100.

Then, in step S760, the communication control unit 343 performs the synchronization procedure based on the acquired synchronization relationship information. Then, the process ends.

6. FIRST MODIFICATION EXAMPLE

Next, a first modification example of the embodiment will be described with reference to FIGS. 21 and 22.

In the example of the above-described embodiment, the macro eNodeB 200 supplies the synchronization relationship information (that is, the SR2 information and the SR3 information) indicating which CC of one or more CCs used for the macro cell 21 is synchronized with which CC of the plurality of CCs used for the pico cell 11.

However, when the synchronization relationship information is supplied by the macro eNodeB 200, valuable radio resources in the macro cell 21 may be consumed.

Accordingly, the first modification example of the embodiment is configured to further suppress consumption of radio resources of the macro cell. Specifically, in the first modification example, the SR2 information and the SR3 information are transmitted by the pico eNodeB 100 instead of being transmitted by the macro eNodeB 200.

(Pico eNodeB 100—Synchronization Relationship Information Acquisition Unit 151)

Acquisition of Synchronization Relationship Information

A synchronization relationship information acquisition unit 151 of the pico eNodeB 100A acquires synchronization relationship information (that is, the SR2 information) indicating which CC of one or more CCs used for the macro cell 21 is synchronized with which CC of the plurality of CCs used for the pico cell 11A.

In addition, for example, the synchronization relationship information acquisition unit 151 of the pico eNodeB 100A acquires the synchronization relationship information (that is, the SR3 information) indicating which CC among at least one CC used in the macro cell re is synchronized with which CC among the plurality of CCs used in another pico cell 11B.

(Pico eNodeB 100—Communication Control Unit 153)

Supply of Synchronization Relationship Information

SR2

The communication control unit 153 supplies the SR2 information in the pico cell 11. The SR2 information is not supplied in the macro cell 21 by the macro eNodeB 200. That is, of the macro SR information, the SR2 information is supplied by the pico eNodeB 100 rather than the macro eNodeB 200.

Accordingly, the radio resources of the macro cell 21 are not used to supply the SR2 information. That is, the supply of the SR2 information by the pico eNodeB 100 can result in the suppression of the consumption of the radio resources of the macro cell 21.

SR3

The communication control unit 153 supplies the SR3 information in the pico cell 11. The SR3 information is not supplied in the macro cell 21 by the macro eNodeB 200. That is, of the macro SR information, the SR3 information is supplied by the pico eNodeB 100 rather than the macro eNodeB 200.

Accordingly, the radio resources of the macro cell 21 are not used to supply the SR3 information. That is, the supply of the SR3 information by the pico eNodeB 100 can result in the suppression of the consumption of the radio resources of the macro cell 21.

By supplying the SR3 information by the pico eNodeB 100, at the time of movement from the serving pico cell 11A to the pico cell 11B, the UE 300 can acquire the SR3 information in advance in the pico cell 11A before the UE 300 enters the pico cell 11B. Accordingly, the UE 300 can use the CC that is preferable in view of the use of the synchronization result among the CCs used for the pico cell 11B more rapidly.

SR1

For example, the macro eNodeB 200 supplies the synchronization relationship information (that is, the SR1 information) indicating which CCs are mutually synchronized among the plurality of CCs used for the macro cell 21, as in the above-described embodiment.

As described above, various kinds of synchronization relationship information are supplied or not supplied in the pico cell 11. Hereinafter, kinds of synchronization relationship information supplied by the serving pico eNodeB 100A and kinds of synchronization relationship information not supplied in the first modification example will be confirmed with reference to FIG. 21.

Figure 21:
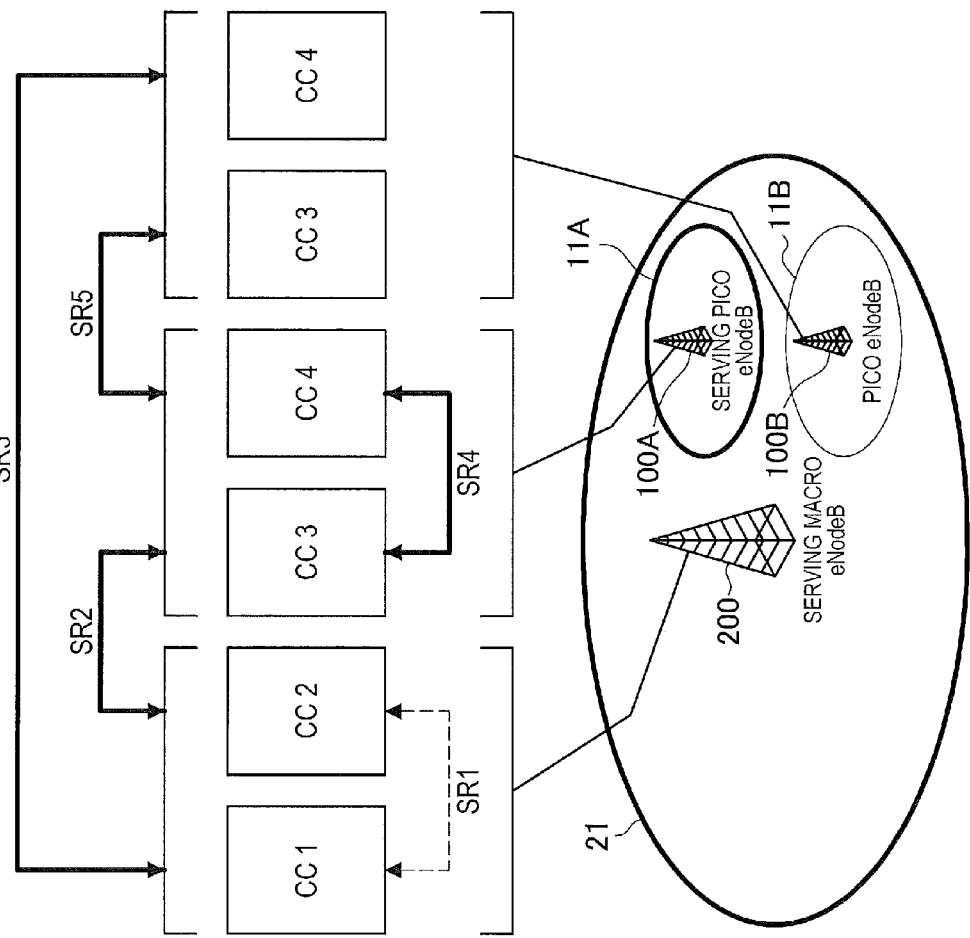
FIG. 21 is an explanatory diagram illustrating examples of kinds of synchronization relationship information supplied by a serving pico eNodeB according to a first modification example of the embodiment.

FIG. 21 is an explanatory diagram illustrating examples of kinds of synchronization relationship information supplied by a serving pico eNodeB 100A according to a first modification example of the embodiment. As illustrated in FIG. 21, for example, the serving pico eNodeB 100A (the communication control unit 153) supplies the SR2 information, the SR3 information, the SR4 information, and the SR5 information in the pico cell 11A. Conversely, the serving pico eNodeB 100A (the communication control unit 153) does not supply the SR1 information in the pico cell 11A.

(Macro eNodeB 200—Synchronization Relationship Information Acquisition Unit 251)

The synchronization relationship information acquisition unit 251 of the macro eNodeB 200 does not acquire the SR2 information among the macro SR information. For example, the synchronization relationship information acquisition unit 251 does not acquire the SR3 information among the macro SR information either. Conversely, for example, the synchronization relationship information acquisition unit 251 acquires the SR1 information among the macro SR information.

(Macro eNodeB 200—Communication Control Unit 253)

Supply of Synchronization Relationship Information

The communication control unit 253 does not supply the SR2 information among the macro SR information in the macro cell 21. For example, the communication control unit 253 does not supply the SR3 information among the macro SR information in the macro cell 21. Conversely, for example, the communication control unit 253 supplies the SR1 information among the macro SR information in the macro cell 21.

As described above, various kinds of synchronization relationship information are supplied or not supplied in the macro cell 21. Hereinafter, kinds of synchronization relationship information supplied by the serving macro eNodeB 200 and kinds of synchronization relationship information not supplied in the first modification example will be confirmed with reference to FIG. 22.

Figure 22:
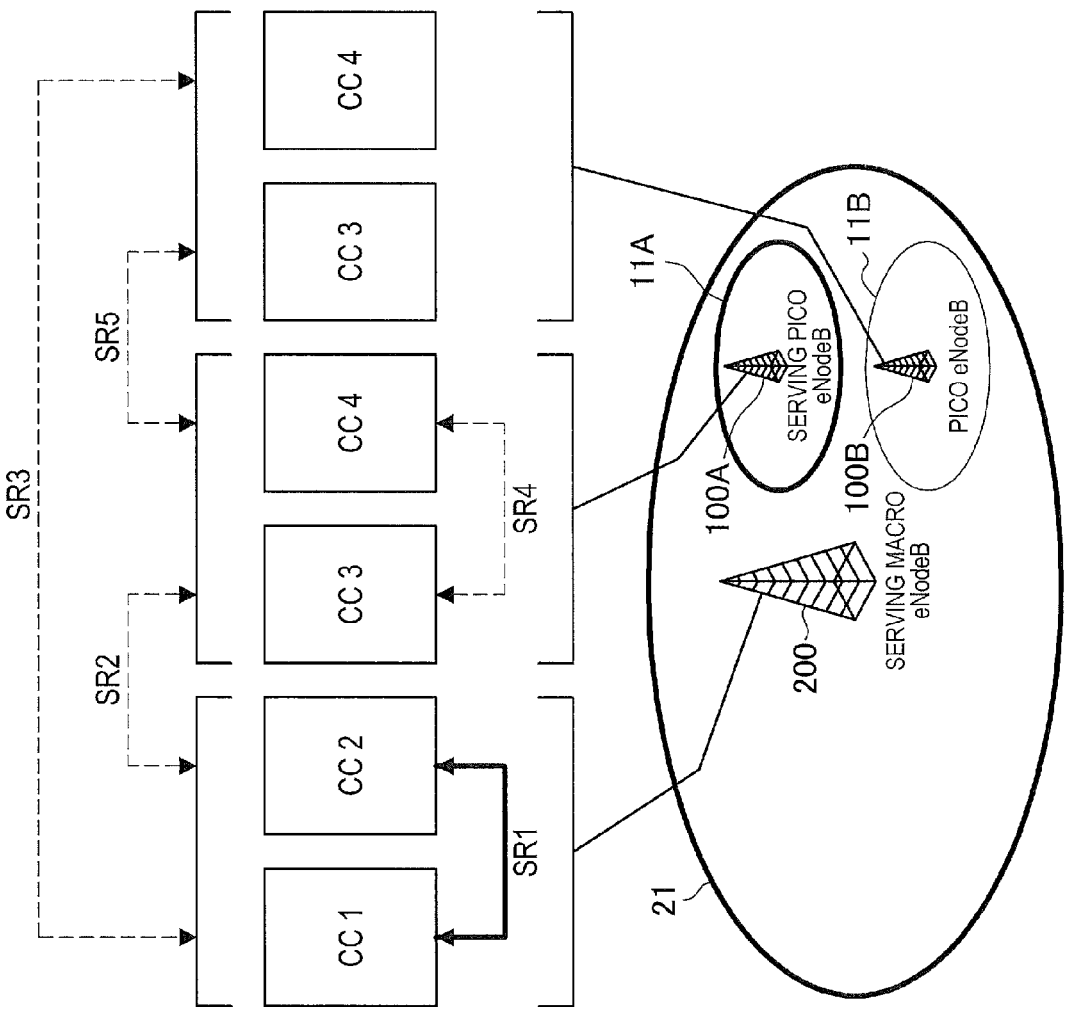
FIG. 22 is an explanatory diagram illustrating examples of kinds of synchronization relationship information supplied by a serving macro eNodeB according to the first modification example of the embodiment.

FIG. 22 is an explanatory diagram illustrating examples of the kinds of synchronization relationship information supplied by the serving macro eNodeB 200 according to the first modification example of the embodiment. As illustrated in FIG. 22, for example, the serving macro eNodeB 200 (the communication control unit 253) supplies the SR1 information in the macro cell 21. Conversely, the serving macro eNodeB 200 (the communication control unit 253) does not supply the SR2 information, the SR3 information, the SR4 information, and the SR5 information in the macro cell 21.

The first modification example of the embodiment has been described above. According to the first modification example, the SR2 information and the SR3 information are not transmitted by the macro eNodeB 200. Accordingly, it is possible to further suppress the consumption of the radio resources of the macro cell.

7. SECOND MODIFICATION EXAMPLE

Next, a second modification example of the embodiment will be described with reference to FIGS. 23 to 25.

In the above-described embodiment, the synchronization relationship information related to the CC used in the serving macro cell 21 and the pico cell 11 overlapping with the macro cell 21 is supplied.

However, in this case, to use the CC that is preferable in view of the use of the synchronization result even after handover to the adjacent macro cell 21, the UE 300 acquires the synchronization relationship information in the adjacent macro cell 21 again after the handover. As a result, a considerable amount of time may be necessary until the CC that is preferable in view of the use of the synchronization result is used.

Accordingly, in the second modification example of the embodiment, the CC that is preferable in view of the use of the synchronization result can be used more rapidly even after the handover to the adjacent macro cell 21. Specifically, in the second modification example, the synchronization relationship information related to a different macro cell 21 adjacent to the serving macro cell 21 is further supplied.

(Synchronization Relationship Information Suppliable to UE)

First, in the second modification example of the embodiment, the kinds of synchronization relationship information which can be supplied by the serving pico eNodeB 100A or the serving macro eNodeB 200 in a certain UE 300 will be described with reference to FIG. 23.

Figure 23:
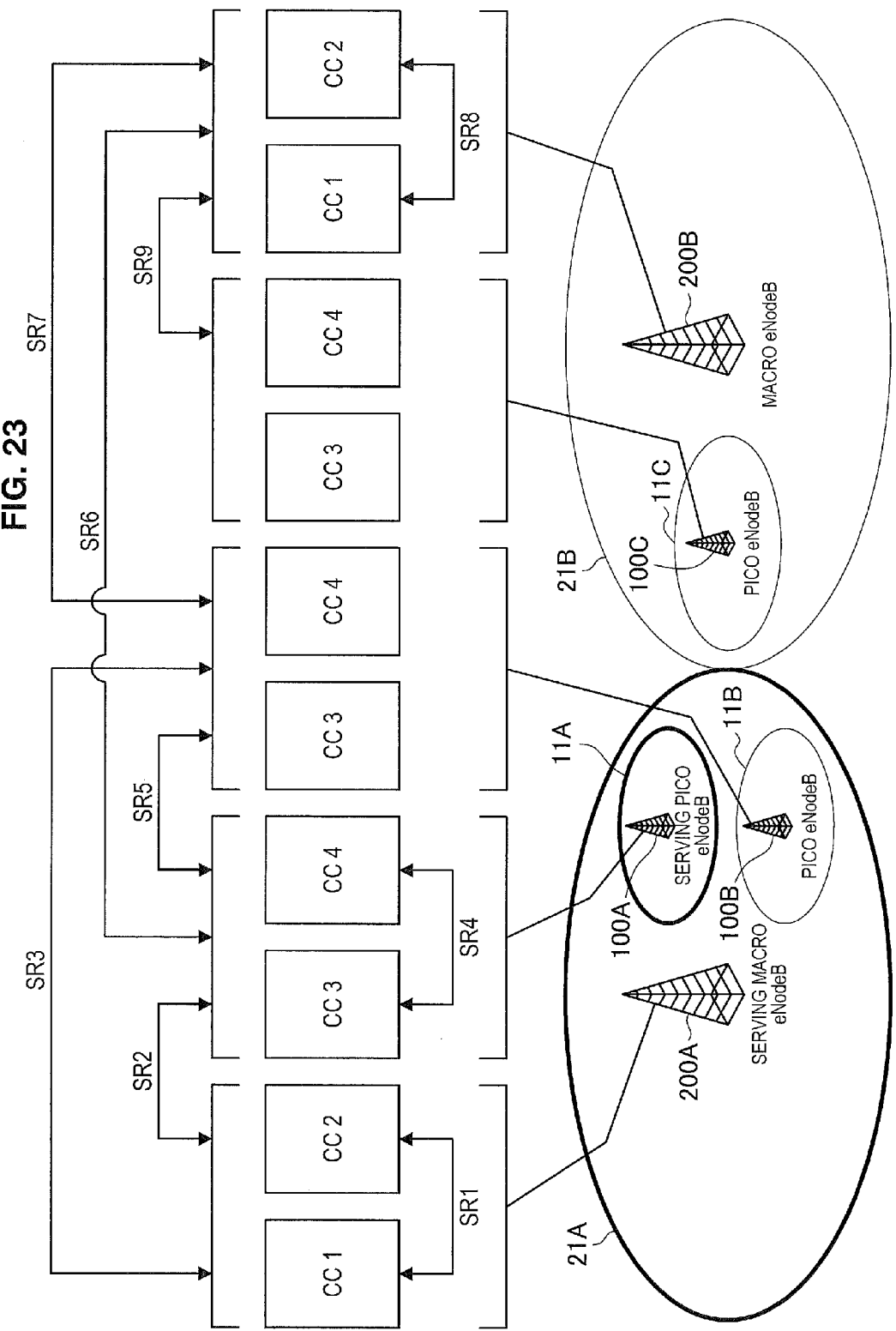
FIG. 23 is an explanatory diagram illustrating examples of kinds of suppliable synchronization relationship information according to a second modification example of the embodiment.

FIG. 23 is an explanatory diagram illustrating examples of kinds of suppliable synchronization relationship information according to a second modification example of the embodiment. Referring to FIG. 23, pico eNodeBs 100, pico cells 11, macro eNodeBs 200, and macro cells 21 are illustrated. The macro cell 21A and the macro cell 21B are adjacent to each other. In this example, the UE 300 is located in the cell 11A, the pico cell 11A is a serving pico cell in the UE 300, and the macro cell 21A is a serving macro cell in the UE 300. In FIG. 23, two CCs (CC 1 and CC 2) used for the macro cells 21 and two CCs (CC 3 and CC 4) used for the pico cells 11 are illustrated.

According to the second modification example, in the deployment of these cells, for example, information indicating the following kinds of synchronization relationships (SR) can be supplied by the pico eNodeB 100A or the macro eNodeB 200A:

SR1: a synchronization relationship between the CCs of the serving macro cell 21A;

SR2: a synchronization relationship between the CCs of the serving macro cell 21A and the CCs of the serving pico cell 11A;

SR3: a synchronization relationship between the CCs of the serving macro cell 21A and the CCs of the other pico cell 11B overlapping with the serving macro cell 21A;

SR4: a synchronization relationship between the CCs of the serving pico cell 11A;

SR5: a synchronization relationship between the CCs 11A of the serving pico cell and the CCs of the other pico cell 11B overlapping with the serving macro cell 21A;

SR6: a synchronization relationship between the CC of the serving pico cell 11A and the CC of the adjacent macro cell 21B;

SR7: a synchronization relationship between the CC of the other pico cell 11B overlapping with the serving macro cell 21A and the CC of the adjacent macro cell 21B;

SR8: a synchronization relationship between the CCs of the adjacent macro cell 21B; and SR9: a synchronization relationship between the CC of the adjacent macro cell 21B and the CC of the pico cell 11C overlapping with the adjacent macro cell 21B.

The above-described SR1 to SR5 have been described with reference to FIG. 12. In particular, in the second modification example, for example, SR6 to SR9 are further supplied by the serving pico eNodeB 100A or the serving macro eNodeB 200.

(Pico eNodeB 100—Synchronization Relationship Information Acquisition Unit 151)

SR6

As described above, the synchronization relationship information acquisition unit 151 of the pico eNodeB 100A acquires the synchronization relationship information indicating which CC of the plurality of CCs used for the macro cell 21A is synchronized with which CC of one or more CCs used for different cells other than the macro cell 21 and the pico cell 11A.

In particular, in the second modification example, for example, the different cells include the macro cell 21B adjacent to the macro cell 21A. That is, the synchronization relationship information acquisition unit 151 acquires synchronization relationship information (hereinafter referred to as "SR6 information") indicating SR6 among the synchronization relationships illustrated in FIG. 23.

SR7

The synchronization relationship information acquisition unit 151 of the pico eNodeB 100A acquires synchronization relationship information indicating which CCs are mutually synchronized among a plurality of CCs used for a different cell other than the macro cell 21A and the pico cell 11A.

For example, the different cells are the different pico cell 11B partially or entirely overlapping with the macro cell 21A and the macro cell 21B adjacent to the macro cell 21A. The synchronization relationship information indicates which CC of one or more CCs used for the pico cell 11B is synchronized with which CC of one or more CCs used for the macro cell 21B. That is, the synchronization relationship information acquisition unit 151 acquires synchronization relationship information (hereinafter referred to as "SR7 information") indicating SR7 among the synchronization relationships illustrated in FIG. 23.

(Pico eNodeB 100—Communication Control Unit 153)

Supply of Synchronization Relationship Information

SR6

As described above, the communication control unit 153 of the pico eNodeB 100A supplies in the pico cell 11 the synchronization relationship information indicating which CC of the plurality of CCs used for the macro cell 21A is synchronized with which CC of one or more CCs used for different cells other than the macro cell 21 and the pico cell 11A.

In particular, in the second modification example, as described above, for example, the different cells include the macro cell 21B adjacent to the macro cell 21A. That is, the communication control unit 153 of the pico eNodeB 100A supplies, in the pico cell 11A, the synchronization relationship information (that is, the SR6 information) indicating which CC of the plurality of CCs used for the pico cell 11A is synchronized with which CC of one or more CCs used for the macro cell 21B.

The SR6 information is not supplied in the macro cell 21A by the macro eNodeB 200A.

The supply of the SR6 information can result in a reduction in a load of the UE 300 in the carrier aggregation when the macro cell 21 and the pico cell 11 are deployed. For example, the pico cell 11A can be overlapping with both of the macro cell 21A and the macro cell 21B. In this case, when the UE 300 performs handover from the macro cell 21A to the macro cell 21B, the UE 300 can communicate with the pico eNodeB 100A using the CC of the pico cell 11A even after the handover. In this case, when the SR6 information is not supplied to the UE 300, the UE 300 can separately verify all of the synchronization relationships between the CCs used in the pico cell 11A and the CCs used for the macro cell 21B. Conversely, when the SR6 information is supplied to the UE 300, the UE 300 may verify only the restricted synchronization relationships. Therefore, the supply of the SR6 information can result in the reduction in the load of the UE 300.

The SR6 information is not supplied by the macro eNodeB 200 but is supplied by the pico eNodeB 100. Thus, radio resources of the macro cell 21 are not used to supply the SR6 information. That is, the supply of the SR6 information by the pico eNodeB 100 can result in suppression of consumption of the radio resources of the macro cell 21.

SR7

The communication control unit 153 of the pico eNodeB 100A supplies, in the small cell, the synchronization relationship information indicating which CCs are mutually synchronized among the plurality of CCs used for a different cell other than the macro cell 21A and the pico cell 11A.

The synchronization relationship information is not supplied in the macro cell 21A by the macro eNodeB 200A.

As described above, for example, the different cells are the pico cell 11B and the macro cell 21B. The synchronization relationship information is the SR7 information. That is, the communication control unit 153 supplies the SR7 information in the pico cell 11. The SR7 information is not supplied in the macro cell 21A by the macro eNodeB 200A.

The supply of the SR7 information can result in a reduction in a load of the UE 300 in the carrier aggregation when the macro cell 21 and the pico cell 11 are deployed. For example, the pico cell 11B can be overlapping with both of the macro cell 21A and the macro cell 21B. In this case, when the UE 300 moves from the pico cell 11A to a region overlapping with the pico cell 11B and the macro cell 21B and performs handover from the macro cell 21A to the macro cell 21B, the UE 300 can perform communication using the CC of the pico cell 11B and the CC of the macro cell 21B after the handover. In this case, when the SR7 information is not supplied to the UE 300, the UE 300 can separately verify all of the synchronization relationships between the CCs used in the pico cell 11B and the CCs used for the macro cell 21B. Conversely, when the SR7 information is supplied to the UE 300, the UE 300 may verify only the restricted synchronization relationships. Therefore, the supply of the SR7 information can result in the reduction in the load of the UE 300.

The SR7 information is not supplied by the macro eNodeB 200 but is supplied by the pico eNodeB 100. Thus, radio resources of the macro cell 21 are not used to supply the SR7 information. That is, the supply of the SR7 information by the pico eNodeB 100 can result in suppression of consumption of the radio resources of the macro cell 21.

SR8 and SR9

On the other hand, for example, synchronization relationship information indicating which CCs are mutually synchronized among the plurality of CCs used for a different cell other than the macro cell 21A, the pico cell 11A, and the pico cell 11B is supplied in the macro cell 21A by the macro eNodeB 200A. For example, the synchronization relationship information includes synchronization relationship information (hereinafter referred to as "SR8 information") indicating SR8 and synchronization relationship information (hereinafter referred to as "SR9 information") indicating SR9 among the synchronization relationships illustrated in FIG. 23. That is, the SR8 information and the SR9 information are supplied in the macro cell 21A by the macro eNodeB 200A.

As described above, the various kinds of synchronization relationship information are supplied in the pico cells 11. Hereinafter, the kinds of synchronization relationship information supplied by the serving pico eNodeB 100A will be confirmed with reference to FIG. 24.

Figure 24:
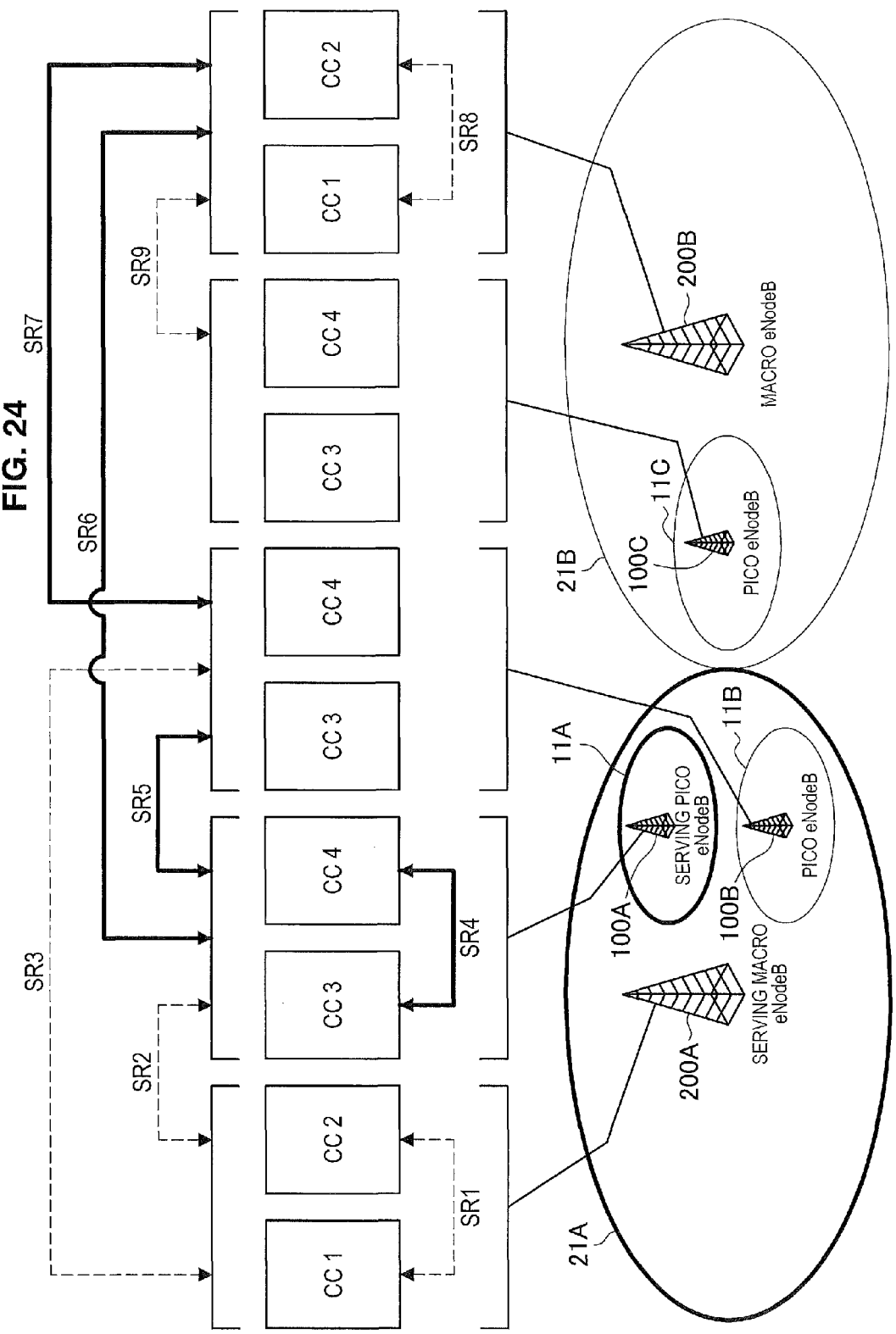
FIG. 24 is an explanatory diagram illustrating examples of kinds of synchronization relationship information supplied by a serving pico eNodeB according to the second modification example of the embodiment.

FIG. 24 is an explanatory diagram illustrating examples of the kinds of synchronization relationship information supplied by the serving pico eNodeB 100A according to the second modification example of the embodiment. As illustrated in FIG. 24, for example, the serving pico eNodeB 100A (the communication control unit 153) supplies the SR4 information, the SR5 information, the SR6 information, and the SR7 information in the pico cell 11A. Conversely, the serving pico eNodeB 100A (the communication control unit 153) does not supply the SR1 information, the SR2 information, the SR3 information, the SR8 information, and the SR9 information in the pico cell 11A.

(Macro eNodeB 200—Synchronization Relationship Information Acquisition Unit 251)

SR8 and SR9

In particular, in the second modification example, the synchronization relationship information acquisition unit 251 of the macro eNodeB 200A acquires synchronization relationship information indicating which CCs are mutually synchronized among the plurality of CCs used in a different cell other than the macro cell 21A, the pico cell 11A and the pico cell 11B.

SR8

For example, the different cell is the macro cell 21B adjacent to the macro cell 21A. In this case, the synchronization relationship information indicates which CCs are mutually synchronized among the CCs used for the macro cell 21B. That is, the synchronization relationship information acquisition unit 251 acquires the synchronization relationship information (that is, the SR8 information) indicating SR8 among the synchronization relationship information illustrated in FIG. 23.

SR9

For example, the different cells are the macro cell 21B adjacent to the macro cell 21A and the pico cell 11C partially or entirely overlapping with the macro cell 21B. In this case, the synchronization relationship information indicates which CC of the CCs used for the macro cell 21B is synchronized with which CC of the CCs used for the pico cell 11C. That is, the synchronization relationship information acquisition unit 251 acquires the synchronization relationship information (that is, the SR9 information) indicating SR9 among the synchronization relationship information illustrated in FIG. 23.

(Macro eNodeB 200—Communication Control Unit 253)

Supply of synchronization relationship information

SR8 and SR9

In particular, in the second modification example, the communication control unit 253 of the macro eNodeB 200A supplies, in the macro cell 21A, synchronization relationship information indicating which CCs are mutually synchronized among the plurality of CCs used for a different cell other than the macro cell 21A, the pico cell 11A, and the pico cell 11B.

SR8

As described above, for example, the different cell is the macro cell 21B adjacent to the macro cell 21A and the synchronization relationship information is the SR8 information. That is, the communication control unit 253 of the macro eNodeB 200A supplies the SR8 information in the macro cell 21A.

The SR8 information is supplied. Thus, when the UE 300 performs handover from the macro cell 21A to the adjacent macro cell 21B, the UE 300 can comprehend which CC is preferable to use among the CCs of the macro cell 21B in view of the use of the synchronization result before the handover. As a result, the UE 300 can use the CC (for example, the CC synchronized with a different CC of the macro cell 21B) that is preferable in view of the use of the synchronization result among the CCs of the macro cell 21B more rapidly when the UE 300 performs the handover to the macro cell 21B.

Specifically, for example, it is assumed that the SR1 information is supplied, but the SR8 information is not supplied. In this case, to use the CC that is preferable in view of the use of the synchronization result among the CCs of the macro cell 21B, the UE 300 acquires the SR1 information (corresponding to the SR8 information supplied by the macro eNodeB 200A) from the macro eNodeB 200B. Then, after the UE 300 receives the SR1 information from the macro eNodeB 200B and then acquires and confirms the SR1 information, the UE 300 eventually uses the CC that is preferable in view of the use of the synchronization result among the CCs of the macro cell 21B. Therefore, as a first example, when the UE 300 performs the handover from the macro cell 21A to the macro cell 21B, there is a possibility of the UE 300 not being promptly connected to the macro eNodeB 200B when the UE 300 attempts to use the CC that is preferable in view of the use of the synchronization result among the CCs of the macro cell 21B from the beginning. In particular, when the UE 300 is moving at a high speed, a situation in which the UE 300 is not connected to the macro eNodeB 200B despite having entered the macro cell 21B can also occur. Alternatively, as a second example, when the UE 300 performs the handover from the macro cell 21A to the macro cell 21B, the UE 300 uses one CC to establish connection to the macro eNodeB 200B without comprehending which CC is the CC that is preferable in view of the use of the synchronization result. Therefore, to use the CC that is preferable in view of the use of the synchronization result, the UE 300 can use the CC that is preferable in view of the use of the synchronization result again after the connection to the macro eNodeB 200B.

On the other hand, as described above, when the SR8 information is supplied, the UE 300 can acquire SR8 information in advance from the macro eNodeB 100A of the macro cell 21A. Therefore, the UE 300 can establish the connection to the macro eNodeB 200B using the CC that is preferable in view of the use of the synchronization result without receiving the SR1 information (corresponding to the SR8 information from the macro eNodeB 200A) from the macro eNodeB 200B again. That is, the UE 300 can use the CC that is preferable in view of the use of the synchronization result more rapidly.

SR9

As described above, for example, the different cells are the macro cell 21B adjacent to the macro cell 21A and the pico cell 11C partially or entirely overlapping with the macro cell 21B, and the synchronization relationship information is the SR9 information. That is, the communication control unit 253 of the macro eNodeB 200A supplies the SR9 information in the macro cell 21A.

The SR9 information is supplied. Thus, when the UE 300 moves from the macro cell 21A to the pico cell 11C in the macro cell 21B, the UE 300 can comprehend which CC is preferable to use among the CCs of the macro cell 21B and which CC is preferable to use among the CCs of the pico cell 11C in view of the use of the synchronization result before the movement. As a result, when the UE 300 moves from the macro cell 21A to the pico cell 11C in the macro cell 21B and performs handover from the macro cell 21A to the macro cell 21B, the UE 300 can use the CC (for example, the CC of the macro cell 21B synchronized with the CC of the pico cell 11C) that is preferable in view of the use of the synchronization result more rapidly.

Specifically, for example, it is assumed that the SR2 information and the SR3 information are supplied, but the SR8 information is not supplied. In this case, to use the CC that is preferable in view of the use of the synchronization result among the CCs of the macro cell 21B and the CCs of the pico cell 11C, the UE 300 acquires the SR2 information and the SR3 information (corresponding to the SR9 information supplied by the macro eNodeB 200A) from the macro eNodeB 200B. Then, after the UE 300 receives the SR2 information and the SR3 information from the macro eNodeB 200B and then acquires and confirms the SR2 information and the SR3 information, the UE 300 eventually uses the CCs that are preferable in view of the use of the synchronization result among the CCs of the macro cell 21B and the CCs of the pico cell 11C. Therefore, as a first example, when the UE 300 performs the handover from the macro cell 21A to the macro cell 21B, there is a possibility of the UE 300 not being promptly connected to the macro eNodeB 200B or the pico eNodeB 100C when the UE 300 attempts to use the CCs that are preferable in view of the use of the synchronization result among the CCs of the macro cell 21B and the pico cell 11C from the beginning. In particular, when the UE 300 is moving at a high speed, a situation in which the UE 300 is not connected to the macro eNodeB 200B or the pico cell 11C despite having entered the macro cell 21B and the pico cell 11C can also occur. Alternatively, as a second example, when the UE 300 performs the handover from the macro cell 21A to the macro cell 21B, the UE 300 uses one CC to establish connection to the macro eNodeB 200B and the pico eNodeB 11C without comprehending which CCs are the CCs that are preferable in view of the use of the synchronization result. Therefore, to use the CCs that are preferable in view of the use of the synchronization result, the UE 300 can use the CCs that are preferable in view of the use of the synchronization result again after the connection to the macro eNodeB 200B and the pico eNodeB 100C.

On the other hand, as described above, when the SR9 information is supplied, the UE 300 can acquire SR9 information in advance from the macro eNodeB 100A of the macro cell 21A. Therefore, the UE 300 can establish the connection to the macro eNodeB 200B using the CC that is preferable in view of the use of the synchronization result without receiving the SR2 information and the SR3 information (corresponding to the SR9 information from the macro eNodeB 200A) from the macro eNodeB 200B and the pico eNodeB 100C again. That is, the UE 300 can use the CC that is preferable in view of the use of the synchronization result more rapidly.

SR6 and SR7

On the other hand, for example, as described above, the SR6 information and the SR7 information are not supplied in the macro cell 21A by the macro eNodeB 200A and are supplied in the pico cell 11A by the pico eNodeB 100A.

As described above, various kinds of synchronization relationship information are supplied in the macro cell 21. Hereinafter, kinds of synchronization relationship information supplied by the serving macro eNodeB 200A will be confirmed with reference to FIG. 25.

Figure 25:
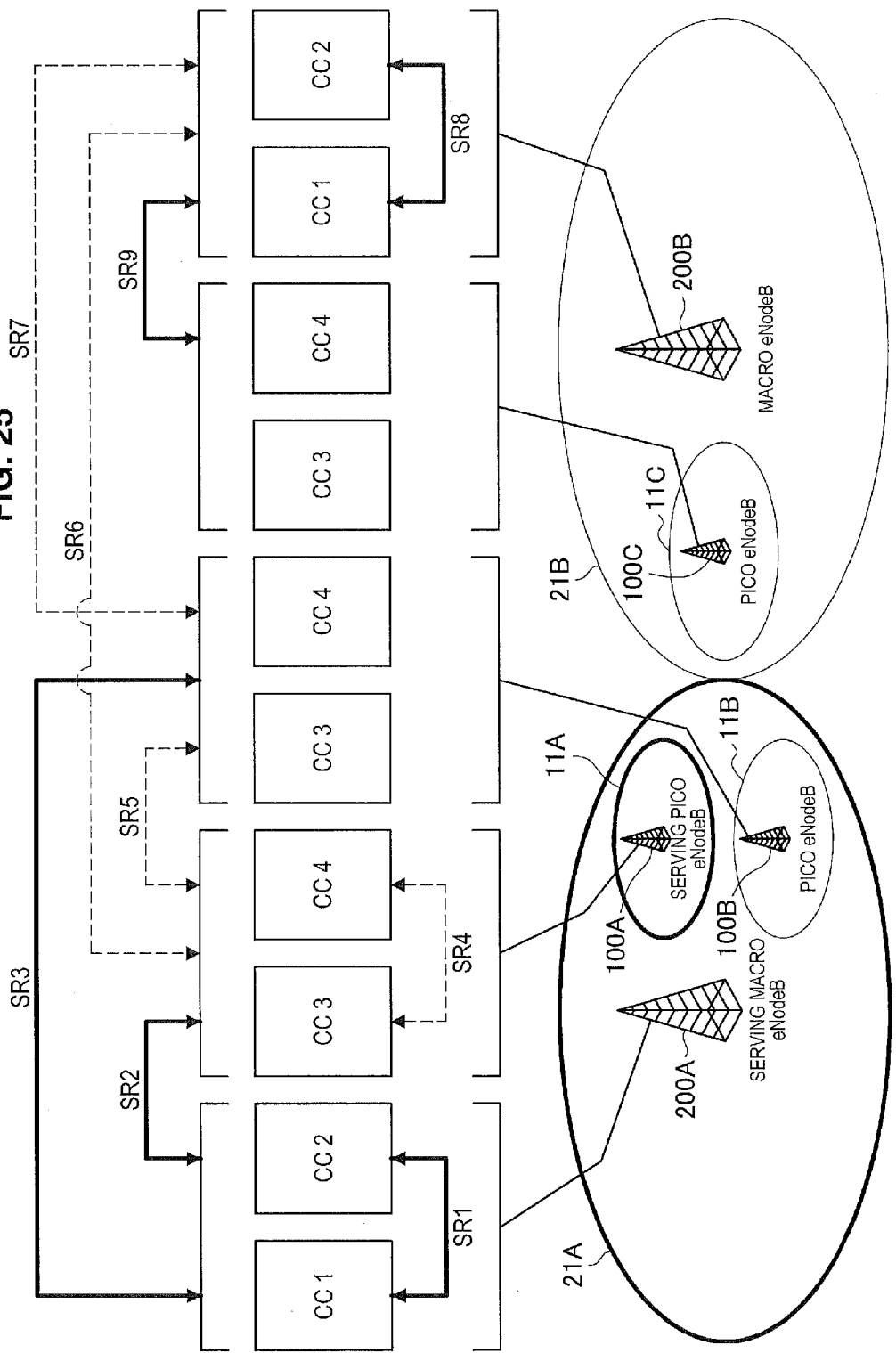
FIG. 25 is an explanatory diagram illustrating examples of kinds of synchronization relationship information supplied by a serving pico eNodeB according to the second modification example of the embodiment.

FIG. 25 is an explanatory diagram illustrating examples of the kinds of synchronization relationship information supplied by the serving macro eNodeB 200A according to the second modification example of the embodiment. As illustrated in FIG. 25, for example, the serving macro eNodeB 200A (the communication control unit 253) supplies the SR1 information, the SR2 information, the SR3 information, the SR8 information, and the SR9 information in the macro cell 21A. Conversely, the serving macro eNodeB 200A (the communication control unit 253) does not supply the SR1 information, the SR2 information, the SR3 information, the SR8 information, and the SR9 in the pico cell 11A.

The second modification example of the embodiment has been described above. According to the second modification example, the synchronization relationship information related to the different macro cell 21 adjacent to the serving macro cell 21 is further supplied. Accordingly, it is possible to use the CCs that are preferable in view of the use of the synchronization result more rapidly even after the handover to the adjacent macro cell 21.

8. THIRD MODIFICATION EXAMPLE

Next, a third modification example of the embodiment will be described with reference to FIGS. 26 to 29.

In the above-described embodiment, for example, each piece of synchronization relationship information is supplied using the system information. As another example, each piece of synchronization relationship information may be supplied using the RRC signaling.

However, when the synchronization relationship information is supplied uniformly using the system information, most of the restricted amount of information for the system information can be used. Further, when the synchronization relationship information is supplied uniformly using the RRC signaling, many radio resources and processes may be necessary for the RRC signaling in a case in which many UEs 300 are present.

Accordingly, in the third modification example of the embodiment, an amount of radio resources necessary to supply the synchronization relationship information can also be configured to be suppressed while suppressing the amount of synchronization relationship information transmitted using the system information.

(Supply Method According to Kind of Synchronization Relationship Information)

In particular, in the third modification example, each of two or more kinds of synchronization relationship information is supplied using one of signaling to a separate UE 300 and system information common to the UEs 300 according to a kind of synchronization relationship information. For example, the signaling is the RRC signaling.

(Pico eNodeB 100—Communication Control Unit 153)
Supply Method for Synchronization Relationship Information For example, the communication control unit 153 supplies the synchronization relationship information via the radio communication unit 120 by a supply method according to the kind of synchronization relationship information.

More specifically, for example, the communication control unit 153 supplies each of the SR4 information, the SR5 information, the SR6 information, and the SR7 information using the RRC signaling.

Since the synchronization relationship information (the SR4 information, the SR5 information, the SR6 information, and the SR7 information) is information indicating synchronization relationships related to the pico cell 11 (that is, a local region), the UEs 300 for which the synchronization relationship information is necessary are restricted. Therefore, the synchronization relationship information can be supplied using the RRC signaling to only the restricted UEs 300. As a result, it is possible to suppress the amount of radio resources necessary to supply the synchronization relationship information, and thus to suppress the amount of synchronization relationship information transmitted using the system information in the pico cell 11.

Supply of Supply Method Information

For example, the communication control unit 153 of the pico eNodeB 100A supplies, in the pico cell 11A, information (hereinafter referred to as "supply method information") indicating what is used between the signaling to the separate UE 300 and the system information common to the UEs 300 to supply each of the two or more kinds of synchronization relationship information.

Specifically, for example, the communication control unit 153 supplies the supply method information indicating that the SR1 information and the SR8 information are supplied using the system information and the other synchronization relationship information is supplied using the RRC signaling.

As a specific supply method, for example, when the UE 300 is in RRC_Connected in the pico cell 11, the communication control unit 153 supplies the supply spot information and the supply method information to the UE 300 via the radio communication unit 120 using the RRC signaling. The supply spot information and the supply method information may be supplied using the system information.

When such supply method information is supplied, the UE 300 can comprehend what is used between the system information and the RRC signaling to acquire various kinds of synchronization relationship information. Therefore, it is not necessary for the UE 300 to attempt to acquire the synchronization relationship information using both of the system information and the RRC signaling. For example, when the necessary synchronization relationship information is used using one of the system information and the RRC signaling, the synchronization relationship information may be acquired by the one method. Therefore, a process performed to acquire the synchronization relationship information is reduced.

(Macro eNodeB 200—Communication Control Unit 253)
Supply Method for Synchronization Relationship Information For example, the communication control unit 253 supplies the synchronization relationship information via the radio communication unit 220 by a supply method according to the kind of synchronization relationship information.

More specifically, for example, the communication control unit 153 supplies each of the SR2 information, the SR3 information, and the SR9 information using the RRC signaling.

Since the synchronization relationship information (the SR2 information, the SR3 information, and the SR9 information) is information indicating synchronization relationships related to the pico cell 11 (that is, a local region), the UEs 300 for which the synchronization relationship information is necessary are restricted. Therefore, the synchronization relationship information can be supplied using the RRC signaling to only the restricted UEs 300. As a result, it is possible to suppress the amount of radio resources necessary to supply the synchronization relationship information, and thus to suppress the amount of synchronization relationship information transmitted using the system information in the macro cell 21.

Further, the synchronization relationship information (the SR2 information, the SR3 information, and the SR9 information) may not be transmitted to the UE 300 for which the synchronization relationship information is not necessary. Therefore, it is possible to reduce the amount of unnecessary synchronization relationship information acquired by the UE 300.

For example, the communication control unit 153 supplies each of the SR1 information and the SR8 information using the system information.

Since the synchronization relationship information (the SR1 information and the SR8 information) is information indicating the synchronization relationship related to only the macro cell 21 without being related to the pico cell 11 (that is, a local region), the synchronization relationship information can also be said to be information that is useful in any UE 300. Therefore, the synchronization relationship information can be supplied using the system information to all of the UEs 300. As a result, the amount of radio resources necessary to supply the synchronization relationship information is suppressed in the macro cell 21 in which many UEs 300 can be located. Since the synchronization relationship information is restricted information, it is possible to suppress the amount of synchronization relationship information transmitted using the system information in the macro cell 21.

The synchronization relationship information (the SR1 information and the SR8 information) is supplied using the system information. Thus, the UE 300 can acquire the synchronization relationship information without being in RRC_connected. That is, the UE 300 can acquire the particularly useful synchronization relationship information more rapidly. The supply of the useful synchronization relationship information in the system information is particularly effective in the UE 300 for which it is necessary, for example, to acquire information rapidly because the UE 300 is moving at a high speed.

Supply of Supply Method Information

For example, the communication control unit 253 of the macro eNodeB 200A supplies, in the macro cell 21A, information (that is, supply method information) indicating what is used between signaling to the separate UE 300 and system information common to the UEs 300 to supply each of the two or more kinds of synchronization relationship information. Specific content of the supply method information and a specific supply method have been described in regard to the pico eNodeB 100.

(Flow of Process)

Next, an example of the communication control process according to the third modification example of the embodiment will be described with reference to FIGS. 26 to 29.

Supply of Supply Spot Information

Figure 26:
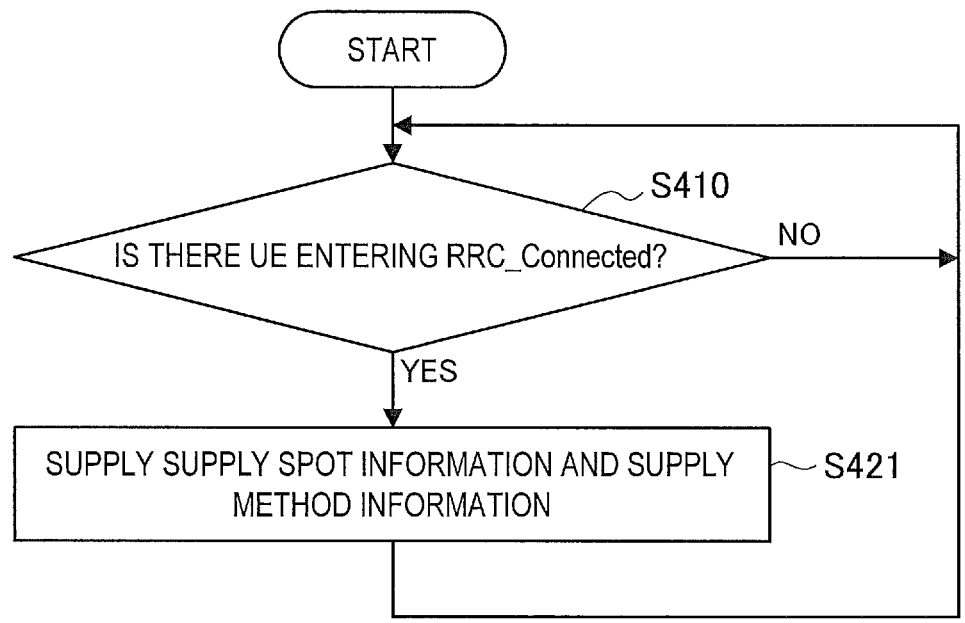
FIG. 26 is an explanatory diagram illustrating an example of a first communication control process on the side of a pico eNodeB according to a third modification example of the embodiment.

FIG. 26 is an explanatory diagram illustrating an example of a first communication control process on the side of the pico eNodeB 100 according to the third modification example of the embodiment. The first communication control process is a process performed to supply the supply spot information and the supply method information.

Here, only step S421 which is a difference between the flow of the process according to the embodiment described with reference to FIG. 17 and the flow of the process according to the third modification example of the embodiment will be described.

In step S421, the communication control unit 153 of the pico eNodeB 100 supplies the supply spot information and the supply method information using the RRC signaling to the UE 300 entering RRC_Connected in the pico cell 11 via the radio communication unit 120. Then, the process returns to step S410.

The first communication control process can be performed similarly in the macro eNodeB 200.

Supply of Synchronization Relationship Information by Pico eNodeB

Figure 27:
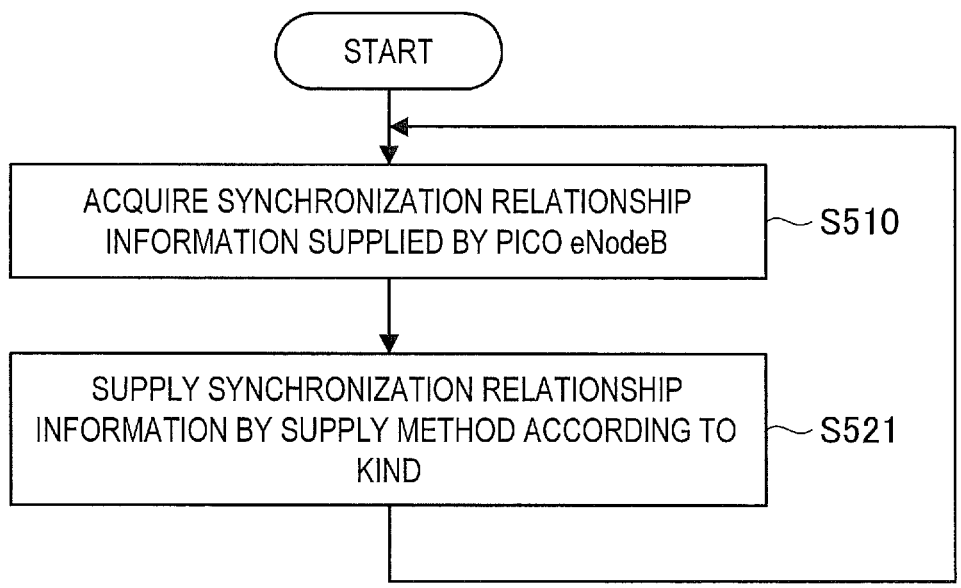
FIG. 27 is an explanatory diagram illustrating an example of a second communication control process on the side of the pico eNodeB according to the third modification example of the embodiment.

FIG. 27 is an explanatory diagram illustrating an example of a second communication control process on the side of the pico eNodeB 100 according to the third modification example of the embodiment. The second communication control process is a process performed to supply the synchronization relationship information.

Here, only step S521 which is a difference between the flow of the process according to the embodiment described with reference to FIG. 18 and the flow of the process according to the third modification example of the embodiment will be described.

In step S521, the communication control unit 153 supplies the synchronization relationship information by the supply method according to the kind of synchronization relationship information via the radio communication unit 120. Then, the process returns to step S510.

Supply of Synchronization Relationship Information by Macro eNodeB

Figure 28:
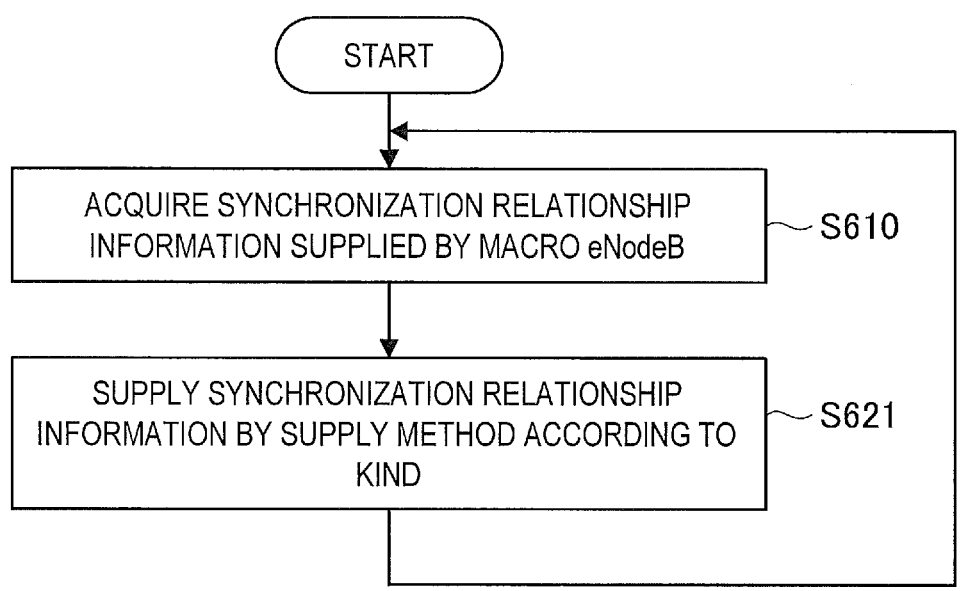
FIG. 28 is an explanatory diagram illustrating an example of a communication control process on the side of the macro eNodeB according to the third modification example of the embodiment.

FIG. 28 is an explanatory diagram illustrating an example of a communication control process on the side of the macro eNodeB 200 according to the third modification example of the embodiment. The communication control process is a process performed to supply the synchronization relationship information.

Here, only step S621 which is a difference between the flow of the process according to the embodiment described with reference to FIG. 19 and the flow of the process according to the third modification example of the embodiment will be described.

In step S621, the communication control unit 253 supplies the synchronization relationship information by the supply method according to the kind of synchronization relationship information via the radio communication unit 220. Then, the process returns to step S610.

Communication Control Process by UE

Figure 29:
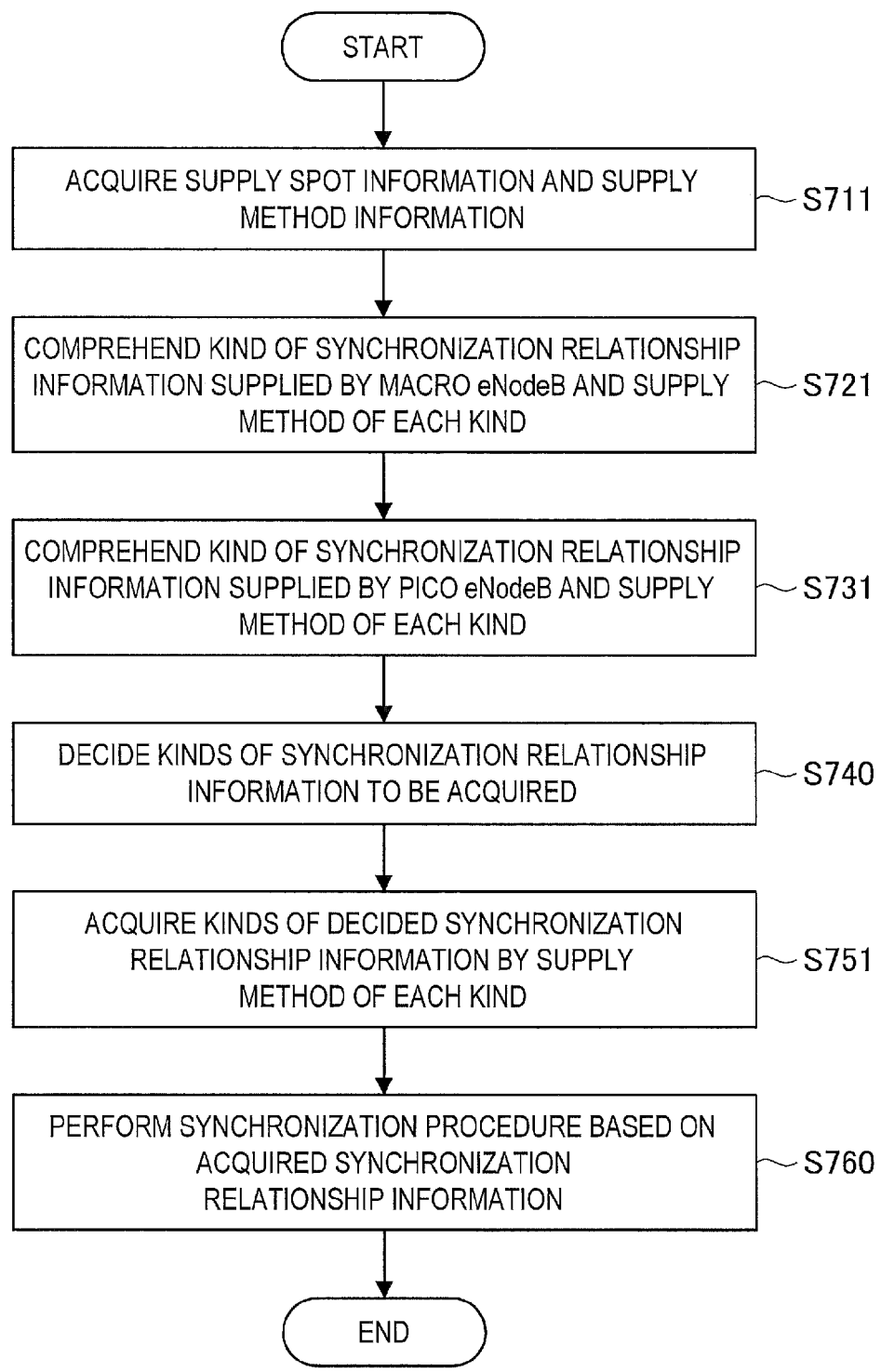
FIG. 29 is an explanatory diagram illustrating an example of a communication control process on the side of a UE according to the third modification example of the embodiment.

FIG. 29 is an explanatory diagram illustrating an example of a communication control process on the side of the UE 300 according to the third modification example of the embodiment. The communication control process starts, for example, when the UE 300 enters RRC_Connected in the pico cell 11 or the macro cell 21.

Here, only steps S711, S721, S731, and S751 which are differences between the flow of the process according to the embodiment described with reference to FIG. 20 and the flow of the process according to the third modification example of the embodiment will be described.

First, in step S711, the synchronization relationship information acquisition unit 341 acquires the supply spot information and the supply method information using the RRC signaling via the radio communication unit 320.

Then, in step S721, the synchronization relationship information acquisition unit 341 comprehends the kind of synchronization relationship information supplied by the macro eNodeB 200 and the supply method according to each kind of synchronization relationship information from the supply spot information and the supply method information.

Then, in step S731, the synchronization relationship information acquisition unit 341 also comprehends the kind of synchronization relationship information supplied by the pico eNodeB 100 and the supply method according to each kind of synchronization relationship information from the supply spot information and the supply method information.

In step S751, the synchronization relationship information acquisition unit 341 acquires the decided kind of synchronization relationship information by the supply method according to each kind of synchronization relationship information via the communication unit 320.

(Supply Method According to Supply Spot)

As described above, for example, the synchronization relationship information is supplied by the supply method according to the kind of synchronization relationship information. On the other hand, as alternative means, each of the two or more kinds of synchronization relationship information may be supplied using the signaling to the separate UE 300 in the pico cell 11 by the pico eNodeB 100 or may be supplied using the system information common to the UEs 300 in the macro cell 21 by the macro eNodeB 200.

Specifically, for example, the SR4 information, the SR5 information, the SR6 information, and the SR7 information supplied in the pico cell 11 may be supplied using the RRC signaling.

Accordingly, it is possible to suppress the amount of synchronization relationship information transmitted using the system information in the pico cell 11.

For example, the SR1 information, the SR2 information, the SR3 information, the SR83 information, and the SR9 information supplied in the macro cell 21 may be supplied using the system information.

Accordingly, the amount of radio resources necessary to supply the synchronization relationship information can be suppressed in the macro cell 21 in which many UEs 300 can be located.

The third modification example of the embodiment has been described above. According to the third modification example, it is also possible to suppress the amount of radio resources necessary to supply the synchronization relationship information while suppressing the amount of synchronization relationship information transmitted using the system information.

9. OTHERS

Next, the kinds of synchronization relationships when the pico cells 11 are deployed as in the third scenario (that is, Deployment Scenario 3) will be described with reference to FIG. 30.

Figure 30:
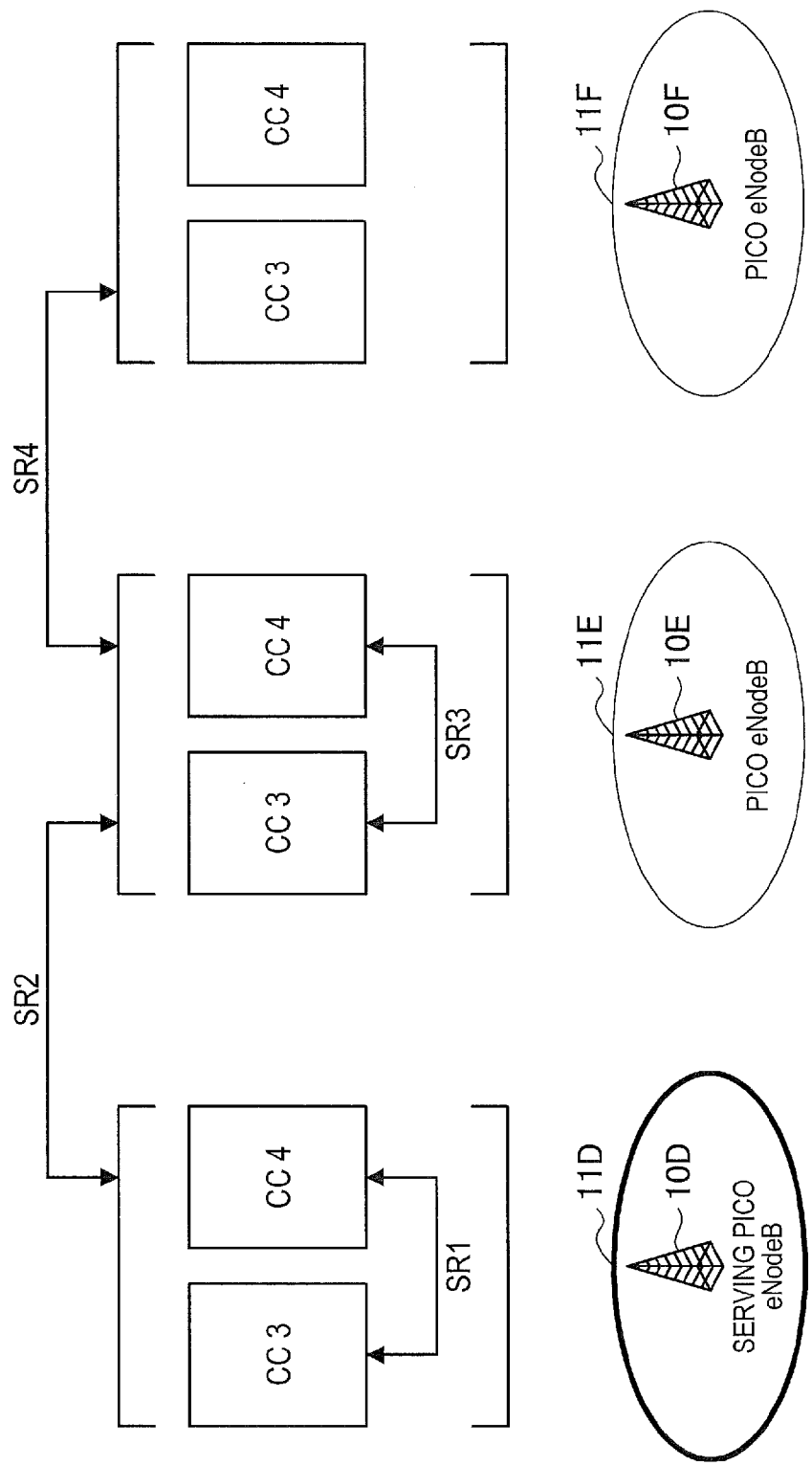
FIG. 30 is an explanatory diagram illustrating examples of kinds of synchronization relationships when pico cells 11 are deployed as in a third scenario.

FIG. 30 is an explanatory diagram illustrating examples of the kinds of synchronization relationships when pico cells 11 are deployed as in the third scenario. Referring to FIG. 30 the pico eNodeB 100 and the pico cells 11 are illustrated. In these examples, no pico cells 11 are overlapping with the macro cell. In this example, the UE 300 is located in the pico cell 11D and the pico cell 11D is a serving pico cell of the UE 300. In FIG. 30, two CCs (CC 3 and CC 4) used in each pico cell 11 are illustrated.

In the deployment of the cells, for example, information indicating the following kinds of synchronization relationships (SR) can be supplied by the pico eNodeB 100D:

SR1: a synchronization relationship between the CCs of a serving pico cell 11D;

SR2: a synchronization relationship between the CCs of the serving pico cell 11D and the CCs of a serving pico cell 11E;

SR3: a synchronization relationship between the CCs of a serving pico cell 11 adjacent to the serving pico cell 11D; and SR4: a synchronization relationship between the CCs of a pico cell 11E adjacent to the serving pico cell 11D and the CCs of a pico cell 11F adjacent to the serving pico cell 11D.

10. APPLICATION EXAMPLES

The technology related to the present disclosure can be applied to various products. For example, each of the pico eNodeB 100 and the macro eNodeB 200 may be realized as an eNodeB 800 including a body (also referred to as a base station device) controlling radio communication and an antenna. Alternatively, each of the pico eNodeB 100 and the macro eNodeB 200 may be realized as an eNodeB 830 including a body controlling radio communication, one or more remote radio heads (RRHs) disposed in different locations from the body, and an antenna. Any of various kinds of terminals to be described below may operate as the pico eNodeB 100 or the macro eNodeB 200 by performing a base station function temporarily or semipermanently.

In addition, the UE 300 may be realized as, for example, a mobile terminal such as a smartphone, a tablet personal computer (PC), a notebook PC, a portable game console, a portable/dongle-style mobile router, or a digital camera, or as an in-vehicle terminal such as a car navigation device. In addition, the UE 300 may also be realized as a terminal that conducts machine-to-machine (M2M) communication (also called a machine-type communication (MTC) terminal). Furthermore, the UE 300 may be a radio communication module mounted onboard these terminals (for example, an integrated circuit module configured on a single die).

<<10.1. Applications Related to Pico eNodeB and Macro eNodeB>>

(First Application)

Figure 31:
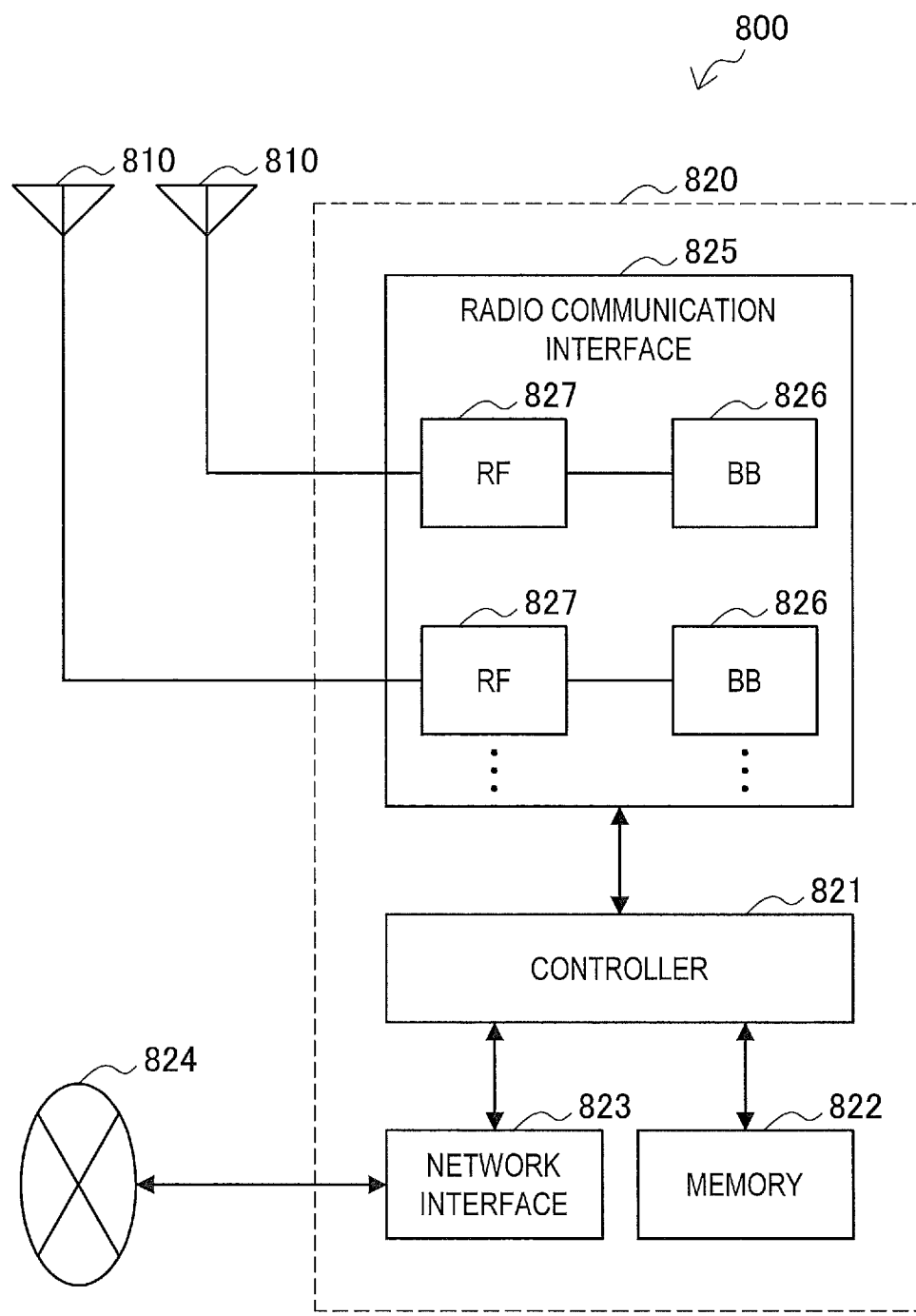
FIG. 31 is a block diagram illustrating a first example of a schematic configuration of an eNodeB to which technology according to an embodiment of the present disclosure may be applied.

FIG. 31 is a block diagram illustrating a first example of a schematic configuration of an eNodeB to which technology according to an embodiment of the present disclosure may be applied. An eNodeB 800 includes one or more antennas 810, and a base station device 820. The respective antennas 810 and the base station device 820 may be connected to each other via an RF cable.

Each antenna 810 includes a single or multiple antenna elements (for example, multiple antenna elements constituting a MIMO antenna), and is used by the base station device 820 to transmit and receive radio signals. The eNodeB 800 may include multiple antennas 810 as illustrated in FIG. 31, and the multiple antennas 810 may respectively correspond to multiple frequency bands used by the eNodeB 800, for example. Note that although FIG. 31 illustrates an example of the eNodeB 800 including multiple antennas 810, the eNodeB 800 may also include a single antenna 810.

The base station device 820 is equipped with a controller 821, memory 822, a network interface 823, and a radio communication interface 825.

The controller 821 may be a CPU or DSP, for example, and causes various higher-layer functions of the base station device 820 to operate. For example, the controller 821 generates a data packet from data inside a signal processed by the radio communication interface 825, and forwards the generated packet via the network interface 823. The controller 821 may also generate a bundled packet by bundling data from multiple baseband processors, and forward the generated bundled packet. In addition, the controller 821 may also include logical functions that execute controls such as Radio Resource Control (RRC), Radio Bearer control, mobility management, admission control, or scheduling. Also, such controls may also be executed in coordination with a nearby eNodeB or core network node. The memory 822 includes RAM and ROM, and stores programs executed by the controller 821 as well as various control data (such as a terminal list, transmit power data, and scheduling data, for example).

The network interface 823 is a communication interface for connecting the base station device 820 to a core network 824. The controller 821 may also communication with a core network node or another eNodeB via the network interface 823. In this case, the eNodeB 800 and the core network node or other eNodeB may be connected to each other by a logical interface (for example, the S1 interface or the X2 interface). The network interface 823 may also be a wired communication interface, or a wireless communication interface for wireless backhaul. In the case in which the network interface 823 is a wireless communication interface, the network interface 823 may use a higher frequency band for wireless communication than the frequency band used by the radio communication interface 825.

The radio communication interface 825 supports a cellular communication scheme such as Long Term Evolution (LTE) or LTE-Advanced, and provides a radio connection to a terminal positioned inside the cell of the eNodeB 800 via an antenna 810. Typically, the radio communication interface 825 may include a baseband (BB) processor 826, an RF circuit 827, and the like. The BB processor 826 may conduct processes such as encoding/decoding, modulation/demodulation, and multiplexing/demultiplexing, for example, and executes various signal processing in respective layers (for example, L1, Medium Access Control (MAC), Radio Link Control (RLC), and Packet Data Convergence Protocol (PDCP)). The BB processor 826 may also include some or all of the logical functions discussed earlier instead of the controller 821. The BB processor 826 may be a module including memory that stores a communication control program, a processor that executes such a program, and related circuits. The functions of the BB processor 826 may also be modifiable by updating the program. Also, the module may be a card or a blade inserted into a slot of the base station device 820, or a chip mounted onboard the card or the blade. Meanwhile, the RF circuit 827 may include components such as a mixer, a filter, and an amp, and transmits or receives a radio signal via an antenna 810.

The radio communication interface 825 may also include multiple BB processors 826 as illustrated in FIG. 31, and the multiple BB processors 826 may respectively correspond to multiple frequency bands used by the eNodeB 800, for example. In addition, the radio communication interface 825 may also include multiple RF circuits 827 as illustrated in FIG. 31, and the multiple RF circuits 827 may respectively correspond to multiple antenna elements, for example. Note that although FIG. 31 illustrates an example of the radio communication interface 825 including multiple BB processors 826 and multiple RF circuits 827, the radio communication interface 825 may also include a single BB processor 826 or a single RF circuit 827.

(Second Application)

Figure 32:
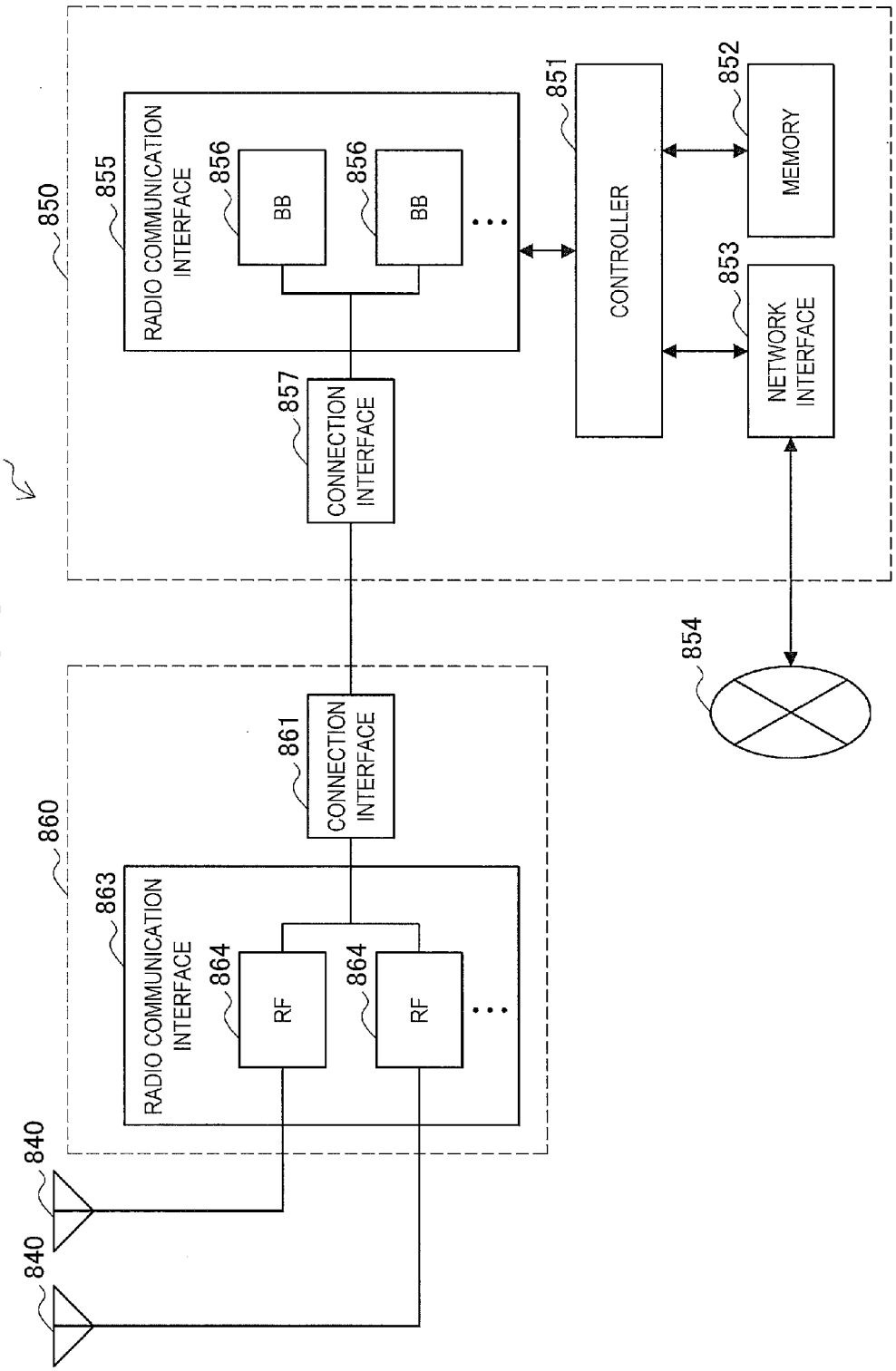
FIG. 32 is a block diagram illustrating a second example of a schematic configuration of an eNodeB to which technology according to an embodiment of the present disclosure may be applied.

FIG. 32 is a block diagram illustrating a second example of a schematic configuration of an eNodeB to which technology according to an embodiment of the present disclosure may be applied. An eNodeB 830 includes one or more antennas 840, a base station device 850, and an RRH 860. The respective antennas 840 and the RRH 860 may be connected to each other via an RF cable. Also, the base station device 850 and the RRH 860 may be connected to each other by a high-speed link such as an optical fiber cable.

Each antenna 840 includes a single or multiple antenna elements (for example, multiple antenna elements constituting a MIMO antenna), and is used by the RRH 860 to transmit and receive radio signals. The eNodeB 830 may include multiple antennas 840 as illustrated in FIG. 32, and the multiple antennas 840 may respectively correspond to multiple frequency bands used by the eNodeB 830, for example. Note that although FIG. 32 illustrates an example of the eNodeB 830 including multiple antennas 840, the eNodeB 830 may also include a single antenna 840.

The base station device 850 is equipped with a controller 851, memory 852, a network interface 853, a radio communication interface 855, and a connection interface 857. The controller 851, the memory 852, and the network interface 853 are similar to the controller 821, the memory 822, and the network interface 823 described with reference to FIG. 31.

The radio communication interface 855 supports a cellular communication scheme such as LTE or LTE-Advanced, and provides a radio connection to a terminal positioned inside a sector corresponding to the RRH 860 via the RRH 860 and an antenna 840. Typically, the radio communication interface 855 may include a BB processor 856 and the like. The BB processor 856 is similar to the BB processor 826 described with reference to FIG. 31, except for being connected to an RF circuit 864 of the RRH 860 via the connection interface 857. The radio communication interface 855 may also include multiple BB processors 856 as illustrated in FIG. 32, and the multiple BB processors 856 may respectively correspond to multiple frequency bands used by the eNodeB 830, for example. Note that although FIG. 32 illustrates an example of the radio communication interface 855 including multiple BB processors 856, the radio communication interface 855 may also include a single BB processor 856.

The connection interface 857 is an interface for connecting the base station device 850 (radio communication interface 855) to the RRH 860. The connection interface 857 may also be a communication module for communication on the high-speed link connecting the base station device 850 (radio communication interface 855) and the RRH 860.

In addition, the RRH 860 is equipped with a connection interface 861 and a radio communication interface 863.

The connection interface 861 is an interface for connecting the RRH 860 (radio communication interface 863) to the base station device 850. The connection interface 861 may also be a communication module for communication on the high-speed link.

The radio communication interface 863 transmits and receives a radio signal via an antenna 840. Typically, the radio communication interface 863 may include an RF circuit 864. The RF circuit 864 may include components such as a mixer, a filter, and an amp, and transmits or receives a radio signal via an antenna 840. The radio communication interface 863 may also include multiple RF circuits 864 as illustrated in FIG. 32, and the multiple RF circuits 864 may respectively correspond to multiple antenna elements, for example. Note that although FIG. 32 illustrates an example of the radio communication interface 863 including multiple RF circuits 864, the radio communication interface 863 may also include a single RF circuit 864.

In the eNodeB 800 and the eNodeB 830 illustrated in FIGS. 31 and 32, the synchronization relationship information acquisition unit 151 and the communication control unit 153 described with reference to FIG. 11 as well as the synchronization relationship information acquisition unit 251 and the communication control unit 253 described with reference to FIG. 14 may be implemented in the radio communication interface 825 as well as the radio communication interface 855 and/or the radio communication interface 863. Also, at least some of these functions may also be implemented in the controller 821 and the controller 851.

<<10.2. Applications Related to UE>>

(First Application)

Figure 33:
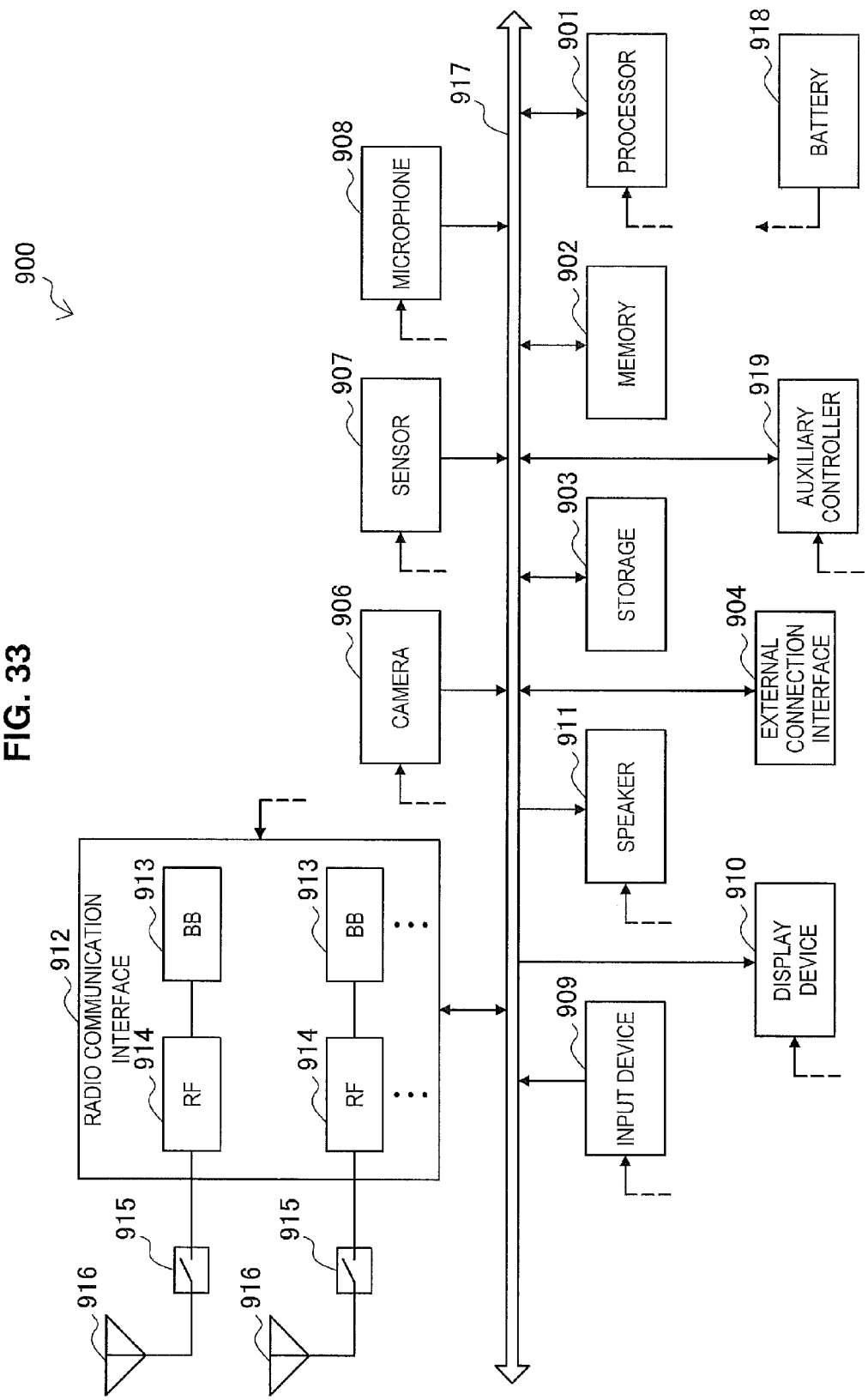
FIG. 33 is a block diagram illustrating an example of a schematic configuration of a smartphone to which technology according to an embodiment of the present disclosure may be applied.

FIG. 33 is a block diagram illustrating an example of a schematic configuration of a smartphone 900 to which technology according to an embodiment of the present disclosure may be applied. The smartphone 900 is equipped with a processor 901, memory 902, storage 903, an external connection interface 904, a camera 906, a sensor 907, a microphone 908, an input device 909, a display device 910, a speaker 911, a radio communication interface 912, one or more antenna switches 915, one or more antennas 916, a bus 917, a battery 918, and an auxiliary controller 919.

The processor 901 may be a CPU or system-on-a-chip (SoC), for example, and controls functions in the application layer and other layers of the smartphone 900. The memory 902 includes RAM and ROM, and stores programs executed by the processor 901 as well as data. The storage 903 may include a storage medium such as semiconductor memory or a hard disk. The external connection interface 904 is an interface for connecting an externally attached device, such as a memory card or Universal Serial Bus (USB) device, to the smartphone 900.

The camera 906 includes an image sensor such as a charge-coupled device (CCD) or complementary metal-oxide-semiconductor (CMOS) sensor, and generates a captured image. The sensor 907 may include a sensor group such as a positioning sensor, a gyro sensor, a geomagnetic sensor, and an acceleration sensor, for example. The microphone 908 converts audio input into the smartphone 900 into an audio signal. The input device 909 includes devices such as a touch sensor that detects touches on a screen of the display device 910, a keypad, a keyboard, buttons, or switches, and receives operations or information input from a user. The display device 910 includes a screen such as a liquid crystal display (LCD) or an organic light-emitting diode (OLED) display, and displays an output image of the smartphone 900. The speaker 911 converts an audio signal output from the smartphone 900 into audio.

The radio communication interface 912 supports a cellular communication scheme such as LTE or LTE-Advanced, and executes radio communication. Typically, the radio communication interface 912 may include a BB processor 913, an RF circuit 914, and the like. The BB processor 913 may conduct processes such as encoding/decoding, modulation/demodulation, and multiplexing/demultiplexing, for example, and executes various signal processing for radio communication. Meanwhile, the RF circuit 914 may include components such as a mixer, a filter, and an amp, and transmits or receives a radio signal via an antenna 916. The radio communication interface 912 may also be a one-chip module integrating the BB processor 913 and the RF circuit 914. The radio communication interface 912 may also include multiple BB processors 913 and multiple RF circuits 914 as illustrated in FIG. 33. Note that although FIG. 33 illustrates an example of the radio communication interface 912 including multiple BB processors 913 and multiple RF circuits 914, the radio communication interface 912 may also include a single BB processor 913 or a single RF circuit 914.

Furthermore, in addition to a cellular communication scheme, the radio communication interface 912 may also support other types of radio communication schemes such as a short-range wireless communication scheme, a near field wireless communication scheme, or a wireless local area network (LAN) scheme. In this case, a BB processor 913 and an RF circuit 914 may be included for each radio communication scheme.

Each antenna switch 915 switches the destination of an antenna 916 among multiple circuits included in the radio communication interface 912 (for example, circuits for different radio communication schemes).

Each antenna 916 includes a single or multiple antenna elements (for example, multiple antenna elements constituting a MIMO antenna), and is used by the radio communication interface 912 to transmit and receive radio signals. The smartphone 900 may also include multiple antennas 916 as illustrated in FIG. 33. Note that although FIG. 33 illustrates an example of the smartphone 900 including multiple antennas 916, the smartphone 900 may also include a single antenna 916.

Furthermore, the smartphone 900 may also be equipped with an antenna 916 for each radio communication scheme. In this case, the antenna switch 915 may be omitted from the configuration of the smartphone 900.

The bus 917 interconnects the processor 901, the memory 902, the storage 903, the external connection interface 904, the camera 906, the sensor 907, the microphone 908, the input device 909, the display device 910, the speaker 911, the radio communication interface 912, and the auxiliary controller 919. The battery 918 supplies electric power to the respective blocks of the smartphone 900 illustrated in FIG. 33 via power supply lines partially illustrated with dashed lines in the drawing. The auxiliary controller 919 causes minimal functions of the smartphone 900 to operate while in a sleep mode, for example.

In the smartphone 900 illustrated in FIG. 33, the synchronization relationship information acquisition unit 341 and the communication control unit 343 described with reference to FIG. 16 and the control unit 241 described with reference to FIG. 33 may be implemented in the radio communication interface 912. Also, at least some of these functions may also be implemented in the processor 901 or the auxiliary controller 919.

(Second Application)

FIG. 34 is a block diagram illustrating an example of a schematic configuration of a car navigation device 920 to which technology according to an embodiment of the present disclosure may be applied. The car navigation device 920 is equipped with a processor 921, memory 922, a Global Positioning System (GPS) module 924, a sensor 925, a data interface 926, a content player 927, a storage medium interface 928, an input device 929, a display device 930, a speaker 931, a radio communication interface 933, one or more antenna switches 936, one or more antennas 937, and a battery 938.

The processor 921 may be a CPU or SoC, for example, and controls a car navigation function and other functions of the car navigation device 920. The memory 922 includes RAM and ROM, and stores programs executed by the processor 921 as well as data.

The GPS module 924 measures the position of the car navigation device 920 (for example, the latitude, longitude, and altitude) by using GPS signals received from GPS satellites. The sensor 925 may include a sensor group such as a gyro sensor, a geomagnetic sensor, and a barometric pressure sensor, for example. The data interface 926 is connected to an in-vehicle network 941 via a port not illustrated in the drawing, and acquires data generated on the vehicle side, such as vehicle speed data.

The content player 927 plays content stored on a storage medium (for example, a CD or DVD) inserted into the storage medium interface 928. The input device 929 includes devices such as a touch sensor that detects touches on a screen of the display device 930, buttons, or switches, and receives operations or information input from a user. The display device 930 includes a screen such as an LCD or OLED display, and displays a navigation function or an image of played-back content. The speaker 931 outputs audio of a navigation function or played-back content.

The radio communication interface 933 supports a cellular communication scheme such as LTE or LTE-Advanced, and executes radio communication. Typically, the radio communication interface 933 may include a BB processor 934, an RF circuit 935, and the like. The BB processor 934 may conduct processes such as encoding/decoding, modulation/demodulation, and multiplexing/demultiplexing, for example, and executes various signal processing for radio communication. Meanwhile, the RF circuit 935 may include components such as a mixer, a filter, and an amp, and transmits or receives a radio signal via an antenna 937. The radio communication interface 933 may also be a one-chip module integrating the BB processor 934 and the RF circuit 935. The radio communication interface 933 may also include multiple BB processors 934 and multiple RF circuits 935 as illustrated in FIG. 34. Note that although FIG. 34 illustrates an example of the radio communication interface 933 including multiple BB processors 934 and multiple RF circuits 935, the radio communication interface 933 may also include a single BB processor 934 or a single RF circuit 935.

Furthermore, in addition to a cellular communication scheme, the radio communication interface 933 may also support other types of radio communication schemes such as a short-range wireless communication scheme, a near field wireless communication scheme, or a wireless LAN scheme. In this case, a BB processor 934 and an RF circuit 935 may be included for each radio communication scheme.

Each antenna switch 936 switches the destination of an antenna 937 among multiple circuits included in the radio communication interface 933 (for example, circuits for different radio communication schemes).

Each antenna 937 includes a single or multiple antenna elements (for example, multiple antenna elements constituting a MIMO antenna), and is used by the radio communication interface 933 to transmit and receive radio signals. The car navigation device 920 may also include multiple antennas 937 as illustrated in FIG. 34. Note that although FIG. 34 illustrates an example of the car navigation device 920 including multiple antennas 937, the car navigation device 920 may also include a single antenna 937.

Furthermore, the car navigation device 920 may also be equipped with an antenna 937 for each radio communication scheme. In this case, the antenna switch 936 may be omitted from the configuration of the car navigation device 920.

The battery 938 supplies electric power to the respective blocks of the car navigation device 920 illustrated in FIG. 34 via power supply lines partially illustrated with dashed lines in the drawing. Also, the battery 938 stores electric power supplied from the vehicle.

In the car navigation device 920 illustrated in FIG. 34, the synchronization relationship information acquisition unit 341 and the communication control unit 343 described with reference to FIG. 16 and the control unit 241 described with reference to FIG. 33 may be implemented in the radio communication interface 933. Also, at least some of these functions may also be implemented in the processor 921.

In addition, technology according to the present disclosure may also be realized as an in-vehicle system (or vehicle) 940 that includes one or more blocks of the car navigation device 920 discussed above, the in-vehicle network 941, and a vehicle-side module 942. The vehicle-side module 942 generates vehicle-side data such as the vehicle speed, number of engine revolutions, or malfunction information, and outputs the generated data to the in-vehicle network 941.

11. CONCLUSION

The communication device and each process according to the embodiment of the present disclosure have been described above with reference to FIGS. 1 to 30. According to the embodiment of the present disclosure, the synchronization relationship information (that is, the SR4 information) indicating which CCs are mutually synchronized among the plurality of CCs used for the pico cell 11 is supplied in the pico cell 11 by the pico eNodeB 100 and is not supplied in the macro cell 21 by the macro eNodeB 200.

The supply of the SR4 information results in a reduction in a load of the UE 300 in the carrier aggregation when the macro cell 21 and the pico cells 11 are deployed. That is, when the SR4 information is not supplied to the UE 300, the UE 300 can separately verify all of the synchronization relationships between the CCs used for the pico cell 11. Conversely, when the SR4 information is supplied to the UE 300, the UE 300 may verify only the restricted synchronization relationships. For this reason, the supply of the SR4 information can result in the reduction in the load of the UE 300.

The SR4 information is not supplied by the macro eNodeB 200 but is supplied by the pico eNodeB 100. Thus, radio resources of the macro cell 21 are not used to supply the SR4 information. That is, the supply of the SR4 information by the pico eNodeB 100 can result in suppression of consumption of the radio resources of the macro cell 21.

For example, the synchronization relationship information (that is, the macro SR information) indicating which CC is synchronized with which CC among one or more different CCs used for the macro cell 21 is supplied in the macro cell 21 by the macro eNodeB 200.

More specifically, for example, the macro SR information indicates which CC of one or more different CCs used for the macro cell 21 is synchronized with which CC of the plurality of CCs used for the pico cell 11. That is, the macro SR information includes the SR2 information. Therefore, the SR2 information (and the SR3 information) is supplied in the macro cell 21.

The supply of the SR2 information (and the SR3 information) can result in a reduction in a load of the UE 300 in the carrier aggregation when the macro cell 21 and the pico cell 11 are deployed. For example, the UE 300 can also perform the radio communication simultaneously using the CC of the pico cell 11 and the CC of the macro cell 21. In this case, when the SR2 information and the SR3 information are not supplied to the UE 300, the UE 300 can separately verify all of the synchronization relationships between the CCs used for the pico cells 11 and the CC used for the macro cell 21. Conversely, when the SR2 information and the SR3 information are supplied to the UE 300, the UE 300 may verify only the restricted synchronization relationships. For this reason, the supply of the SR2 information and the SR3 information can result in the reduction in the load of the UE 300.

The SR2 information and the SR3 information are supplied by the macro eNodeB 200. Thus, the UE 300 can reliably comprehend which CC is preferable to use among the CCs of the pico cell 11 in view of the use of the synchronization result when the UE 300 enters the pico cell 11, before the UE 300 enters the pico cell 11. As a result, when the UE 300 enters the pico cell 11, the UE 300 can more rapidly use the CC (for example, the CC synchronized with the CC of the macro cell 21 during the use, the CC synchronized with the different CC of the pico cell 11, or the like) that is preferable in view of the use of the synchronization result among the CCs of the pico cell 11.

For example, the one or more CCs used for the macro cell 21 include two or more CCs, and the macro SR information indicates which CCs are mutually synchronized among the one or more different CCs. That is, the macro SR information includes the SR1 information. Therefore, the SR1 information is supplied in the macro cell 21.

The supply of the SR1 information can result in a reduction in a load of the UE 300 in the carrier aggregation when the macro cell 21 and the pico cell 11 are deployed. That is, when the SR1 information is not supplied to the UE 300, the UE 300 can separately verify all of the synchronization relationships between the CCs used in the macro cell 21. Conversely, when the SR1 information is supplied to the UE 300, the UE 300 may verify only the restricted synchronization relationships. Therefore, the supply of the SR1 information can result in the reduction in the load of the UE 300.

The SR1 information is supplied by the macro eNodeB 200. Thus, the UE 300 can acquire the SR1 information without being located in one pico cell 11. Accordingly, it is possible to reduce the load of the UE 300 independently of the position of the UE 300.

For example, each of the two or more kinds of synchronization relationship information is supplied in order according to the importance of the kind of synchronization relationship information.

Thus, for example, the various kinds of synchronization relationship information are supplied in the order according to the importance. Thus, the UE 300 can verify the synchronization relationships in order from the synchronization relationship with the high importance. As a result, it is possible to reduce a process in which the UE 300 can establish the synchronization.

According to the first modification example of the embodiment, as the alternative means, the synchronization relationship information (that is, the SR2 information) indicating which CC of one or more CCs used for the macro cell 21 is synchronized with which CC of the plurality of CCs used for the pico cell 11A is supplied in the pico cell 11 by the pico eNodeB 100 and is not supplied in the macro cell 21 by the macro eNodeB 200.

Accordingly, the radio resources of the macro cell 21 are not used to supply the SR2 information. That is, the supply of the SR2 information by the pico eNodeB 100 can result in the suppression of the consumption of the radio resources of the macro cell 21.

According to the third modification example of the embodiment, each of the two or more kinds of synchronization relationship information is supplied using one of the signaling to the separate UE 300 and the system information common to the UEs 300 according to the kind of synchronization relationship information.

Accordingly, it is also possible to suppress the amount of radio resources necessary to supply the synchronization relationship information while suppressing the amount of synchronization relationship information transmitted using the system information.

Although preferred embodiments of the present disclosure are described in detail with reference to the accompanying drawings, the technical scope of the present disclosure is not limited thereto. It should be understood by those skilled in the art that various modifications, combinations, sub-combinations and alterations may occur depending on design requirements and other factors insofar as they are within the scope of the appended claims or the equivalents thereof.

For example, the example in which two CCs are used for each cell (the macro cell or the pico cell) has been described, but the present disclosure is not limited to the related examples. In each cell, one CC may be used or three or more CCs may be used. The number of CCs used for each cell may be different.

The example in which the common CC is used in two or more pico cells when the two or more pico cells are present has been described but the present disclosure is not limited to the related examples. For example, one or more CCs used for a certain pico cell and one or more CCs used for a different pico cell may not all be common or they may be partially common.

The example in which the CCs used for the macro cell and the CCs used for the pico cell are not all common has been described, but the present disclosure is not limited to the related examples. The CCs used for the macro cell and the CCs used for the pico cell may partially common or may be entirely common.

The example in which the pico cell is entirely overlapping with the macro cell (that is, the example corresponding to the first deployment scenario) has been described considerably in the description, but the present disclosure is not limited to the related examples. The pico cell may be partially overlapping with the macro cell. That is, the deployment of the pico cell may correspond to the second deployment scenario. The pico cell may be overlapping with two macro cells. The pico cell may be partially overlapping with a different pico cell.

The example in which the SR1 information to the SR5 information (the SR1 information to the SR9 information in the second modification example) are supplied as the synchronization relationship information has been described, but the present disclosure is not limited to the related examples. For example, only the synchronization relationship information of some of the SR1 information to the SR5 information (or the SR1 information to the SR9 information) may be supplied. Further, the synchronization relationship information indicating the synchronization relationships other than SR1 to SR5 (or SR1 to SR9) may be supplied.

The example in which each of the SR1 information to the SR5 information (in the second modification example, the SR1 information to the SR9 information) is supplied to one of the macro eNodeB and the pico eNodeB has been described, but the present disclosure is not limited to the related examples. The synchronization relationship information of some of the SR1 information to the SR5 information (or the SR1 information to the SR9 information) may be supplied to both of the macro eNodeB and the pico eNodeB.

The example in which each of the SR1 information to the SR5 information (in the second modification example, the SR1 information to the SR9 information) is supplied using only one of the system information and the RRC signaling has been described, but the present disclosure is not limited to the related examples. The synchronization relationship information of all or some of the SR1 information to the SR5 information (or the SR1 information to the SR9 information) may be supplied using both of the system information and the RRC signaling or may be supplied by only a method in which the system information and the RRC signaling are frequently selected.

The example in which it is indicated that the mutually synchronized frequency bands (for example, the mutually synchronized CCs) are mutually synchronized in both of the time direction and the frequency direction has been described, but the present disclosure is not limited to the related examples. For example, the mutually synchronized frequency bands may be frequency bands synchronized in the time direction. For example, the mutually synchronized frequency bands may be frequency bands synchronized in the frequency direction. For example, the mutually synchronized frequency bands may be frequency bands synchronized in one of the time direction and the frequency direction. In this case, the synchronization relationship information may further indicate that the mutually synchronized frequency bands are synchronized in one of the time direction and the frequency direction.

The pico cell can be exemplified as an example of the small cell, but the present disclosure is not limited to the related examples. The small cell may be a cell other than the pico cell (for example, a nano cell or a femto cell) partially or entirely overlapping with the macro cell.

The example in which the communication system conforms to LTE-A has been described, but the present disclosure is not limited to the related examples. For example, the communication system may be a system that conforms to a different standard in 3GPP. For example, the communication system may be a system that conforms to a future standard in 3GPP.

Also, the processing steps in a communication control process in this specification are not strictly limited to being executed in a time series following the sequence described in a flowchart. For example, the processing steps in a communication control may be executed in a sequence that differs from a sequence described herein as a flowchart, and furthermore may be executed in parallel.

In addition, it is possible to create a computer program for causing hardware such as a CPU, ROM, and RAM built into a communication control device (for example, a pico eNodeB and a macro eNodeB) and a terminal device (for example, a UE) to exhibit functions similar to each structural element of the foregoing communication control device or terminal device.

Additionally, the present technology may also be configured as below.

(1)

A communication control device including:

a communication control unit configured to control radio communication in a small cell partially or entirely overlapping with a macro cell; and an acquisition unit configured to acquire first synchronization relationship information indicating which frequency bands are mutually synchronized among a plurality of frequency bands used for the small cell, wherein the first synchronization relationship information is supplied in the small cell by the communication control unit and is not supplied in the macro cell by a base station of the macro cell.

(2)

The communication control device according to (1), wherein second synchronization relationship information indicating which frequency band is synchronized with which frequency band among one or more different frequency bands used for the macro cell is supplied in the macro cell by the base station of the macro cell.

(3)

The communication control device according to (2), wherein the second synchronization relationship information indicates which frequency band of the one or more different frequency bands used for the macro cell is synchronized with which frequency band of the plurality of frequency bands used for the small cell.

(4)

The communication control device according to (2) or (3), wherein the one or more different frequency bands used for the macro cell include two or more frequency bands, and wherein the second synchronization relationship information indicates which frequency bands are mutually synchronized among the one or more different frequency bands.

(5)

The communication control device according to (1), wherein the acquisition unit acquires second synchronization relationship information indicating which frequency band of one or more different frequency bands used for the macro cell is synchronized with which frequency band of the plurality of frequency bands used for the small cell, and wherein the second synchronization relationship information is supplied in the small cell by the communication control unit and is not supplied in the macro cell by the base station of the macro cell.

(6)

The communication control device according to any one of (1) to (5), wherein the acquisition unit acquires third synchronization relationship information indicating which frequency band of the plurality of frequency bands is synchronized with which frequency band among one or more frequency bands used for a different cell other than the macro cell and the small cell, and wherein the third synchronization relationship information is supplied in the small cell by the communication control unit and is not supplied in the macro cell by the base station of the macro cell.

(7)

The communication control device according to (6), wherein the different cell includes a different small cell partially or entirely overlapping with the macro cell.

(8)

The communication control device according to (6) or (7), wherein the different cell includes a different macro cell adjacent to the macro cell.

(9)

The communication control device according to any one of (1) to (8), wherein the acquisition unit acquires fourth synchronization relationship information indicating which frequency bands are mutually synchronized among a plurality of frequency bands used for a different cell other than the macro cell and the small cell, and wherein the fourth synchronization relationship information is supplied in the small cell by the communication control unit and is not supplied in the macro cell by the base station of the macro cell.

(10)

The communication control device according to (9), wherein the different cell is a different macro cell adjacent to the macro cell and a different small cell partially or entirely overlapping with the macro cell, and wherein the fourth synchronization relationship information indicates which frequency band of one or more frequency bands used for the different small cell is synchronized with which frequency band of one or more frequency bands used for the different macro cell.

(11)

The communication control device according to any one of (1) to (10), wherein the communication control unit supplies, in the small cell, information indicating that each of two or more kinds of synchronization relationship information including the first synchronization relationship information is supplied to one of the macro cell and the small cell.

(12)

The communication control device according to any one of (1) to (11), wherein each of two or more kinds of synchronization relationship information including the first synchronization relationship information is supplied using one of signaling to a separate terminal device and system information common to terminal devices according to a kind of synchronization relationship information.

(13)

The communication control device according to any one of (1) to (12), wherein each of two or more kinds of synchronization relationship information including the first synchronization relationship information is supplied in the small cell by the communication control unit using signaling to a separate terminal device or is supplied in the macro cell by the base station of the macro cell using system information common to terminal devices.

(14)

The communication control device according to (12) or (13), wherein the communication control unit supplies, in the small cell, information indicating that each of the two or more kinds of synchronization relationship information including the first synchronization relationship information is supplied using one of the signaling to the separate terminal device and the system information common to the terminal devices.

(15)

The communication control device according to any one of (1) to (14), wherein the communication control unit supplies each of two or more kinds of synchronization relationship information including the first synchronization relationship information in order according to importance of the kinds of synchronization relationship information.

(16)

A communication control method including:

controlling radio communication in a small cell partially or entirely overlapping with a macro cell; and acquiring first synchronization relationship information indicating which frequency bands are mutually synchronized among a plurality of frequency bands used for the small cell, wherein the first synchronization relationship information is supplied in the small cell by a base station of the small cell and is not supplied in the macro cell by the base station of the macro cell.

(17)

A communication control device including:

a communication control unit configured to control radio communication in a macro cell partially or entirely overlapping with a small cell; and an acquisition unit configured to acquire synchronization relationship information indicating which frequency bands are mutually synchronized among a plurality of frequency bands, wherein the communication control unit supplies the synchronization relationship information in the macro cell, wherein the synchronization relationship information does not include first synchronization relationship information indicating which frequency bands are mutually synchronized among a plurality of frequency bands used for the small cell, and wherein the first synchronization relationship information is supplied by a base station of the small cell.

(18)

The communication control device according to (17), wherein the acquisition unit acquires fifth synchronization relationship information indicating which frequency bands are mutually synchronized among a plurality of frequency bands used for a different cell other than the macro cell and the small cell, and wherein the communication control unit supplies the fifth synchronization relationship information in the macro cell.

(19)

The communication control device according to (18), wherein the different cell is a different macro cell adjacent to the macro cell.

(20)

A terminal device including:

a radio communication unit configured to perform radio communication in a macro cell or a small cell partially or entirely overlapping with the macro cell, and an acquisition unit configured to acquire first synchronization relationship information indicating which frequency bands are mutually synchronized among a plurality of frequency bands used for the small cell from information supplied in the small cell by a base station of the small cell and configured not to acquire the first synchronization relationship information from information supplied in the macro cell by a base station of the macro cell.

REFERENCE SIGNS LIST 1 communication system
11 pico cell
21 macro cell
100 pico eNodeB
151 synchronization relationship information acquisition unit
153 communication control unit
200 macro eNodeB
251 synchronization relationship information acquisition unit
253 communication control unit
300 UE (User Equipment)
341 synchronization relationship information acquisition unit
343 communication control unit

The invention claimed is:

1. A communication control device, comprising:
one or more processors configured to:
control radio communication in a small cell partially or entirely overlapping with a macro cell; and
acquire first synchronization relationship information indicating which frequency bands are mutually synchronized among a first plurality of frequency bands used for the small cell,
wherein the first synchronization relationship information is supplied in the small cell and is prevented from supply in the macro cell by a base station of the macro cell.

2. The communication control device according to claim 1, wherein second synchronization relationship information indicating which frequency band is synchronized with which frequency band among one or more different frequency bands used for the macro cell is supplied in the macro cell by the base station of the macro cell.

3. The communication control device according to claim 2, wherein the second synchronization relationship information indicates which frequency band of the one or more different frequency bands used for the macro cell is synchronized with which frequency band of the first plurality of frequency bands used for the small cell.

4. The communication control device according to claim 2,
wherein the one or more different frequency bands used for the macro cell include two or more frequency bands, and
wherein the second synchronization relationship information indicates which frequency bands are mutually synchronized among the one or more different frequency bands.

5. The communication control device according to claim 1,
wherein the one or more processors are further configured to acquire second synchronization relationship information indicating which frequency band of one or more different frequency bands used for the macro cell is synchronized with which frequency band of the first plurality of frequency bands used for the small cell, and
wherein the second synchronization relationship information is supplied in the small cell and is prevented from supply in the macro cell by the base station of the macro cell.

6. The communication control device according to claim 1,
wherein the one or more processors are further configured to acquire third synchronization relationship information indicating which frequency band of the first plurality of frequency bands is synchronized with which frequency band among one or more frequency bands used for a different cell other than the macro cell and the small cell, and
wherein the third synchronization relationship information is supplied in the small cell and is prevented from supply in the macro cell by the base station of the macro cell.

7. The communication control device according to claim 6, wherein the different cell includes a different small cell partially or entirely overlapping with the macro cell.

8. The communication control device according to claim 6, wherein the different cell includes a different macro cell adjacent to the macro cell.

9. The communication control device according to claim 1,
wherein the one or more processors are further configured to acquire fourth synchronization relationship information indicating which frequency bands are mutually synchronized among a second plurality of frequency bands used for a different cell other than the macro cell and the small cell, and
wherein the fourth synchronization relationship information is supplied in the small cell and is prevented from supply in the macro cell by the base station of the macro cell.

10. The communication control device according to claim 9,
wherein the different cell is a different macro cell adjacent to the macro cell and a different small cell partially or entirely overlapping with the macro cell, and
wherein the fourth synchronization relationship information indicates which frequency band of one or more frequency bands used for the different small cell is synchronized with which frequency band of one or more frequency bands used for the different macro cell.

11. The communication control device according to claim 1, wherein the one or more processors are further configured to supply, in the small cell, information indicating that each of two or more kinds of synchronization relationship information including the first synchronization relationship information is supplied to one of the macro cell and the small cell.

12. The communication control device according to claim 1, wherein each of two or more kinds of synchronization relationship information including the first synchronization relationship information is supplied based on one of signaling to a separate terminal device or system information common to terminal devices according to a kind of synchronization relationship information.

13. The communication control device according to claim 1, wherein each of two or more kinds of synchronization relationship information including the first synchronization relationship information is supplied in the small cell based on signaling to a separate terminal device or is supplied in the macro cell by the base station of the macro cell based on system information common to terminal devices.

14. The communication control device according to claim 12, wherein the one or more processors are further configured to supply, in the small cell, information indicating that each of the two or more kinds of synchronization relationship information including the first synchronization relationship information is supplied based on one of the signaling to the separate terminal device or the system information common to the terminal devices.

15. The communication control device according to claim 1, wherein the one or more processors are further configured to supply each of two or more kinds of synchronization relationship information including the first synchronization relationship information in order according to importance of the two or more kinds of synchronization relationship information.

16. A communication control method, comprising:
controlling radio communication in a small cell partially or entirely overlapping with a macro cell; and
acquiring first synchronization relationship information indicating which frequency bands are mutually synchronized among a plurality of frequency bands used for the small cell,
wherein the first synchronization relationship information is supplied in the small cell by a base station of the small cell and is prevented from supply in the macro cell by the base station of the macro cell.

17. A communication control device, comprising:
one or more processors configured to:
control radio communication in a macro cell partially or entirely overlapping with a small cell;
acquire synchronization relationship information indicating which frequency bands are mutually synchronized among a plurality of frequency bands; and
supply the synchronization relationship information in the macro cell,
wherein the synchronization relationship information excludes first synchronization relationship information indicating which frequency bands are mutually synchronized among a first plurality of frequency bands used for the small cell, and wherein the first synchronization relationship information is supplied by a base station of the small cell.

18. The communication control device according to claim 17, wherein the one or more processors are further configured to:

acquire fifth synchronization relationship information indicating which frequency bands are mutually synchronized among a second plurality of frequency bands used for a different cell other than the macro cell and the small cell; and supply the fifth synchronization relationship information in the macro cell.

19. The communication control device according to claim 18, wherein the different cell is a different macro cell adjacent to the macro cell.

20. A terminal device, comprising:

one or more processors configured to:

communicate in a macro cell or a small cell partially or entirely overlapping with the macro cell, acquire first synchronization relationship information indicating which frequency bands are mutually synchronized among a plurality of frequency bands used for the small cell from first information supplied in the small cell by a base station of the small cell, and prevent to acquire the first synchronization relationship information from second information supplied in the macro cell by a base station of the macro cell.

* * * * *